(12) United States Patent
Lee

(10) Patent No.: US 10,484,207 B2
(45) Date of Patent: Nov. 19, 2019

(54) METHOD AND APPARATUS FOR CHANNEL ESTIMATION IN WIRELESS COMMUNICATION SYSTEM

(71) Applicant: Samsung Electronics Co., Ltd, Gyeonggi-do (KR)

(72) Inventor: Dongjae Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 15/350,002

(22) Filed: Nov. 11, 2016

(65) Prior Publication Data

US 2017/0141936 A1 May 18, 2017

(30) Foreign Application Priority Data

Nov. 13, 2015 (KR) .................. 10-2015-0159725
Apr. 6, 2016 (KR) .................. 10-2016-0042278

(51) Int. Cl.
*H04L 25/02* (2006.01)
*H04L 5/00* (2006.01)

(52) U.S. Cl.
CPC ........ *H04L 25/0202* (2013.01); *H04L 5/0048* (2013.01)

(58) Field of Classification Search
CPC ............. H04L 25/0222; H04L 25/0202; H04L 5/0048; H04L 25/0232; H04W 24/08; H04W 7/0626
See application file for complete search history.

(56) References Cited

U.S. PATENT DOCUMENTS

| 7,646,924 B2 | 1/2010 | Donoho |
| 8,401,487 B2 * | 3/2013 | Dent ............ H04L 25/022 455/446 |
| 8,428,163 B2 * | 4/2013 | Kent ............ H04L 5/0048 375/260 |
| 8,675,792 B2 * | 3/2014 | Carbonelli ........ H04B 7/01 375/316 |

(Continued)

OTHER PUBLICATIONS

David L. Donoho, et al., "Sparse Solution of Underdetermined Systems of Linear Equations by Stagewise Orthogonal Matching Pursuit", IEEE Transactions on Information Theory, vol. 58, No. 2, Feb. 2012, 28 pages.

*Primary Examiner* — Anh Vu H Ly
*Assistant Examiner* — Hector Reyes

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a channel estimation method and apparatus by a reception end. The reception device includes a receiver and a controller. The receiver receives a reference signal. The controller identifies a first set of channel values for resources allocated for reference signals. The controller performs interpolation on the first set of channel values so as to identify second set of channel values for remaining resources. The interpolation method is determined based on at least one of Doppler frequency of a channel and channel quality. The controller processes received signals using the first set of channel values and the second set of channel values.

20 Claims, 42 Drawing Sheets

(56) References Cited

U.S. PATENT DOCUMENTS

| | | | |
|---|---|---|---|
| 8,897,353 B2* | 11/2014 | Thompson | H04L 25/0212 |
| | | | 375/232 |
| 8,934,330 B2* | 1/2015 | Niu | H04L 25/0204 |
| | | | 370/208 |
| 9,100,227 B2* | 8/2015 | Singh | H04L 25/0212 |
| 9,264,118 B1* | 2/2016 | Koike-Akino | H04L 1/0612 |
| 2012/0224498 A1* | 9/2012 | Abrishamkar | H04L 25/0204 |
| | | | 370/252 |

* cited by examiner

METHOD AND APPARATUS FOR CHANNEL ESTIMATION IN WIRELESS COMMUNICATION SYSTEM

CROSS-REFERENCE TO RELATED APPLICATIONS AND CLAIM OF PRIORITY

The present application is related to and claims the priority under 35 U.S.C. § 119(a) to Korean Application Serial No. 10-2015-0159725 filed on Nov. 13, 2015, and Korean Application Serial No. 10-2016-0042278 filed on Apr. 6, 2016, the entire contents of which are hereby incorporated by reference.

TECHNICAL FIELD

The present disclosure relates to channel estimation in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, a reception end is required to estimate a channel of a reception signal to perform demodulation and decoding of the reception signal. The channel estimation for a downlink signal in LTE using an Orthogonal Frequency Division Multiplexing (OFDM) scheme is performed by using a Cell-specific Reference Signal (CRS).

In the LTE, Resource Elements (REs) where the CRS is received are located in the system bandwidth and arranged in the interval of six sub-carriers in a frequency domain. The CRS-based channel estimation is used for coherent demodulation of Physical Downlink Control Channel (PDCCH) or Physical Downlink Shared Channel (PDSCH), and more particularly, CRS-based fast fading channel estimation plays an important role in the coherent demodulation of the PDCCH/PDSCH of the reception end that moves at a faster rate.

The channel estimation is treated as an important technology because a majority of channel estimation scenarios assume that the channel state information is already known in the current wireless communication system. A training signal based channel estimation technique that is commonly used is a technique mainly based on linear reconstruction, such as Least Square (LS) and Minimum Mean Square Error (MMSE) methods using a reference signal. The linear reconstruction technique may have the best performance when there are large number of taps of a channel impulse response in a multi-path channel, however, according to a recent study, when using a very wide bandwidth, it is found that the linear reconstruction technique has sparse Channel Impulse Response (CIR) characteristics. Based on the above description, when a wireless communication system uses a higher dimensional signal space, the sparse CIR characteristics are provided, and in terms of performance measurement, it is found that a compressed sensing based channel estimation technique using a non-linear reconstruction algorithm is superior to a channel estimation technique using the linear reconstruction algorithm, such as the LS.

SUMMARY

To address the above-discussed deficiencies, it is a primary object to provide a channel estimation method and apparatus using a reference signal in a wireless communication system.

A channel estimation method for a reception end according to an embodiment includes: receiving reference signals; identifying a first set of channel values for resources for the reference signals; identifying a second set of channel values for remaining resources by performing interpolation on the first set of channel values, wherein the interpolation method is determined based on at least one of a Doppler frequency of a channel and channel quality; and processing received signals using the first set of channel values and the second set of channel values.

A reception end according to an embodiment includes a receiver and a controller. The receiver receives a reference signal. The controller identifies a first set of channel values for resources for the reference signals. The controller determines a second set of channel values for remaining resources by performing interpolation on the first set of channel values. The interpolation method is determined based on at least one of a Doppler frequency of a channel and channel quality. The controller processes received signals using the first set of channel values and the second set of channel values.

According to various embodiments, in a channel having rapidly changing conditions over time, the performance proximate to the optimal estimation technique can be achieved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, the operation principles of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, the following disclosure describes techniques for channel estimation in a wireless communication system.

The terms used in the following description, which refer to, such as, a reference signal, a channel estimate value, an operation of a device, and components of the device, are illustrated for convenience of description. Accordingly, the present disclosure is not limited to the terms which will be described later, and other terms that are equivalent in technical meaning can be used.

Hereinafter, for convenience of explanation, some of the terms and names defined in the 3GPP LTE (3rd Generation Partnership Project Long Term Evolution) specification may be used. However, the present disclosure is not limited to the above terms and names, and may be equally applicable to systems conforming to other standards.

Figure 1:
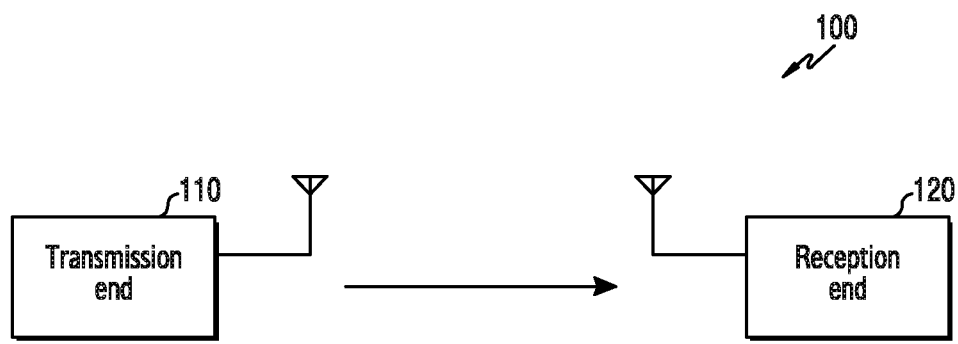
FIG. 1 is schematically illustrates a wireless communication system according to an embodiment of the present disclosure.

FIG. 1 schematically illustrates a wireless communication system 100 according to an embodiment of the present disclosure. Referring to FIG. 1, the wireless communication system 100 includes a transmission end 110 and a reception end 120. Although, in FIG. 1, the transmission end 110 and the reception end 120 are shown as separate entities, the transmission end 110 and reception end 120 can be configured to be a transceiving end for performing both transmission and reception operations. In addition, in FIG. 1, although it is described that the wireless communication system 100 includes only one transmission end 110 and one reception end 120, the wireless communication system 100 can include a plurality of transmission ends 110 and a plurality of reception ends 120.

The transmission end 110 and reception end 120 in FIG. 1 refer to devices that can communicate by transmitting or receiving signals through the wireless network. The transmission end 110 and reception end 120 can be referred to as a mobile station, a user equipment, a subscriber station, a remote terminal, and a wireless terminal. In addition, the transmission end 110 and reception end 120 can be referred to as a base station, an eNB (enhanced NodeB), and an access point (AP). The transmission end 110 and reception end 120 can be a mobile device such as a mobile phone or smartphone, or a stationary device such as a desktop computer.

A wireless communication protocol of FIG. 1 can include cellular communication such as Long Term Evolution (LTE), LTE-Advanced (LTE-A), Wireless Broadband (Wi-Bro), and Global System for Mobile Communication (GSM), and can also include short-range communication such as Wi-Fi, Bluetooth, and Near Field Communication (NFC).

The transmission end 110 and reception end 120 of FIG. 1 can transmit or receive signals by using an orthogonal frequency division multiplexing (OFDM) scheme. In addition, the transmission end 110 and the reception end 120 can transmit or receive signals by using Code Division Multiple Access (CDMA), Frequency Division Multiple Access (FDMA), or Time Division Multiple Access (TDMA).

The transmission end 110 and reception end 120 of FIG. 1 can include a single antenna or a plurality of antennas, and thus transmission or reception techniques such as Multiple-Input Multiple-Output (MIMO), Multiple-Input Single-Output (MISO), Single-Input Multiple-Output (SIMO), or a Single Input Single Output (SISO) can be applied thereto. Hereinafter, for convenience of explanation, the present disclosure will be described with respect to an SISO system where the transmission end 110 and reception end 120 has a single input and output antenna, and a MIMO system. However, the present disclosure is not limited to the SISO system and MIMO system, and can be implemented in various wireless communication systems.

A wireless channel of FIG. 1 is a path through which a signal is transmitted or received. The signal is scattered, reflected, and refracted by means of a scatterer, a reflector, and the like so that the signal can be delayed in a time domain or transmitted through multiple-paths. In addition, under the influence of the Doppler Effect due to the movement of the transmission end 110 or reception end 120, the Doppler shift phenomenon can occur, that is, the frequency of the signal received by the reception end 120 is different from the frequency of the signal transmitted from the transmission end 110. A channel that is changing fast over time can be referred to as a fast fading channel.

Various embodiments of the present disclosure provides a method for selecting an adaptive channel estimation method for a channel that changes fast over time as described above or for a stopped channel.

Figure 2:
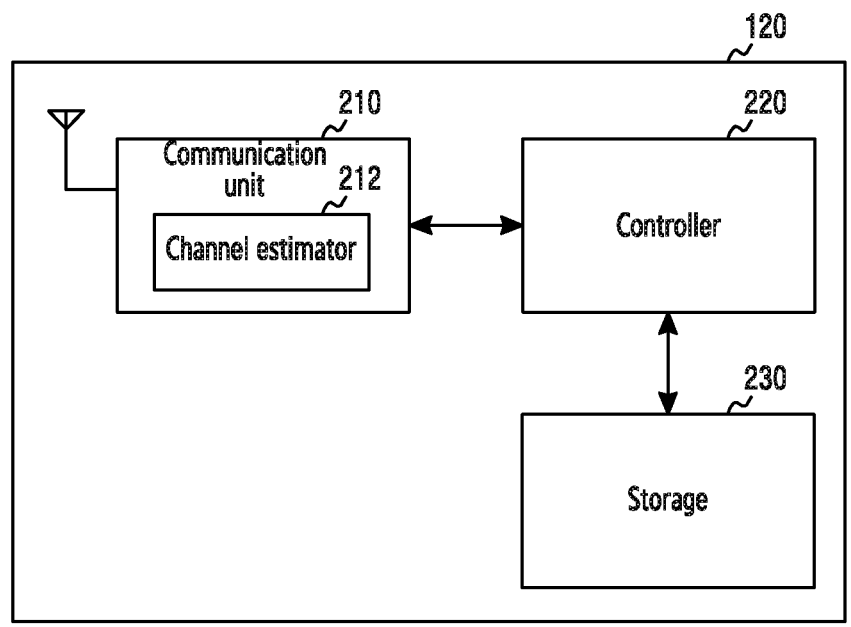
FIG. 2 illustrates a block diagram of a reception end according to an embodiment of the present disclosure.

FIG. 2 illustrates a block diagram of a reception end 120 according to various embodiments of the present disclosure. Terms such as '~ unit', or '~ group' used hereinafter can mean a unit that processes at least one function or operation, which can be implemented as hardware, software, or a combination of hardware and software.

Referring to FIG. 2, the reception end 120 can include a communication unit 210, a controller 220, and a storage 230.

The communication unit 210 can perform functions for receiving signals through a wireless channel, and can be referred to as a transceiver. For example, the communication unit 210 can perform operations including the reception, frequency conversion, demodulation, decoding, and removal of Cyclic Prefix (CP), Fast Fourier Transform (FFT), channel estimation, equalization, etc. of Radio Frequency (RF) signals. In particular, the communication unit 210 can include a channel estimator 212 for estimating a channel for the wireless channel in the wireless communication system 100. In addition, the communication unit 210 can perform a function for transmitting the signal processed by the controller 220 to another node.

The controller 220 controls an overall operation of the reception end 120. For example, the controller 220 receives a signal through the communication unit 210. In addition, the controller 220 controls writing and reading of data to and from the storage 230. To this end, the controller 220 can include at least one of a processor, a microprocessor, or a micro controller, or can be a part of the processor.

The storage 230 stores data such as a basic program, an application program, and setting information for the operation of the reception end 120. For example, the storage 230 performs functions for storing the data processed by the controller 220. The storage 230 can include a volatile memory, a non-volatile memory, or a combination of a volatile memory and a non-volatile memory. For example, the storage 230 can include a random access memory (RAM), a flash memory, and the like.

In FIG. 2, the reception end 120 includes the communication unit 210, the controller 220, and the storage 230. According to another embodiment, the reception end 120 can further include an additional element in addition to the elements described above.

Figure 3:
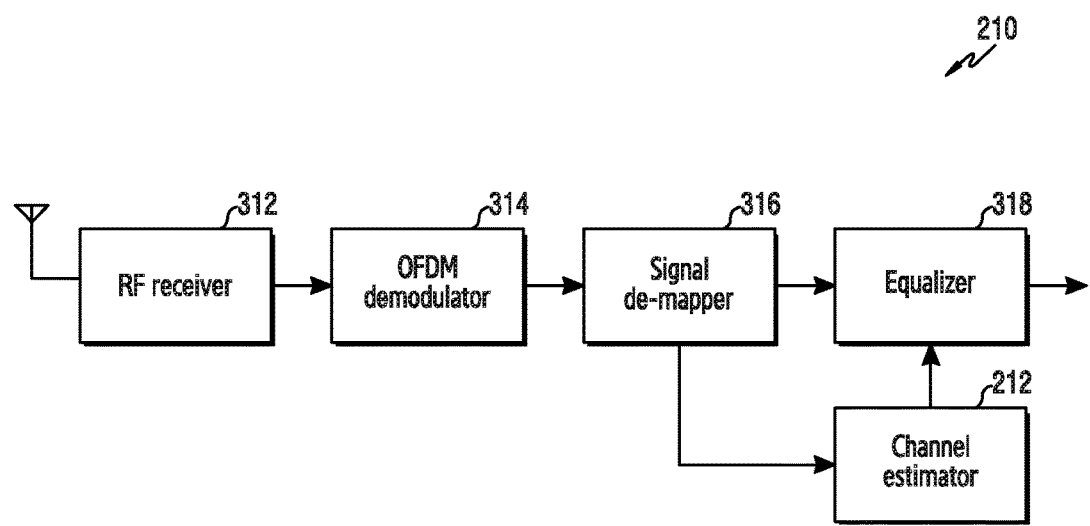
FIG. 3 illustrates a block diagram of a communication unit of a reception end according to an embodiment of the present disclosure.

FIG. 3 shows a block diagram of the communication unit 210 of the reception end 120 according to various embodiments of the present disclosure. Referring to FIG. 3, the communication unit 210 can include an RF receiver 312, an OFDM demodulator 314, a signal de-mapper 316, an equalizer 318, and a channel estimator 212.

The RF receiver 312 can perform a function of receiving an RF signal from a wireless channel. The RF receiver 312 can receive the RF signal through an antenna, and the antenna can be a single or multiple antennas.

The OFDM demodulator 314 can remove a CP inserted at the transmission end 110 and perform an FFT operation thereon. The CP is an additional signal for preventing an interference between signals of the orthogonal frequency in an OFDM system and a frequency orthogonality loss due to a time spread in the wireless channel.

The signal de-mapper 316 can perform a function of de-mapping the signal of the frequency domain output through the OFDM demodulator 314 to an OFDM symbol and a Resource Element (RE).

The equalizer 318 can perform a function of compensating for an error caused by an Inter Symbol Interference (ISI) or channel noise.

The channel estimator 212 can extract a reference signal from the signal de-mapper 316, perform channel estimation using the reference signal, and transmit output data to the equalizer 318. The channel estimator can include an IFFT processor or FFT processor for the channel estimation in a time domain or a frequency domain. The channel estimator can further include a module for extracting a reference signal or a pilot signal.

Although FIG. 3 illustrates the channel estimator 212 and the equalizer 318, separately, according to various embodiments, the channel estimator 212 can be included in the equalizer 318 or perform the same function as the above-mentioned configuration. On the other hand, operations of the communication unit 210 can be performed by the control of the controller 220.

Figure 4:
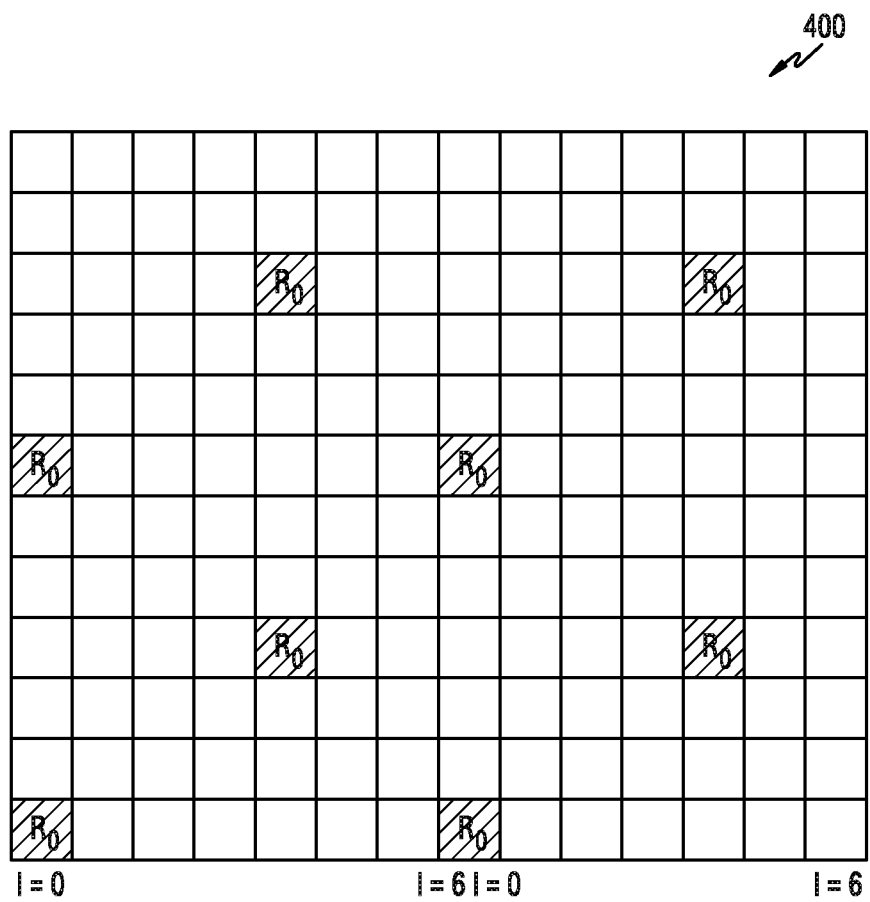
FIG. 4 is a diagram illustrating reference signals of a wireless communication system according to an embodiment of the present disclosure.

FIG. 4 illustrates a position of an RE occupied by a physical resource block (PRB) 400 and a Cell-Reference Signal (CRS) 0 of LTE according to various embodiments of the present disclosure. Hereinafter, for convenience of explanation, it is assumed that the transmission end 110 is a transmission end of the base station, the reception end 120 is a reception end of a user equipment (UE), and the signal transmitted from the transmission end is a downlink (DL) signal. However, the present disclosure is not limited thereto. For example, the present disclosure can be applicable to an LTE uplink sounding signal.

Clusters including a plurality of scatterers or reflectors exist on the wireless channel. To the end, the reception end is to receive a signal transmitted from the transmission end, through multi-path on the wireless channel. Since an LTE DL OFDM symbol has a CP in front of a valid (net) OFDM symbol, when the CP is removed from the reception end and as many samples as the FFT size are used, inter-symbol interference (ISI) can not occur. In LTE, a length of time of 1 ms is defined as one sub-frame, and one sub-frame includes a plurality of physical resource blocks (PRBs). For a general CP type, one PRB includes 14 OFDM symbols in a time domain and includes 12 resource elements (REs) in a frequency domain. Thus, one PRB includes 168 REs.

For the coherent demodulation on the signal received by the reception end 120, the base station uses a cell-specific reference signal (CRS), and each of transmission antenna ports are disjointly associated with the CRS. The LTE standard supports one, two, and four CRS ports. The UE or the reception end 120 can know the number of ports of the base station in a process of demodulating a Physical Broadcast Channel (PBCH). When performing an FFT on the N FFT samples in the time domain taken after removing the CP by the reception end, the reception signal at a specific RE where CRS is assigned in the frequency domain can be obtained. In FIG. 4, the position of the RE occupied by the LTE CRS 0 is shown.

The length of the CP is larger than a maximum delay length of the multi-path signal which a signal experiences in the wireless channel, and for the general CP, among 14 OFDM symbols, the CP length of OFDM symbols #0 and #7 is 5.208 microseconds (us), and the CP length of the remaining OFDM symbols is 4.6865 us. For the system bandwidth of 10 MHz, a chip (FFT sampling) interval corresponds to 65.104 ns, and at this time, the CP lengths of the OFDM symbol correspond to 80 chips and 72 chips, respectively. In a normal outdoor environment or in a wireless channel environment, there is a channel defined as Enhanced Typical Urban (ETU) among multiple channels experienced by the UE. The delay spread value according to the ETU corresponds to 5 us, and the delay spread values of 5 us is shorter than 5.208 us, which is the length of the CP of the OFDM symbols #0 and #7, and is longer than 4.6865 us, which is the length of the CP of the remaining OFDM symbols. The ETU is a channel including nine multi-path channels. That is, the wireless channel has delay spread values within the OFDM CP length and sparse channel taps can be generated in the wireless channel.

The channel experienced by the reception signal is generated by the combination of a transmission filter, a sparse wireless channel, and a reception filter of the base station, and the present document assumes that a channel changes over time within one sub-frame.

Hereinafter, the channel estimation technique in a single-antenna system or the SISO system will be described.

$c_n(l)$, which is the l-th channel tap value at an n time in a reception signal sampled by an analog-to-digital converter (ADC) can be defined by equation (1) as follows:

$$c_n(l) = \frac{1}{\sqrt{\kappa}} \sum_{i=0}^{L_0-1} \sum_{q=l_i}^{l_i+2n_0} a_n(i)g\left(q - n_0 - l_i - \frac{\varepsilon_i}{T_c}\right)\delta_{q-l}, \quad 0 \leq l \leq L-1 \quad (1)$$

Here, $c_n(l)$ denotes the l-th channel tap value at an n time in the reception signal sampled by the analog-to-digital converter (ADC), $L_0$ denotes the number of multi-paths of a sparse wireless channel, $T_c$ denotes chip duration, $a_n(i)$ is a coefficient of i-th path at an n time of the reception signal, and when it is assumed that $\tau_i$ is a delay of i-th path and $0 \leq \tau_0 < \tau_1 < \ldots < \tau_{L_0-1}$, $l_i$, $l_i$ and $\varepsilon_i$ are defined as $l_i = \lfloor(\tau_i - \tau_0)/T_c\rfloor$ and $\varepsilon_i \triangleq (\tau_i - \tau_0) - l_i \cdot T_c$, respectively. When a composite filter including a transmission filter and a reception filter at time t is referred to as $g(t)$, it is assumed that $g(t)$ has the length of $(2n_0+1)T_c$. L is a delay spread value and represented by $L = \lfloor(\tau_{L_0-1} - \tau_0)/T_c\rfloor + 2n_0 + 1$. $\delta_q$ is Kronecker delta. When viewing from an ADC sample space, at an n time, a component contributed by the i-th multi-path to the l l-th channel tap $h_n(l)$ is $a_n(i) \cdot g(l - n_0 - l_i - \varepsilon_i/T_c)$ when q=l, from $q = l_i, \ldots, l_i + 2n_0$. When $$\sum_{i=0}^{L_0-1} E[|a_n(i)|^2] = 1$$

is satisfied with equation (1), k is a constant satisfying equation (2) defined as follows:

$$\sum_{l=0}^{L-1} E[|c_n(l)|^2] = 1 \qquad (2)$$

Here, E is an expectation value, $c_n(l)$ denotes the l-th channel tap value at an n time in a reception signal sampled by the ADC, and L is a delay spread value.

In equation (1), $h_n(l)$ denotes a linear superposition thereof, so when vector $c_n$ and $a_n$ are defined as $c_n \triangleq [c_n(0) \ldots c_n(L-1)]^T \in \mathbb{C}^{L \times 1}$ and $a_n \triangleq [a_n(0) \ldots a_n(L_0-1)]^T \in \mathbb{C}^{L_0 \times 1}$, $c_n$ can be defined by equation (3) as follows:

$$c_n = \Xi a_n \qquad (3)$$

Here, $\Xi \in \mathbb{C}^{L \times L_0}$ denotes a leakage matrix and denotes a matrix satisfying the equation (1). Here, the superscript T denotes a transpose.

The reception signal is transmitted to the reception antenna of the user equipment from the transmission antenna of the base station, in RE k in the OFDM symbol m, (m= 0, ..., 13) where a CRS of sub-frame s is located. Since both the base station and the UE know the CRS value, $y_{s,m}(k)$, which is the value obtained by dividing the reception signal into the CRS value, can be defined by equation (4) as follows:

$$y_{s,m}(k) = \sum_{l=0}^{L-1} h_{s,m}(l) e^{-j2\pi kl/N} + z_{s,m}(k) \qquad (4)$$

Here, $y_{s,m}(k)$ is a signal obtained by dividing the reception signal into the CRS value, $z_{s,m}(k)$ is a noise signal at the RE k in the n-th OFDM signal where the CRS is located. The variance of the noise signal $z_{s,m}(k)$ is defined by $\sigma_z^2$. L is a delay spread value. When it is assumed that the channel does not change during one OFDM symbol duration, $h_{s,m}(l)$ is a value obtained by sampling the channel tap value $c_n(l)$ for each OFDM symbol m. In FIG. 4, m=0,4,7,11 is the OFDM symbol where the CRS is located. It is assumed that the total number of REs occupied by the CRS in an OFDM symbol m is $N_{CRS}$, $z_{s,m} \in \mathbb{C}^{N_{CRS} \times 1}$ is referred to as a vector which lists, in ascending order, noise of a frequency domain where the CRS is located in the OFDM symbol m of the reception antenna, and $y_{s,m} \in \mathbb{C}^{N_{CRS} \times 1}$ is referred to as a vector which lists, in ascending order, reception signals of a frequency domain where the CRS is located in the OFDM symbol m received by the reception end. Here, since the reception end can not accurately know L, a typical channel delay spread value is assumed to be the maximum CP length $N_{CP}$, and in consideration of an additional delay spread value by the transmission and reception filters, L is defined by equation (5) as follows:

$$L = N_{CP} + 2n_0 + 1 \qquad (5)$$

Here, L is the delay spread value, $N_{CP}$ is a maximum CP length, and $2n_0+1$ is an additional delay spread value by the transmission and reception filters.

When a channel impulse response (CIR) vector is defined as $h_{s,m} \triangleq [h_{s,m}(0) \ldots h_{s,m}(L-1)]^T \in \mathbb{C}^{L \times 1}$, the reception signal vector can be represented by equation (6) as follows:

$$y_{s,m} = F_m h_{s,m} + z_{s,m} \qquad (6)$$

Here, $y_{s,m}$ is a reception signal vector, $h_{s,m}$ is a CIR vector, and $z_{s,m}$ is a noise vector, and when F is assumed to be a matrix having an entry of u-th row and u'-th column (u, u'= 0, ..., N-1) as $e^{-j2\pi uu'/N}$, $F_m$ is to be referred to as a submatrix including row vectors and column vectors formed from column vector 0 to column vector L-1 of F corresponding to a subcarrier index of the RE where the CRS is located in the OFDM symbol m, and the size of the $F_m$ is $N_{CRS} \times L$. According to FIG. 4, the number of OFDM symbols where CRS 0 is present is four, and when considering sub-carrier index of the RE occupied by CRS 0, it can be represented by equation (7) and equation (8) as follows:

$$F_0 = F_7 \qquad (7)$$

$$F_4 = F_{11} \qquad (8)$$

Figure 5:
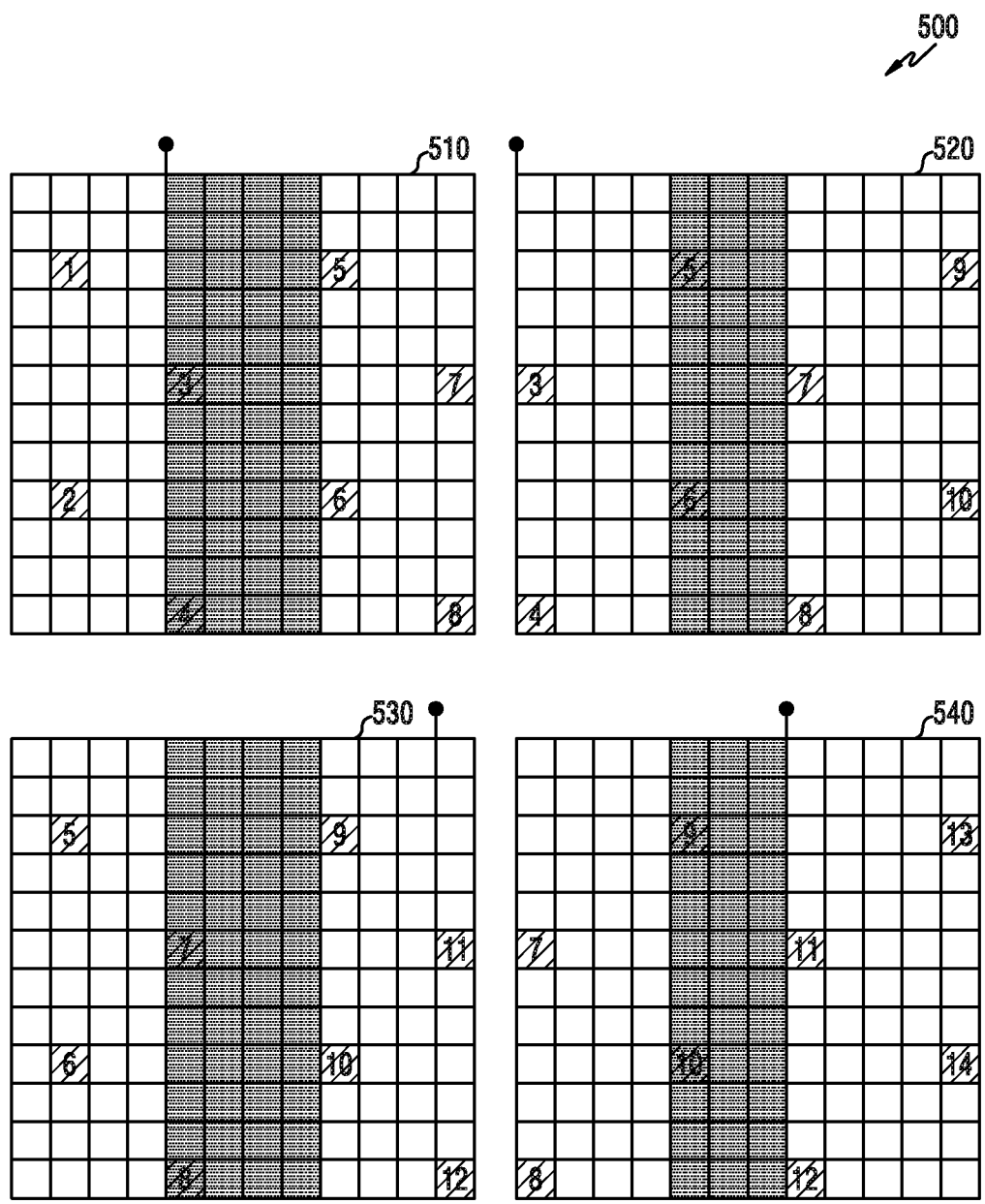
FIG. 5 is a diagram illustrating a CRS pattern used for channel estimation according to an embodiment of the present disclosure.

FIG. 5 shows a CRS pattern used for channel estimation according to an embodiment of the present disclosure. In FIG. 5, a sub-frame can be divided into four intervals. For example, one sub-frame can be divided into a shaded portion in each of grids 510 to 540 of FIG. 5. A line protruding from the top of each region means a boundary of the sub-frame. In the grid 510 of FIG. 5, when it is assumed that four OFDM symbols of the shaded portion are located in the sub-frame, reception REs indicated by hatching where the CRS is located are used for the channel estimation, and the sub-frame and a symbol index are. In the grid 520 of FIG. 5, when it is assumed that three OFDM symbols of the shaded portion are located in the sub-frame, REs indicated by hatching where the CRS is located are used for the channel estimation, and the sub-frame and a symbol index are. In the grid 530 of FIG. 5, when it is assumed that four OFDM symbols of the shaded portion are located in the sub-frame, REs indicated by hatching where the CRS is located are used for the channel estimation, and the sub-frame and a symbol index are. In the grid 540 of FIG. 5, when it is assumed that three OFDM symbols of the shaded portion are located in the sub-frame, REs indicated by hatching where the CRS is located are used for the channel estimation, and the sub-frame and a symbol index are. In FIG. 5, the RE where the CRS is located is measured for channel estimation, by allowing for the delay of up to seven OFDM symbols with reference to the first OFDM symbol in the shaded portion, and FIG. 5 is merely an example. Accordingly, a larger symbol delay according to various embodiments can be allowed, and the present disclosure can be applied thereto.

In order to estimate a channel for the shaded portion in the sub-frame s, a reception signal vector y obtained by dividing the reception signal at the RE where the CRS is located into the CRS value can be defined by equation (9) as follows:

$$y = \Phi h + z \qquad (9)$$

Here, y is a reception signal vector, $\Phi$ is the system matrix, h is a channel vector, and z z is a noise vector.

For the grids 510 and 530 of FIG. 5, $\Phi$ can be represented by equation (10) as follows:

$$\Phi \triangleq \begin{bmatrix} F_4 & & & \\ & F_0 & & \\ & & F_4 & \\ & & & F_0 \end{bmatrix} \in \mathbb{C}^{4N_{CRS} \times 4L} \qquad (10)$$

Here, $\Phi$ is a system matrix, and when F is assumed to be a matrix having an entry of u-th row and u'-th column (u, u'=0, ..., N-1) as $e^{j2\pi uu'/N}$, $F_m$ is to be referred to as a submatrix including row vectors and column vectors formed from column vector 0 to column vector L-1 of F corresponding to subcarrier index of the RE where the CRS is located in the OFDM symbol m.

For the grids 520 and 540 of FIG. 5, Φ can be represented by equation (11) as follows:

$$\Phi \triangleq \begin{bmatrix} F_0 & & & \\ & F_4 & & \\ & & F_0 & \\ & & & F_4 \end{bmatrix} \in \mathbb{C}^{4N_{CRS} \times 4L} \quad (11)$$

Here, Φ is a system matrix, and when F is assumed to be a matrix having an entry of u-th row and u'-th column (u, u'=0, . . . , N−1) as $e^{j2\pi u u'/N}$, $F_m$ is to be referred to as a submatrix including row vectors and column vectors formed from column vector 0 to column vector L−1 of F corresponding to subcarrier index of the RE where the CRS is located in the OFDM symbol m.

For the shaded portion of the grid 510 of FIG. 5, the signal vector y, the channel response vector h, and the noise vector z can be defined by equation (12) to equation (14) as follows:

$$y \triangleq [y_{s-1,11}{}^T, y_{s,0}{}^T, y_{s,4}{}^T, y_{s,7}{}^T]^T \in \mathbb{C}^{4N_{CRS} \times 1} \quad (12)$$

$$h \triangleq [h_{s-1,11}{}^T, h_{s,0}{}^T, h_{s,4}{}^T, h_{s,7}{}^T]^T \in \mathbb{C}^{4L \times 1} \quad (13)$$

$$z \triangleq [z_{s-1,11}{}^T, z_{s,0}{}^T, z_{s,4}{}^T, z_{s,7}{}^T]^T \in \mathbb{C}^{4N_{CRS} \times 1} \quad (14)$$

For the shaded portion shown in the grid 520 of FIG. 5, the signal vector y, the channel response vector h, and the noise vector z can be defined by equation (15) to equation (17) as follows:

$$y \triangleq [y_{s,0}{}^T, y_{s,4}{}^T, y_{s,7}{}^T, y_{s,11}{}^T]^T \in \mathbb{C}^{4N_{CRS} \times 1} \quad (15)$$

$$h \triangleq [h_{s,0}{}^T, h_{s,4}{}^T, h_{s,7}{}^T, h_{s,11}{}^T]^T \in \mathbb{C}^{4L \times 1} \quad (16)$$

$$z \triangleq [z_{s,0}{}^T, z_{s,4}{}^T, z_{s,7}{}^T, z_{s,11}{}^T]^T \in \mathbb{C}^{4N_{CRS} \times 1} \quad (17)$$

For the shaded portion shown in the grid 530 of FIG. 5, the signal vector y, the channel response vector h, and the noise vector z can be defined by equation (18) to equation (20) as follows:

$$y \triangleq [y_{s,4}{}^T, y_{s,7}{}^T, y_{s,11}{}^T, y_{s+1,0}{}^T]^T \in \mathbb{C}^{4N_{CRS} \times 1} \quad (18)$$

$$h \triangleq [h_{s,4}{}^T, h_{s,7}{}^T, h_{s,11}{}^T, h_{s+1,0}{}^T]^T \in \mathbb{C}^{4L \times 1} \quad (19)$$

$$z \triangleq [z_{s,4}{}^T, z_{s,7}{}^T, z_{s,11}{}^T, z_{s+1,0}{}^T]^T \in \mathbb{C}^{4N_{CRS} \times 1} \quad (20)$$

For the shaded portion shown in the grid 540 of FIG. 5, the signal vector y, the channel response vector h, and the noise vector z can be defined by equation (21) to equation (23) as follows:

$$y \triangleq [y_{s,7}{}^T, y_{s,11}{}^T, y_{s+1,0}{}^T, y_{s+1,4}{}^T]^T \in \mathbb{C}^{4N_{CRS} \times 1} \quad (21)$$

$$h \triangleq [h_{s,7}{}^T, h_{s,11}{}^T, h_{s+1,0}{}^T, h_{s+1,4}{}^T]^T \in \mathbb{C}^{4L \times 1} \quad (22)$$

$$z \triangleq [z_{s,7}{}^T, z_{s,11}{}^T, z_{s+1,0}{}^T, z_{s+1,4}{}^T]^T \in \mathbb{C}^{4N_{CRS} \times 1} \quad (23)$$

The channel frequency response (CFR) of the RE k of the OFDM symbols m for the shaded portions shown in the grids 510, 520, 530 and 540 of FIG. 5 can be defined as equation (24) as follows:

$$\eta_{s,m}(k) = \sum_{l=0}^{L-1} h_{s,m}(l) e^{j2\pi k l/N} \quad (24)$$

Here, $\eta_{s,m}(k)$ denotes a CFR in the RE k of the OFDM symbol m, and $h_{s,m}(l)$ is a value obtained by sampling the channel tap value $c_n(l)$ for each OFDM symbol m.

According to various embodiments of the present disclosure, an estimation value of the CFR $\eta_{s,m}(k)$ can be obtained by using a linear minimum mean square error (LMMSE) method and can be represented by equation (25) as follows:

$$\begin{aligned}\hat{\eta}_{s,m}(k) &= E[\eta_{s,m}(k) y^H](E[y y^H])^{-1} y \\ &= E[\eta_{s,m}(k) h^H]\Phi^H (\Phi E[h h^H]\Phi^H + \sigma_z^2 I_{4N_{CRS}})^{-1} y\end{aligned} \quad (25)$$

Here, $\eta_{s,m}(k)$ denotes the CFR, $\hat{\eta}_{s,m}(k)$ denotes the CFR estimation value, IE denotes an expected value, y denotes the signal vector, Φ denotes a system matrix, $I_{4N_{CRS}}$ denotes an Identity matrix having the size of $4N_{CRS}$, $\sigma_z^2$ denotes the dispersion of the noise signal $z_{s,m}(k)$, and H of superscript matrix denotes the complex conjugate and transpose.

As described above, the channel response vector h is a sparse matrix having a sparse channel tap. The estimation value of the CFR using the LMMSE method of equation (25) can imply that the receiver knows the position of a non-zero entry of the channel response vector h. Here, the non-zero entry of the channel response vector h can be referred to as a support of h.

The real reception end can not know what the transmission filter of the base station is or how it is configured. In addition, the real reception end has difficultly in knowing the exact position of the support for the channel tap in a noisy environment, and in the case of the LMMSE estimator, it is required to know a second moment value of the channel in order to obtain the estimation value. Therefore, a channel estimator which is easily implemented in a modem of the real reception end can be required.

Figure 6A:
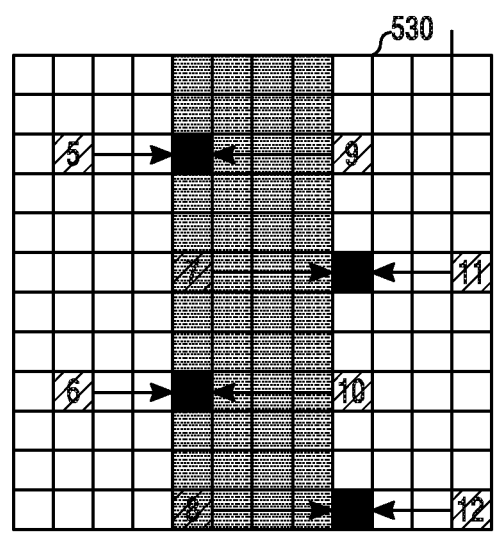
FIG. 6A is a diagram illustrating a reference signal-based channel estimation method according to an embodiment of the present disclosure.

FIG. 6A illustrates an inverse discrete Fourier transform (IDFT) based channel estimation using Reference Signal Time Domain Interpolation (RSTI) according to various embodiments of the present disclosure. In FIG. 6A, the grid 530 of FIG. 5 is shown as an example, and it can be applied to an extended sub-frame as well as the case of grids 510 to 540 of FIG. 5. In FIG. 6A, information on the channel of the RE indicated by a black color can be obtained by linearly interpolating two descrambled signals located at adjacent REs in a time-axis. The reception signals located at REs arranged in intervals of three sub-carriers are converted into time domain signals and the channel estimation for the same is performed. After performing noise cancellation, the estimation value of the CFR is obtained by converting the CIR estimation value into the frequency domain value. The estimation value of the CFR of the OFDM symbol where the CRS is not located is obtained by linearly interpolating the estimation values of two adjacent CFRs.

Figure 6B:
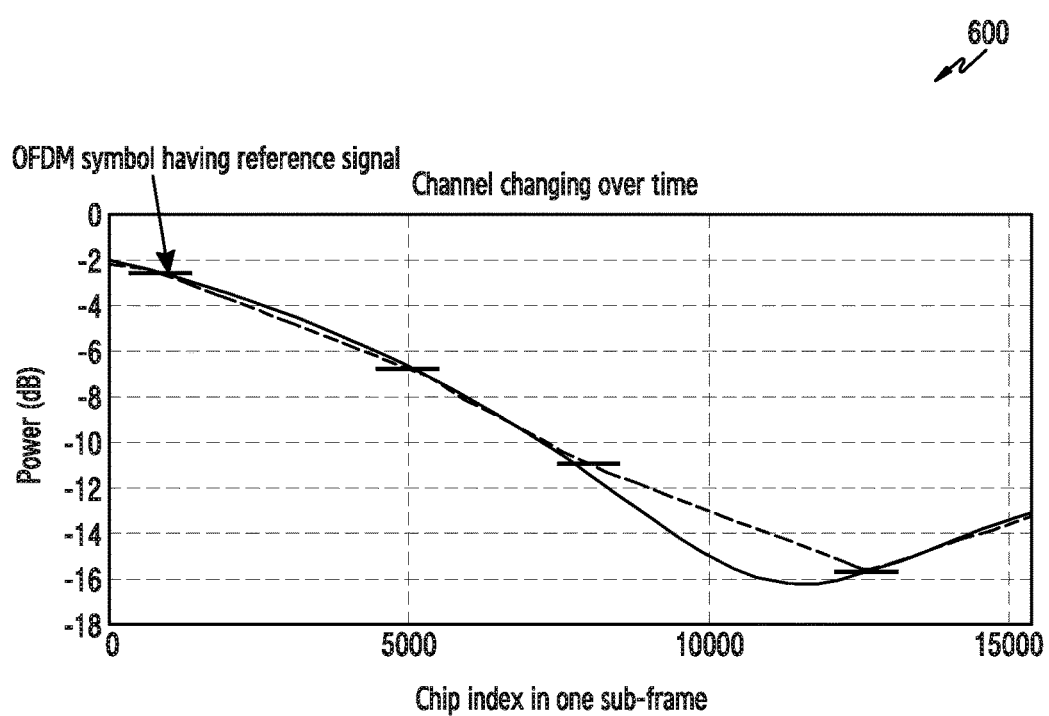
FIG. 6B is a diagram illustrating an implementation of a channel changing over time and a channel estimation value by linear interpolation according to an embodiment of the present disclosure.

FIG. 6B shows an implementation of the channel that changes over time and a channel estimation value obtained by linear interpolation according to various embodiments of the present disclosure. FIG. 6B follows a Jake's model, and assumes a Doppler frequency of 300 Hertz (Hz). The 300 Hz Doppler frequency corresponds to an environment having a movement of 120.4 kilometer per hour (km/h) in 2.69 GHz band communication. In FIG. 6B, the horizontal axis indicates a time, and one sample refers to the chip duration for the sub-frame. In FIG. 6B, the vertical axis refers to the power on a decibel (dB) scale. The horizontal solid line denotes the OFDM symbol interval for which the CRS or the reference signal is included, and the CRS does not exist in the OFDM symbol between horizontal solid lines. The curved solid line represents the power over time based on the above channel model. The dotted line represents a result of linear interpolation between the OFDM symbols in which the CRS exists by using the IFFT-based channel estimation method using a RSTI. That is, the dotted line represents a result of channel estimation after assuming that the channel is linearly changed, and a power difference up to 2 dB between the dotted line and the solid line can occur. Thus, for a channel that changes fast over time, a method for complicated channel estimation is required.

First, when the stop channel is assumed, the equation of a system is defined by equation (26) as follows:

$$y = \Phi h + z \quad (26)$$

Here, y is a reception signal vector, $\Phi$ is the system matrix, h is a channel vector, and z is a noise vector.

Here, for the grids 510 and 530 of FIG. 5, the system matrix $\Phi$ can be represented by equation (27) as follows:

$$\Phi \triangleq \begin{vmatrix} F_4 \\ F_0 \\ F_4 \\ F_0 \end{vmatrix} \in \mathbb{C}^{4N_{CRS} \times L} \quad (27)$$

Here, $\Phi$ is a system matrix, and when F is assumed to be a matrix having an entry of u-th row and u'-th column (u, u'=0, ..., N−1) as $e^{j2\pi uu'/N}$, $F_m$ is to be referred to as a submatrix including row vectors and column vectors formed from column vector 0 to column vector L−1 of F corresponding to subcarrier index of the RE where the CRS is located in the OFDM symbol m.

In addition, for the grids 520 and 540 of FIG. 5, the system matrix $\Phi$ can be represented by equation (28) as follows:

$$\Phi \triangleq \begin{vmatrix} F_4 \\ F_0 \\ F_4 \\ F_0 \end{vmatrix} \in \mathbb{C}^{4N_{CRS} \times L} \quad (28)$$

Here, $\Phi$ is a system matrix, and when F is assumed to be a matrix having an entry of u-th row and u'-th column (u, u'=0, ..., N−1) as $e^{j2\pi uu'/N}$, $F_m$ is to be referred to as a submatrix including row vectors and column vectors formed from column vector 0 to column vector L−1 of F corresponding to subcarrier index of the RE where the CRS is located in the OFDM symbol m.

The channel vector h is defined by equation (29) as follows:

$$h \triangleq [h(0) \ldots h(L-1)]^T \in \mathbb{C}^{L \times 1} \quad (29)$$

For the grid 510 of FIG. 5, y and z can follow equation (12) and equation (14), respectively, for the grid 520 of FIG. 5, y and z can follow equation (15) and equation (17), respectively, for the grid 530 of FIG. 5, y and z can follow equation (18) and equation (20), respectively, and for the grid 540 of FIG. 5, y and z can follow equation (21) and equation (23), respectively.

Figure 7:
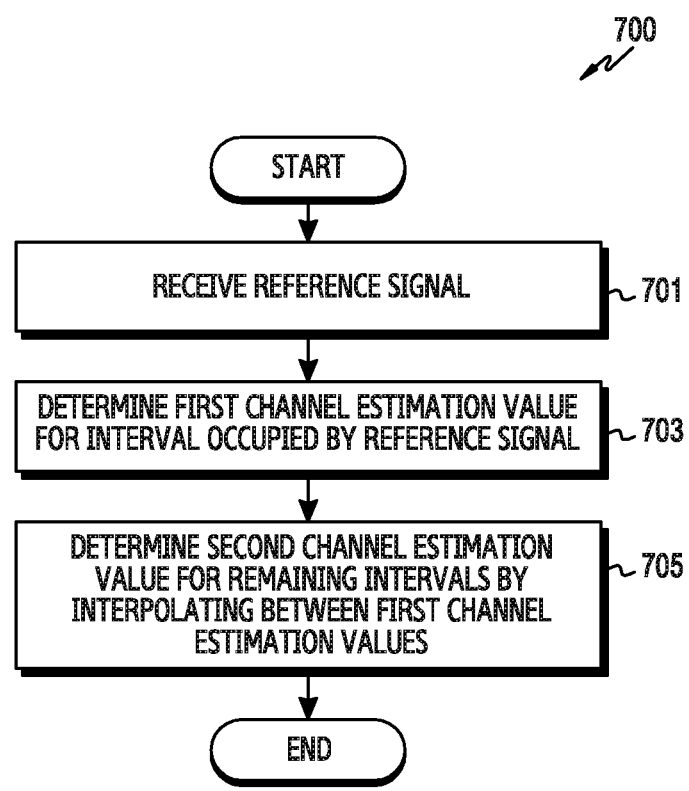
FIG. 7 is a flow chart illustrating a channel estimation method using a reference signal according to an embodiment of the present disclosure.

FIG. 7 is a flow chart 700 illustrating a channel estimation method using a reference signal according to various embodiments of the present disclosure. FIG. 7 is an illustration of an operation method for the reception end 120.

Referring to FIG. 7, the reception end 120 receives the reference signal in step 701. Here, the reference signal can be a signal shared by the transmission end 110 and the reception end 120, can refer a signal transmitted from the transmission end 110 to the reception end, and can be referred to as a pilot signal, a pilot tone, and a reference signal as well as the CRS.

In step 703, the reception end 120 can perform channel estimation for the interval occupied by the reference signal and determine the first channel estimation value. The first channel estimation value can be calculated by dividing the reference signal received by the reception end into the reference signal value (for example, CRS value) shared by the transmission end and the reception end. The channel estimation value can denote a channel vector or an estimation value of an entry of the channel vector, as used herein.

The reception end 120 determines a second channel estimation value by interpolating, for the remaining intervals where the reference signal is not present, between the first channel estimation values based on the time axis, in step 705. That is, the reception end 120 calculates second channel estimation values for areas other than areas including the reference signal by interpolating between the first channel estimation values. The channel estimation performed in step 703 or step 705 can be performed by using an orthogonal matching pursuit (OMP) algorithm, a stagewise OMP (StOMP) algorithm, a compressive sampling matching pursuit (CoSaMP) algorithm, and the like. A method for interpolating between first channel estimation values includes, a method for implementing interpolation of two adjacent estimation values with a mean value, interpolation of two adjacent estimation values with a straight line, and interpolation of two adjacent estimation values with a straight line or a curve by using a multidimensional function.

In step 705, the reception end 120 can determine a channel estimation value by interpolating between the first channel estimation values using a basis expansion model (BEM). The BEM represents a channel that changes on time axis as a product of at least one basis and at least one coefficient. For the BEM, the Legendre Polynomial (LP) having a polynomial form can be used.

An interpolation method used in step 705 can be determined based on the Doppler frequency according to the movement speed of the reception end 110 or the transmission end 120, or channel quality (e.g., signal-to-noise ratio (SNR) or carrier to noise ratio (CNR)). The interpolation method can be different according to the selection of a basis to be used for estimation of a channel variation pattern. In other words, the interpolation method can be different depending on the selection of a basis from among a plurality of basis. For example, the plurality of basis can include a first basis representing a constant value, a second basis representing a linear change, that is, a primary equation, and a third basis representing a change of a curved form, that is, a quadratic equation or more. When the LP BEM is used, the number of BEM basis can be selected according to the movement speed or SNR.

Figure 8:
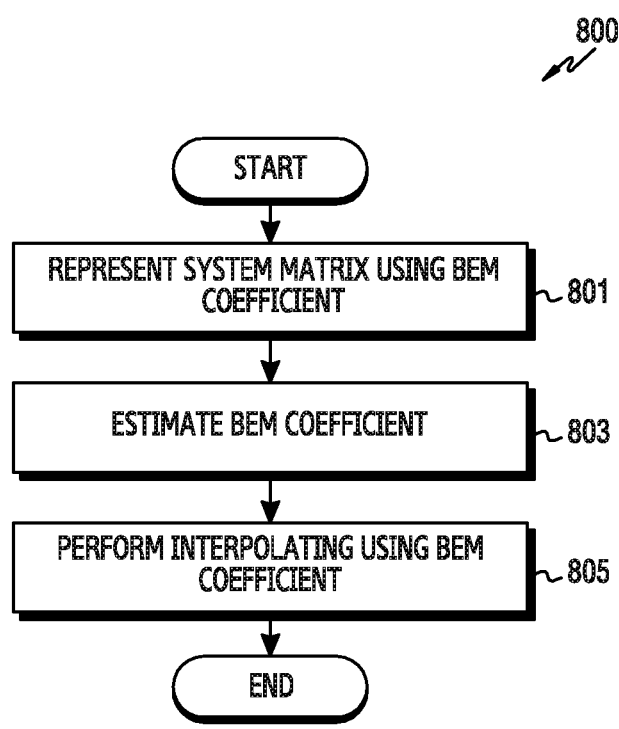
FIG. 8 is a flow chart illustrating a channel estimation method using a Basis Expansion Model (BEM) according to an embodiment of the present disclosure.

FIG. 8 is a flow chart 800 illustrating a channel estimation method using a BEM according to various embodiments of the present disclosure. The flow chart 800 of FIG. 8 can be included as a part thereof in step 701 to step 705 of FIG. 7, or can be further included in the step 701 to step 705.

Referring to FIG. 8, in step 801, the reception end represents a system matrix used for the channel estimation by reconfiguring the same using a vector including BEM coefficients. Specifically, the channel vector can be reconfigured as the product of a BEM basis vector and coefficients for each basis, and a new system matrix can be represented as the product of the old system matrix and the basis vectors. In step 803, the reception end estimates the BEM coefficients used to represent the new system matrix in step 801. The estimation of a BEM coefficient can be performed through the StOMP algorithm or a block StOMP algorithm. In step 805, the reception end performs the channel estimation for an area where the reference signal is not received, using the BEM coefficient estimated in step 803. The interpolation is performed between areas where the reference signals are received, by using the estimated BEM coefficient and a basis that corresponds to each basis, so that the channel estimation for the remaining intervals can be performed. Here, the number of basis can be determined by the movement speed of the reception end or an instantaneous SNR.

Figure 9:
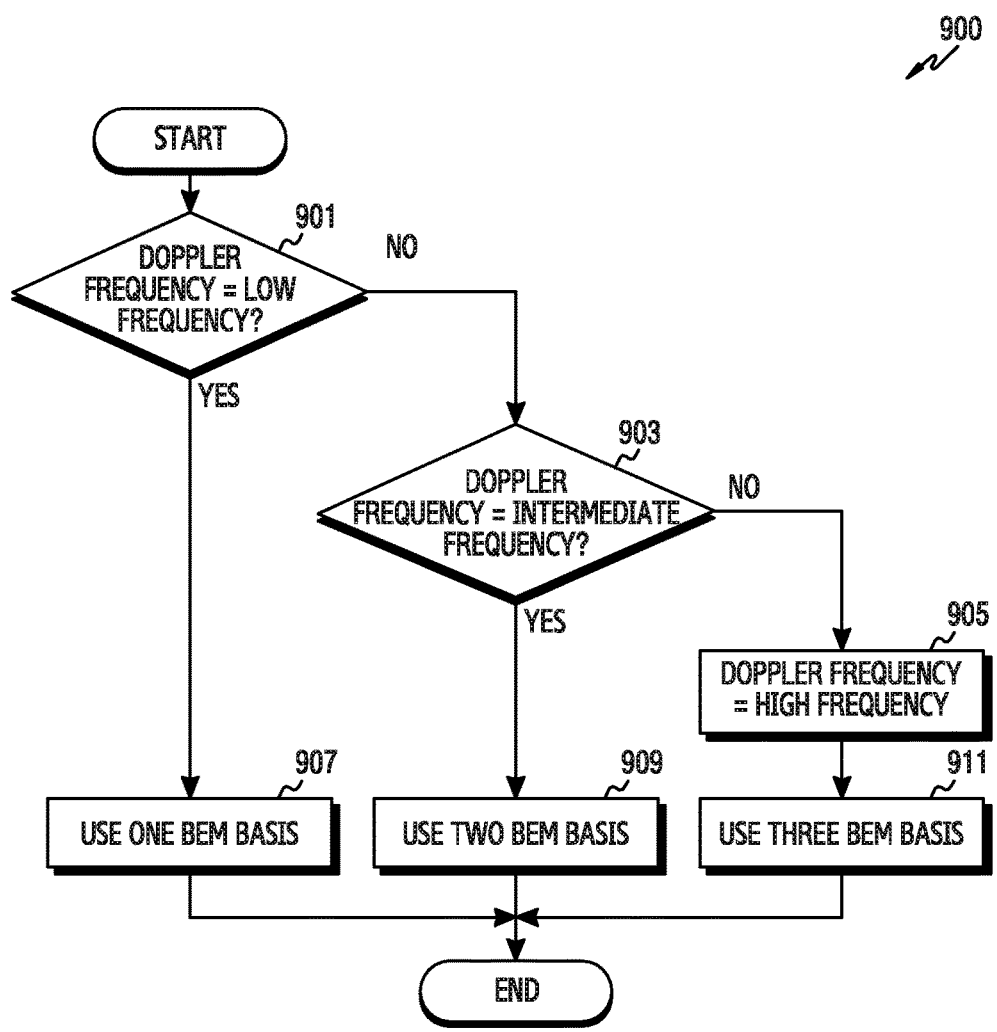
FIG. 9 is a flow chart illustrating that the number of BEMs are adaptively selected depending on a movement speed according to an embodiment of the present disclosure.

FIG. 9 is a flow chart 900 illustrating that the number of BEMs is adaptively selected according to the movement speed of the reception end according to various embodiments of the present disclosure. The movement speed of the reception end can be measured using a Doppler detector.

The instantaneous SNR can be defined as an average value of SNRs of OFDM symbols occupied by the CRS that is used for channel estimation in one sub-frame, and can be defined by using an IIR (infinite impulse response) filter or FIR (finite impulse response) filter output of SNRs of OFDM symbols which are received through multiple sub-frames and have CRS therein.

According to the Doppler frequency due to the movement of the reception end, a method of channel estimation for an area where the reference signal is not present can be different. In an embodiment, when the interpolation is performed between channel estimation values for an area where the reference signal is present, the average value between the channel estimation values, a linear interpolation method and a curve interpolation method are determined according to the movement speed. When the channel estimation is performed by applying the BEM method, the degree of the polynomial can be selected based on the number of BEM basis or the polynomial type BEM.

According to an embodiment of FIG. 9 using a Legendre polynomial (LP) BEM which will be described in detail below, the reception end 102 determines whether the Doppler frequency is a low frequency, in step 901. When the Doppler frequency is a low frequency, in step 907, the reception end 102 determines a single BEM basis $\psi_0^{LP}(m)$ to be used. When the Doppler frequency is not a low frequency, in step 903, the reception end 102 determines whether the Doppler frequency is an intermediate frequency. When the Doppler frequency is an intermediate frequency, in step 909, the reception end 102 determines two BEM basis of $\psi_0^{LP}(m)$ and $\psi_1^{LP}(m)$ to be used. When the Doppler frequency is not an intermediate frequency, in step 905, the reception end 102 determines the Doppler frequency as a high frequency, and in step 911, the reception end 102 determines three BEM basis of $\psi_0^{LP}(m)$, $\psi_1^{LP}(m)$, and $\psi_2^{LP}(m)$ to be used.

Although FIG. 9 has been illustrated that up to three BEM basis are being used, three or more BEM basis according to an embodiment can be used.

Figure 10:
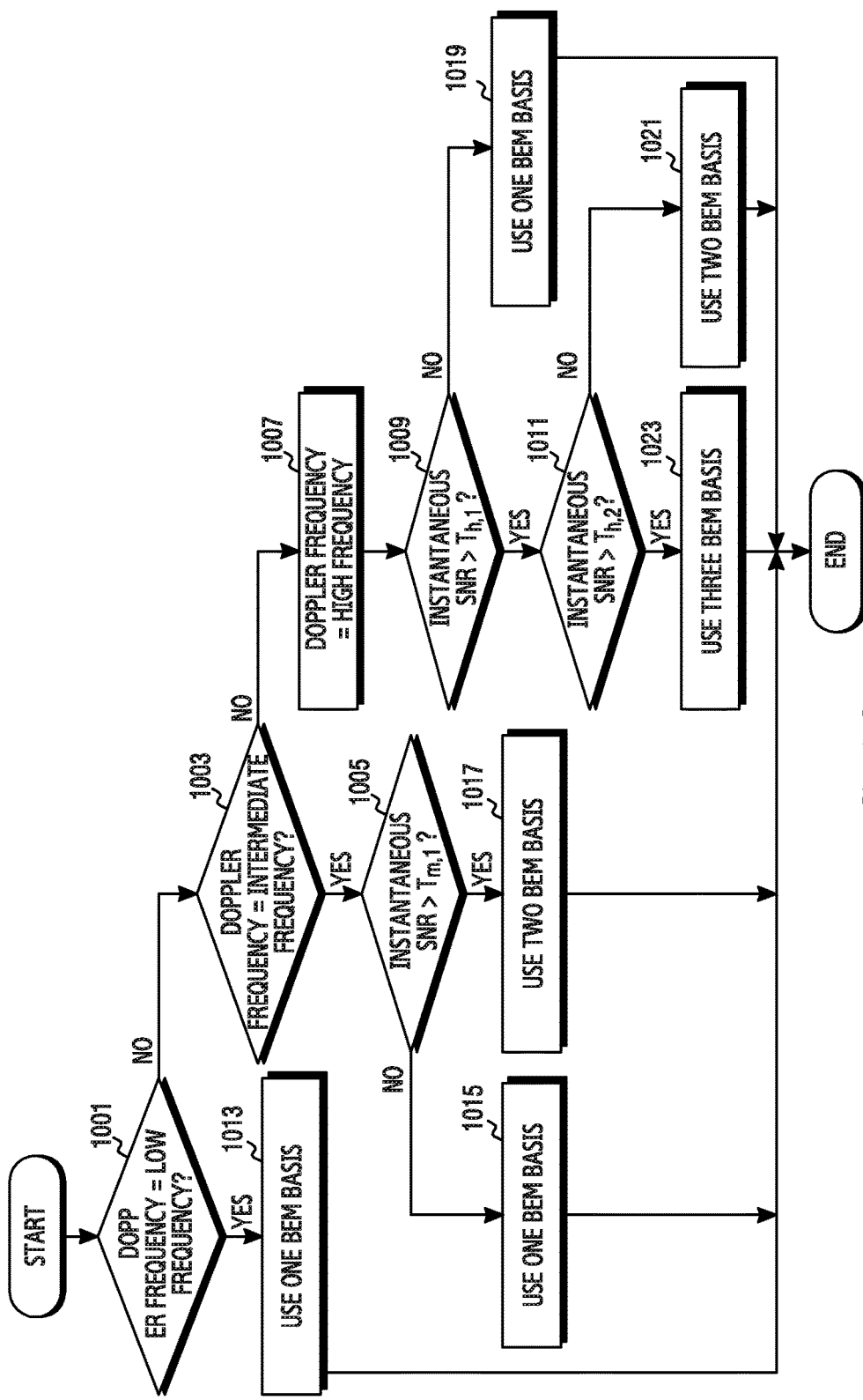
FIG. 10 is a flow chart illustrating that the number of BEMs are adaptively selected according to an embodiment of the present disclosure.

FIG. 10 is a flow chart 1000 illustrating that the number of BEMs is adaptively selected according to the movement speed and the instantaneous SNR according to various embodiments of the present disclosure. The reception end 120 can use the Doppler detector and the SNR measurement device for measuring the Doppler frequency and SNR.

A method of channel estimation for an area where the reference signal is not present can be different according to the Doppler frequency and the instantaneous SNR. According to the embodiment, when the interpolation between channel estimation values for an area in which the reference signal is located is performed, the average value between the channel estimation values, a linear interpolation method, and a curve interpolation method can be determined according to the movement speed and the instantaneous SNR. When the channel estimation is performed by applying the BEM method, the degree of the polynomial can be selected based on the number of BEM basis or the polynomial type BEM.

According to an embodiment of FIG. 10 which will be described in detail below using LP BEM, in step 1001, the reception end 120 determines whether the Doppler frequency is a low frequency. When the reception end 120 determines that the Doppler frequency is a low frequency, in step 1013, the reception end 120 determines a single BEM basis $\psi_0^{LP}(m)$ to be used. When the reception terminal 120 determines that the Doppler frequency is not a low frequency, in step 1003, the reception end 120 determines whether the Doppler frequency is an intermediate frequency. When the reception end 120 determines that the Doppler frequency is an intermediate frequency, in step 1005, the reception end 120 compares a reference value (a threshold value) $T_{m,1}$ with the instantaneous SNR, which is measured at the slot or sub-frame rate. When the reception end 120 determines that the instantaneous SNR is greater than the threshold value $T_{m,1}$, in step 1017, the reception end 120 determines two BEM basis of $\psi_0^{LP}(m)$ and $\psi_1^{LP}(m)$ to be used. When the reception end 120 determines that the instantaneous SNR is equal to or smaller than the specific value $T_{m,1}$, the reception end 120 determines a single BEM basis $\psi_0^{LP}(m)$ to be used. In step 1003, when the reception end 120 determines that the Doppler frequency is not an intermediate frequency, the reception end 120 determines that the Doppler frequency is a high frequency, and in step 1009, the reception end 120 compares the specific threshold value $T_{h,1}$ with the instantaneous SNR. When the reception end 120 determines that the instantaneous SNR is equal to or smaller than $T_{h,1}$, in step 1019, the reception end 120 determines a single BEM basis $\psi_0^{LP}(m)$ to be used. In step 1009, when the reception end 120 determines that the instantaneous SNR is greater than $T_{h,1}$, in step 1011, the reception end 120 compares a specific threshold value $T_{h,2}$ with the instantaneous SNR. When the reception end 120 determines that the instantaneous SNR is equal to or smaller than a specific threshold value $T_{h,2}$, in step 1021, the reception end 120 determines two BEM basis of $\psi_0^{LP}(m)$ and $\psi_1^{LP}(m)$ to be used. When the reception end 120 determines that the instantaneous SNR is greater than $T_{h,2}$, in step 1023, the reception end 120 determines three BEM basis of $\psi_0^{LP}(m)$, $\psi_1^{LP}(m)$, and $\psi_2^{LP}(m)$ to be used.

Although FIG. 10 has been illustrated that up to three BEM basis are being used according to various embodiments, the four or more BEM basis can be used.

Figure 11:
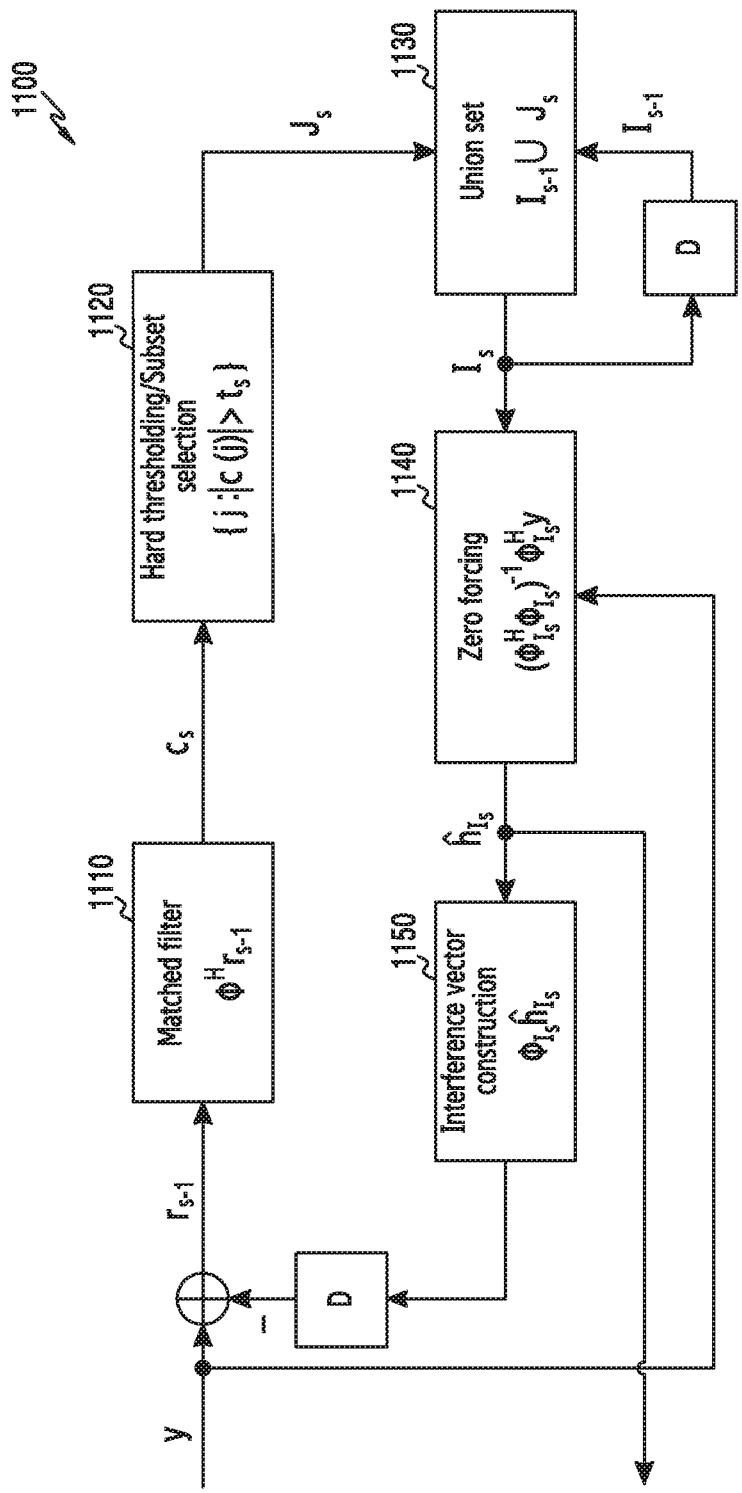
FIG. 11 illustrates a Stagewise Orthogonal Matching Pursuit (StOMP) algorithm 1100 according to various embodiments of the present disclosure.

FIG. 11 illustrates an StOMP algorithm according to various embodiments of the present disclosure. As described above, since the channel vector h is a sparse vector, a recovering process for a non-zero entry, that is, a support entry is performed by utilizing a compressed sensing (CS) scheme, it is possible to obtain performance close to the optimal estimator. An orthogonal Matching Pursuit (OMP) algorithm is well-known algorithm that is representative of a CS technique, and a StOMP algorithm and a compressive sampling matching pursuit (CoSaMP) algorithm are based on improved OMP algorithm. The present disclosure describes the StOMP algorithm that is operating relatively more robustly than others.

Referring to FIG. 11, $r_{s-1}$ is a residual vector in the s-th stage, s=1, $r_0$=y, and the set $I_0$ is an empty set ($I_0$=Ø). Here, y is a vector including the reception values of the reference signals.

In step 1110, the reception end 120 calculates a vector $c_s$ by applying a matched filter to the residual vector $r_{s-1}$ at the s (≥1)-th repetition stage. The j-th entry of the matched filter output $c_s$ is an entry indicating the degree of matching between $r_{s-1}$ and the j-th column vector of Φ.

In step 1120, the reception end 120 outputs an entry set of $J_s$, among entries of $c_s$ where the energy value or the absolute value is greater than the reference value $t_s$ and in step 1130, adds the same to a support set $I_{s-1}$ that has been stored in the previous step. That is, the reception end 120 obtains the union of $I_{s-1}$ and $J_s$, that are stored in the previous repetition stage, and defines the result as $I_s$. The $I_s$ can be listed in ascending order. In the s+1-th repetition stage, $I_s$ which is obtained in the s-th repetition stage can be determined as an input of the union set, and to this end, the delay unit is defined by D. In step 1120, the reference value $t_s$ can be calculated by equation (30) defined as follows:

$$t_s = a_1 \|r_{s-1}\|_2 / \sqrt{4N_{CRS}} \tag{30}$$

Here, $a_1$ is a predefined coefficient, $\|r_{s-1}\|_2$ is 2-norm of the residual vector $r_{s-1}$ in the s-th stage, and $N_{CRS}$ is the total number of REs occupied by the CRS in the OFDM symbol.

In step 1140, all sub-matrices collecting column vectors corresponding to the entries of the $I_s$, among the column vector Φ, are defined as $\Phi_{I_s}$, a system matrix $\Phi_{I_s}$ in the s-th stage and the reception signal vector y are used as input vectors, and the CIR vector $\hat{h}_{I_s}$ estimated through a zero forcing receiver is output as the output vector.

In step 1150, in order to subtract a value that is contributed by the CIR vector $\hat{h}_{I_s}$ estimated from the reception signal vector y, $\Phi_{I_s}\hat{h}_{I_s}$ is defined and constructed as the interference vector. A value obtained by subtracting $\Phi_{I_s}\hat{h}_{I_s}$ from the reception signal y is defined as $r_s$ and the delay unit can be used for this purpose.

This repeated operation can be stopped when the predetermined maximum number of repetitions has been reached and when 2-norm $\|r_s\|^2$ of $r_s$ becomes smaller than a reference value or the entry having the largest absolute value among the entry of $c_s$ is smaller than the reference value.

The CIR vector $\hat{h}$ that is estimated using the StOMP algorithm has a non-zero value for the index of support set $I_s$, and the CIR vector $\hat{h}$ has a zero value for the index of the complement of the support set $I_s$. The CFR can be estimated from the estimated CIR vector $\hat{h}$ and be defined by equation (31) as follows:

$$\hat{\eta}(k) = \sum_{l=0}^{L-1} \hat{h}(l) e^{-j2\pi k l/N} \tag{31}$$

Here, $\hat{\eta}(k)$ is the estimation value of CFR, and $\hat{h}(l)$ is the estimation value of CIR.

Figure 12:
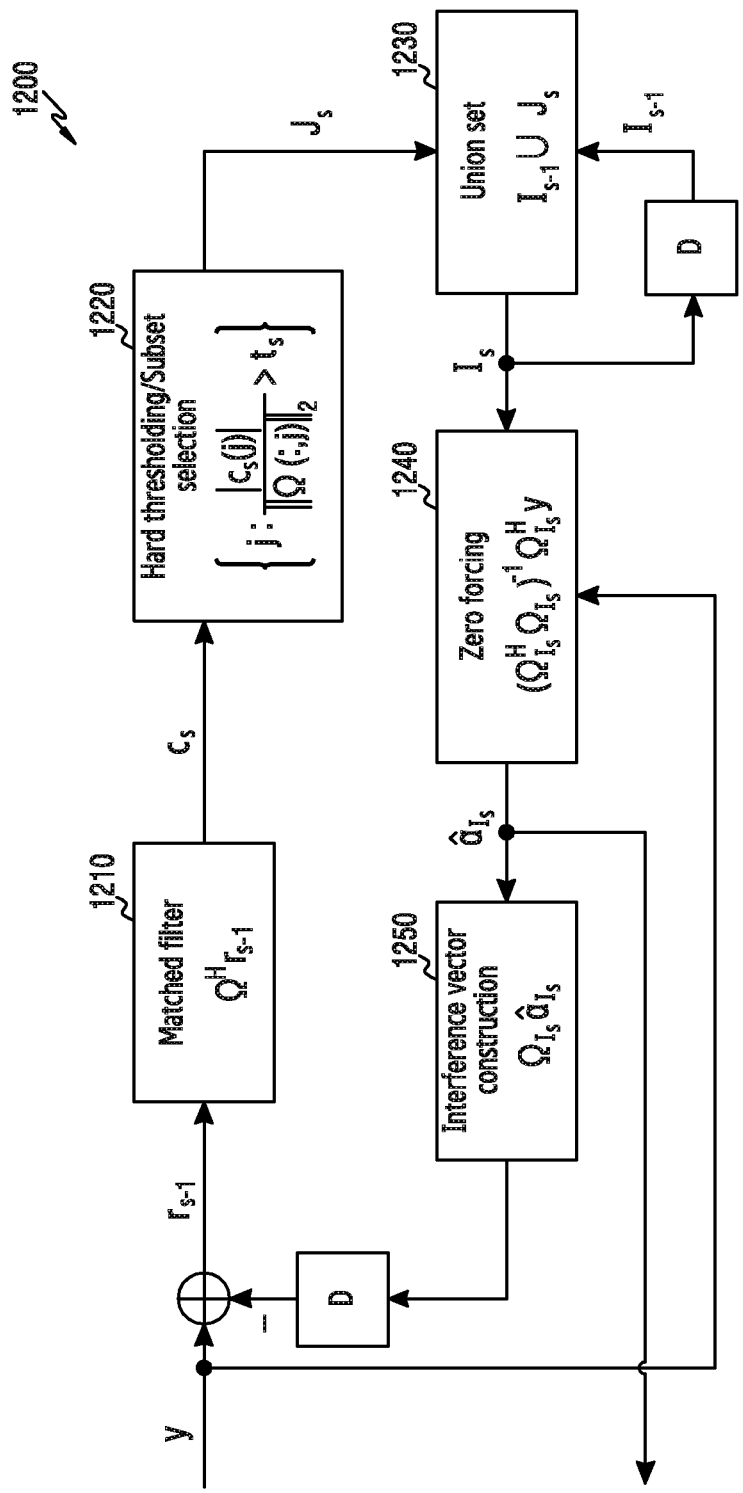
FIG. 12 illustrates a StOMP algorithm using a BEM according to various embodiments of the present disclosure.

FIG. 12 illustrates an StOMP algorithm 1200 using a BEM according to various embodiments of the present disclosure.

Prior to introducing the algorithm, a BEM will be described first, and the basis of Legendre polynomials (LP) for the M channel samples having a polynomial form of the well-known BEM to those skilled in the art will defined by equation (32) to equation (34) as follows:

$$\psi_0^{LP}(m) = \frac{1}{\sqrt{M}}, m = 0, \ldots, M-1 \tag{32}$$

$$\psi_1^{LP}(m) = \sqrt{\frac{3(M-1)}{(M+1)M}} \left(1 - \frac{2m}{M-1}\right) \tag{33}$$

$$\psi_2^{LP}(m) = \sqrt{\frac{5(M-1)(M-2)}{(M+2)(M+1)M}} \left(1 - \frac{6m}{M-1} + \frac{6m(m-1)}{(M-1)(M-2)}\right) \tag{34}$$

Here, $\psi_0^{LP}(m)$ is a basis corresponding to a zero-degree polynomial, $\psi_1^{LP}(m)$ is a basis in charge of a zero and a first degree polynomial, and $\psi_2^{LP}(m)$ is a basis in charge of a zero, a first, and a second degree polynomial. The higher degree of LP is omitted because it is well known to those skilled in the art. At this time, CIR vector $\hat{h}^{4L\times 1}$ of equations (13), (16), (19), and (22) can be defined by equation (35) as follows:

$$h \simeq \Psi\alpha \tag{35}$$

Here, h is a channel vector, Ψ is a basis matrix, and α is a coefficient vector.

Here, the coefficient vector α can be defined by equation (36) and equation (37) as follows:

$$\alpha = [\alpha^T(0), \ldots, \alpha^T(L-1)]^T \in C^{LQ \times 1} \tag{36}$$

$$\alpha(l) \triangleq [\alpha_0(l), \ldots, \alpha_{Q-1}(l)]^T \in C^{Q \times 1} \tag{37}$$

For the grids 510 and 530 of FIG. 5, the basis matrix Ψ in the OFDM symbol having a CRS can be defined by equation (38) to equation (42) as follows:

$$\Psi \triangleq \begin{vmatrix} \Psi_1 \\ \Psi_4 \\ \Psi_8 \\ \Psi_{11} \end{vmatrix} \in \mathbb{R}^{4L \times LQ} \tag{38}$$

$$\Psi_1 \triangleq I_L \otimes [\psi_0^{LP}(1) \ldots \psi_{Q-1}^{LP}(1)] \in \mathbb{R}^{L \times LQ} \tag{39}$$

$$\Psi_4 \triangleq I_L \otimes [\psi_0^{LP}(4) \ldots \psi_{Q-1}^{LP}(4)] \in \mathbb{R}^{L \times LQ} \tag{40}$$

$$\Psi_8 \triangleq I_L \otimes [\psi_0^{LP}(8) \ldots \psi_{Q-1}^{LP}(8)] \in \mathbb{R}^{L \times LQ} \tag{41}$$

$$\Psi_{11} \triangleq I_L \otimes [\psi_0^{LP}(11) \ldots \psi_{Q-1}^{LP}(11)] \in \mathbb{R}^{L \times LQ} \tag{42}$$

Here, Ψ is a basis matrix, $I_L$ is an Identity matrix, and ⊗ is the Kronecker product.

For the grids 520 and 540 of FIG. 5, in an OFDM symbol having CRS, the basis matrix ψ can be represented by equation (43) to equation (47) as follows:

$$\Psi \triangleq \begin{vmatrix} \Psi_0 \\ \Psi_4 \\ \Psi_8 \\ \Psi_{11} \end{vmatrix} \in \mathbb{R}^{4L \times LQ} \tag{43}$$

$$\Psi_1 \triangleq I_L \otimes [\psi_0^{LP}(1) \ldots \psi_{Q-1}^{LP}(1)] \in \mathbb{R}^{L \times LQ} \tag{44}$$

$$\Psi_4 \triangleq I_L \otimes [\psi_0^{LP}(4) \ldots \psi_{Q-1}^{LP}(4)] \in \mathbb{R}^{L \times LQ} \tag{45}$$

$$\Psi_8 \triangleq I_L \otimes [\psi_0^{LP}(7) \ldots \psi_{Q-1}^{LP}(7)] \in \mathbb{R}^{L \times LQ} \tag{46}$$

$$\Psi_{11} \triangleq I_L \otimes [\psi_0^{LP}(11) \ldots \psi_{Q-1}^{LP}(11)] \in \mathbb{R}^{L \times LQ} \tag{47}$$

Equation (48) can be obtained from equation (9) and equation (35) and defined as follows:

$$y = \Omega\alpha + z \quad (48)$$

Here, y is a reception signal vector, $\Omega$ is a system matrix that is newly defined, $\alpha$ is a basis coefficient vector, and z is a noise vector.

For the grid 510 and 530 of FIG. 5, a newly defined system matrix $\Omega$ can be defined by equation (49) as follows:

$$\Omega = \begin{bmatrix} F_4\Psi_1 \\ F_0\Psi_4 \\ F_4\Psi_8 \\ F_0\Psi_{11} \end{bmatrix} \in \mathbb{C}^{4N_{CRS} \times LQ} \quad (49)$$

When F is assumed to be a matrix having an entry of u-th row and u'-th column (u, u'=0, ..., N-1) as $e^{j2\pi uu'/N}$, $F_m$ is to be referred as to a submatrix including row vectors and column vectors formed from column vector 0 to column vector L-1 of F corresponding to subcarrier index of the RE where the CRS is located in the OFDM symbol m, and $\Psi$ is a basis matrix.

For the grids 520 and 540 of FIG. 5, the newly defined system matrix $\Omega$ can be defined by equation (50) as follows:

$$\Omega = \begin{bmatrix} F_0\Psi_1 \\ F_4\Psi_4 \\ F_0\Psi_7 \\ F_4\Psi_{11} \end{bmatrix} \in \mathbb{C}^{4N_{CRS} \times LQ} \quad (50)$$

When F is assumed to be a matrix having an entry of u-th row and u'-th column (u, u'=0, ..., N-1) as $e^{j2\pi uu'/N}$, $F_m$ is to be referred to as a submatrix including row vectors and column vectors formed from column vector 0 to column vector L-1 of F corresponding to subcarrier index of the RE where the CRS is located in the OFDM symbol m, and $\Psi$ is a basis matrix.

FIG. 12 illustrates operations of the newly defined StOMP algorithm for equation (48). Referring to FIG. 12, in block 1220, a hard thresholding process and subset selection process are performed based on the normalized absolute value of j-th column of $\Omega$. $\|\Omega(:,j)\|_2$ is 2-norm of the j-th column of $\Omega$. $t_s$ of the StOMP algorithm can be calculated by equation (51) defined as follows:

$$t_s = a_2 \|r_{s-1}\|_2 / \sqrt{4N_{CRS}} \quad (51)$$

Here, $a_2$ is a predefined coefficient, $\|r_{s-1}\|_2$ is 2-norm of the residual vector $r_{s-1}$ in the stage s, and $N_{CRS}$ is the total number of REs occupied by the CRS in the OFDM symbol.

Basis coefficient vector $\hat{\alpha}$ estimated using the StOMP algorithm has a non-zero value for the index corresponding to the support set $I_s$, and the basis coefficient vector a has a zero value for the index of the complement of the support set $I_s$. The original estimated CIR vector can be obtained from the estimated basis coefficient vector $\hat{\alpha}$ and defined by equation (52) as follows:

$$\hat{h} = \Psi\hat{\alpha} \quad (52)$$

Here, $\hat{h}$ is an estimated channel vector, $\Psi$ is a basis matrix, and $\hat{\alpha}$ is an estimated basis coefficient vector.

For the grids 510 and 530 of FIG. 5, the basis matrix $\Psi$ can be defined by equation (53) to equation (57) as follows:

$$\Psi \triangleq \begin{bmatrix} \Psi_4 \\ \Psi_5 \\ \Psi_6 \\ \Psi_7 \end{bmatrix} \in \mathbb{R}^{4L \times LQ} \quad (53)$$

$$\Psi_4 \triangleq I_L \otimes [\psi_0^{LP}(4) \ \ldots \ \psi_{Q-1}^{LP}(4)] \in \mathbb{R}^{L \times LQ} \quad (54)$$

$$\Psi_5 \triangleq I_L \otimes [\psi_0^{LP}(5) \ \ldots \ \psi_{Q-1}^{LP}(5)] \in \mathbb{R}^{L \times LQ} \quad (55)$$

$$\Psi_6 \triangleq I_L \otimes [\psi_0^{LP}(6) \ \ldots \ \psi_{Q-1}^{LP}(6)] \in \mathbb{R}^{L \times LQ} \quad (56)$$

$$\Psi_7 \triangleq I_L \otimes [\psi_0^{LP}(7) \ \ldots \ \psi_{Q-1}^{LP}(7)] \in \mathbb{R}^{L \times LQ} \quad (57)$$

For the grids 520 and 540 of FIG. 5, the basis matrix $\Psi$ can be defined by equation (58) as follows:

$$\Psi \triangleq \begin{bmatrix} \Psi_4 \\ \Psi_5 \\ \Psi_6 \end{bmatrix} \in \mathbb{R}^{3L \times LQ} \quad (58)$$

Here, $\Psi_4$, $\Psi_5$, and $\Psi_6$ follow the equation (54) to equation (56).

For the grid 510 of FIG. 5, the estimated CIR vector can be defined by equation (59) as follows:

$$\hat{h} \triangleq [\hat{h}_{s,0}^T, \hat{h}_{s,1}^T, \hat{h}_{s,2}^T, \hat{h}_{s,3}^T]^T \in \mathbb{C}^{4L \times 1} \quad (59)$$

For the grid 520 of FIG. 5, the estimated CIR vector can be defined by equation (60) as follows:

$$\hat{h} \triangleq [\hat{h}_{s,4}^T, \hat{h}_{s,5}^T, \hat{h}_{s,6}^T]^T \in \mathbb{C}^{3L \times 1} \quad (60)$$

For the grid 530 of FIG. 5, the estimated CIR vector can be defined by equation (61) as follows:

$$\hat{h} \triangleq [\hat{h}_{s,7}^T, \hat{h}_{s,8}^T, \hat{h}_{s,9}^T, \hat{h}_{s,10}^T]^T \in \mathbb{C}^{4L \times 1} \quad (61)$$

For the grid 540 of FIG. 5, the estimated CIR vector can be defined by equation (62) as follows:

$$\hat{h} \triangleq [\hat{h}_{s,11}^T, \hat{h}_{s,12}^T, \hat{h}_{s,13}^T]^T \in \mathbb{C}^{3L \times 1} \quad (62)$$

The CFR can be estimated from the estimated CIR vector $\hat{h}$ and defined by equation (63) as follows:

$$\hat{\eta}_{s,m}(k) = \sum_{l=0}^{L-1} \hat{h}_{s,m}(l) e^{-j2\pi kl/N} \quad (63)$$

Here, $\hat{\eta}_{s,m}(k)$ is an estimation value of the CFR, and $\hat{h}_{s,m}(l)$ is an estimation value of the CIR.

Figure 13:
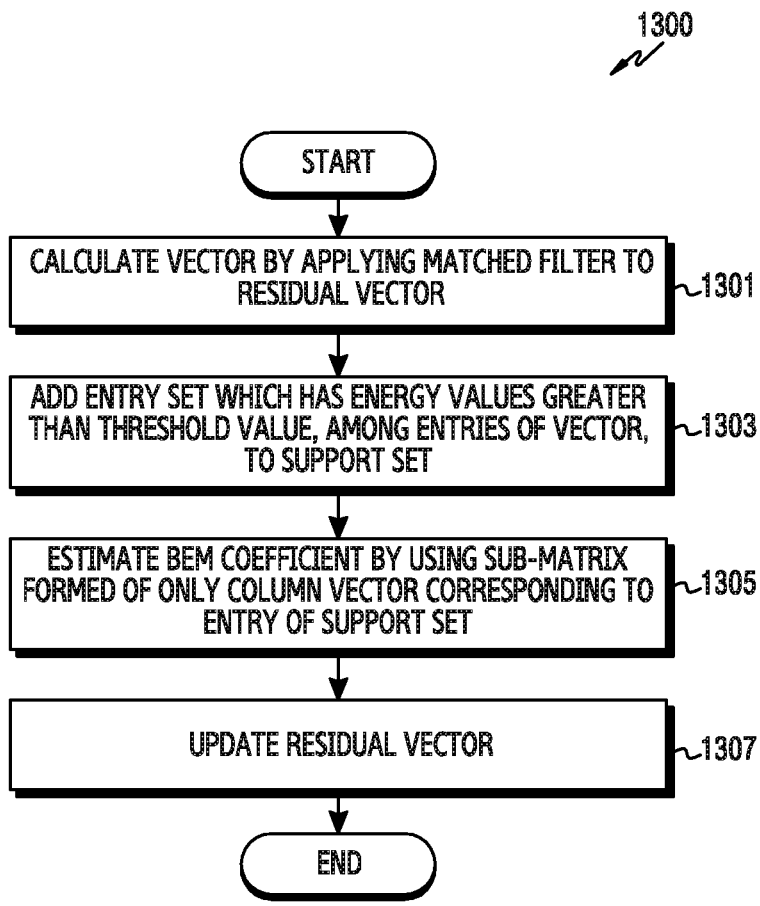
FIG. 13 is a flow chart illustrating an operation of a reception end that performs a StOMP algorithm using a BEM according to various embodiments of the present disclosure.

FIG. 13 is a flowchart 1300 of the operation of the reception end 120 for performing an StOMP algorithm using a BEM according to various embodiments of the present disclosure.

Referring to FIG. 13, in step 1301, the reception end 120 calculates a vector by applying a matched filter to the residual vector. Each entry of the vector to which the matched filter is applied corresponds to information on the degree of matching between the residual signal and the system matrix.

In step 1303, the reception end 120 adds, to the support set, a set of entries in which the energy value is greater than the reference value, among the entries of the vector calculated in step 1301. The union of a set including the index of the support that is a non-zero entry in a channel vector that is a sparse vector and the support set in the previous repetition stage is performed, and then the newly calculated index of support can be added to the support set.

In step 1305, the reception end 120 estimates the BEM coefficient by using the sub-matrix of a system matrix, which is formed by only a column vector corresponding to the entry of the support set in step 1303. The estimation of the BEM coefficient can be performed by zero-forcing. Here, the BEM coefficient refers to the coefficient of basis of channel vector reconfigured by the BEM basis.

In step 1307, the reception end 120 updates the residual vector. The reception end 120 constructs an interference vector in order to subtract a value that the estimated BEM coefficient contributes and defines the value that is obtained by subtracting the interference vector from the reception signal as a new residual vector, and updates the residual vector.

Figure 14:
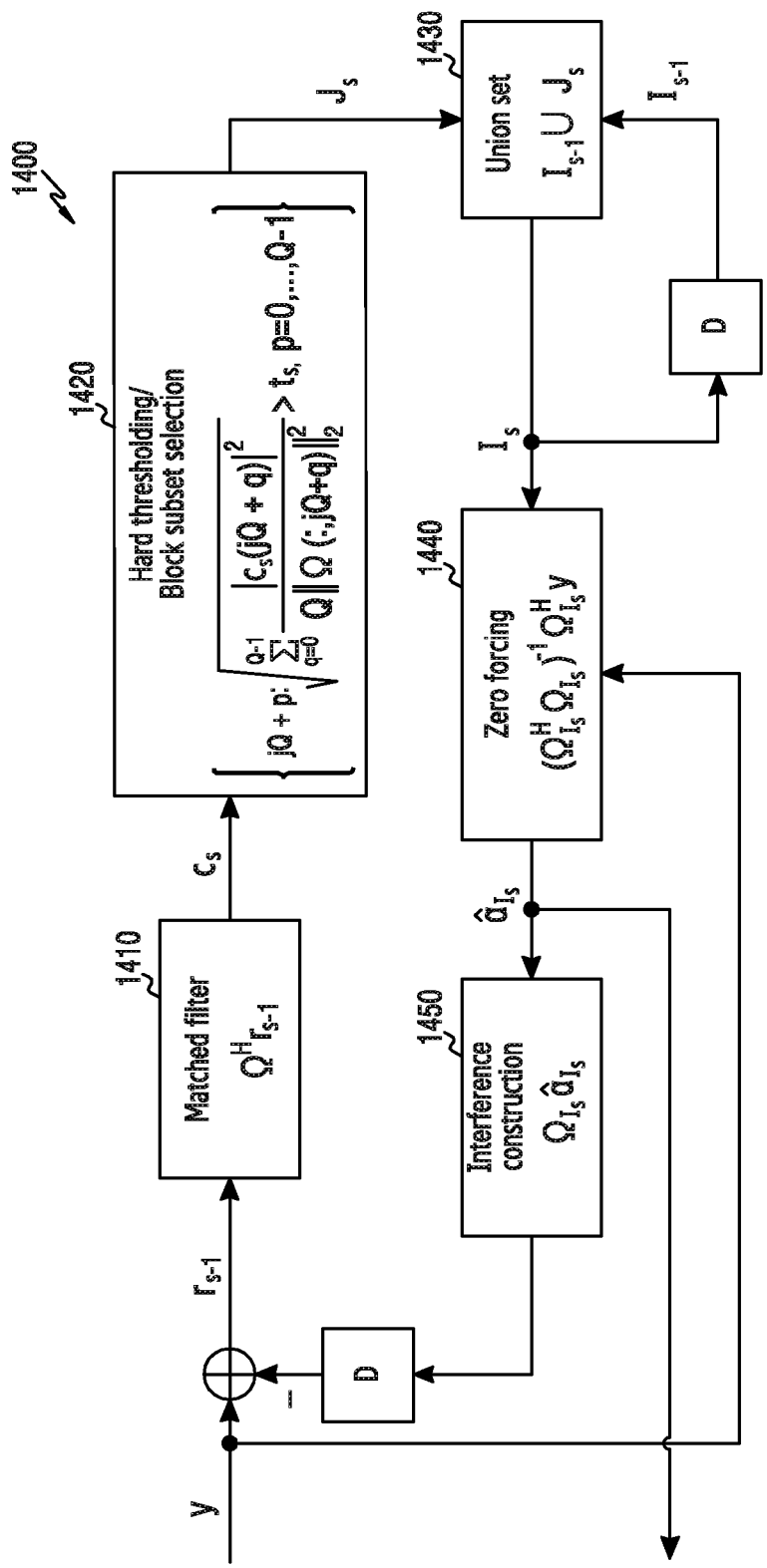
FIG. 14 shows a block StOMP algorithm using a BEM according to various embodiments of the present disclosure.

FIG. 14 illustrates a block StOMP algorithm 1400 using a BEM according to various embodiments of the present disclosure.

Here, the block is defined as a set of entries in which all the values of entries are zero or non-zero. That is, the number of entries of $c_s$ is QL, the Q number of entries are defined as one block, and all the values of entries for each block are zero or non-zero.

Referring to FIG. 14, $r_{s-1}$ is a residual vector at the s-th stage, and in s=1, $r_0$=y, and the set $I_0$ is defined as $I_0$=Ø. In step 1410, that is the s(≥1)th repetition stage, the vector $c_s$ is calculated by applying a matched filter to the residual vector $r_{s-1}$. The i-th entry of the matched filter output $c_s$ of $r_{s-1}$ is an entry indicating the degree of matching between $r_{s-1}$ and the i-th column vector. In step 1420, a set $J_s$ of blocks is output, which is the square root of the sum of the divided power of the entries in jQ+q (j=0, ..., Q−1)-th block of $c_s$ into $\sqrt{Q}\|\Omega(:, jQ+q)\|_2^2$, and which is greater than the reference value $t_s$. Here, block energy value that is compared with the reference value can be the value such as 1 norm, 2 norm, and 3 norm of the entries inside the blocks. The reference value $t_s$ can be changed for each repetition stage. In step 1430, the set $J_s$ is added to the support set $I_{s-1}$ that has been stored in the previous repetition stage. That is, the union of $I_{s-1}$ that has been stored in the previous repetition stage and $J_s$ is performed and the result is defined as $I_s$. The $I_s$ can be listed in ascending order. In the s+1-th repetition stage, $I_s$ that is obtained by the s-th repetition stage is determined as the input of the union set, and to this end, the delay units are defined as D. In step 1420, the reference value $t_s$ can be calculated by $t_s=a_3\|r_{s-1}\|_2/\sqrt{4N_{CRS}}$, where $a_3$ is a pre-defined coefficient.

In step 1440, the submatrix collecting only the column vector corresponding to the block entries of $I_s$, among column vector of $\Omega$, is defined as $\Omega_{I_s}$, and the system matrix $\Omega_{I_s}$ in the s-th repetition stage and the reception signal vector y are used as input vectors, and a basis coefficient vector $\hat{\alpha}_{I_s}$, estimated through a zero forcing receiver are output as the output vectors.

In step 1450, in order to subtract, from the reception signal vector y, a value that is contributed by the estimated basis coefficient vector $\hat{\alpha}_{I_s}$, $\Omega_{I_s}\hat{\alpha}_{I_s}$ is defined and constructed as the interference vector. A value obtained by subtracting $\Omega_{I_s}\hat{\alpha}_{I_s}$ from the reception signal y is defined as r and the delay unit can be used for this purpose.

The above repetition operation can be stopped when the predetermined maximum number of repetitions has been reached and when 2-norm $\|r_s\|^2$ of $r_s$ becomes smaller than a reference value or the entry having the largest absolute value among the block entry of $c_s$ is smaller than the reference value.

The basis coefficient vector $\hat{\alpha}$ that is estimated using the block StOMP algorithm has a non-zero value for the index of support set $I_s$, and the basis coefficient vector $\hat{\alpha}$ has a zero value for the index of the complement of the support set $I_s$.

The CIR estimation value and the CFR estimation value can be obtained from the estimated $\hat{\alpha}$ by using equation (52) to equation (63).

Figure 15:
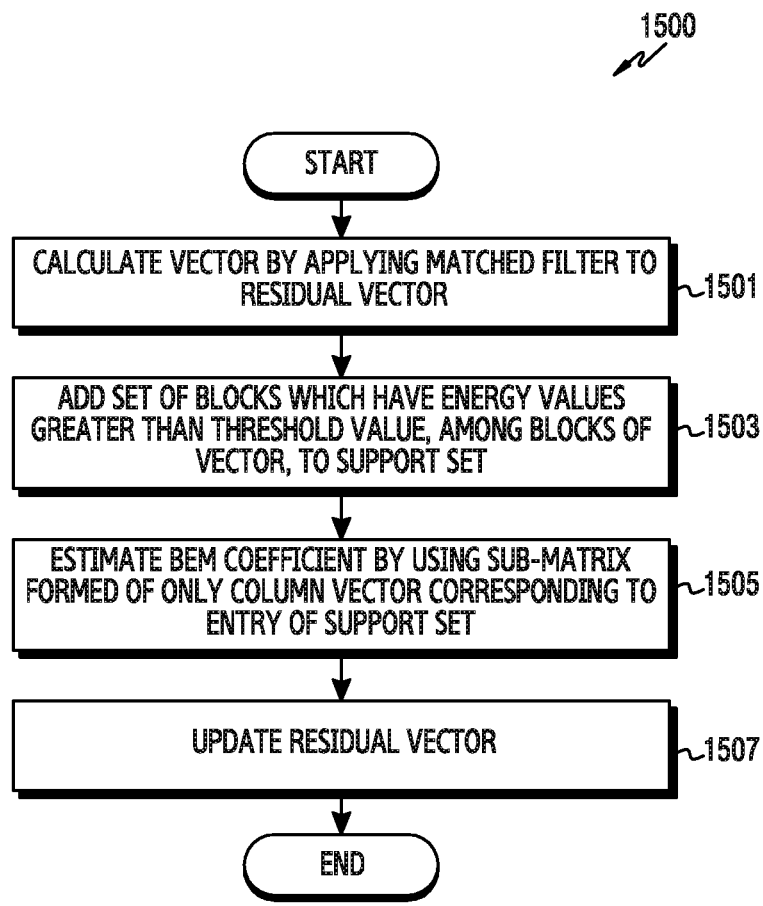
FIG. 15 is a flow chart illustrating an operation of a reception end that performs a block StOMP using a BEM according to various embodiments of the present disclosure.

FIG. 15 is a flow chart 1500 illustrating an operation of the reception end 120 for performing the block StOMP applying the BEM according to various embodiments of the present disclosure.

Referring to FIG. 15, in step 1501, the reception end 120 calculates a vector by applying a matched filter to the residual vector. Each entry of the vector to which the matched filter is applied corresponds to information on the degree of matching between the residual signal and the system matrix.

In step 1503, the reception end 120 adds, to the support set, a set of entries in which the block energy value is greater than the reference value, among the entry blocks of the vector calculated in step 1501. Here, the block is defined as entries in which all the values of which are zero or non-zero. The union of a set including the index of the support that is a non-zero entry in a channel vector that is a sparse vector and the support set in the previous repetition stage is performed, and then the newly calculated index of support can be added to the support set.

In step 1505, the reception end 120 estimates the BEM coefficient by using the sub-matrix of a system matrix consisting only of a column vector corresponding to the entry of the support set determined in step 1503. The estimation of the BEM coefficient can be performed by zero-forcing. Here, the BEM coefficient refers to the coefficient of a basis of channel vector reconfigured by the BEM basis.

In step 1507, the reception end 120 updates the residual vector. The reception end 120 constructs an interference vector in order to subtract a value that the estimated BEM coefficient contributes, defines the value that is obtained by subtracting the interference vector from the reception signal as a new residual vector, and updates the residual vector.

In the present disclosure, the LP is used, which has a polynomial form of the BEM, but the present disclosure is not limited thereto, and various BEMs such as a Taylor polynomial, a Prorate spheroidal sequence, a complex exponential, or an oversampled complex exponential can be used and the same can be combined with the StOMP and the block StOMP.

Figure 16A:
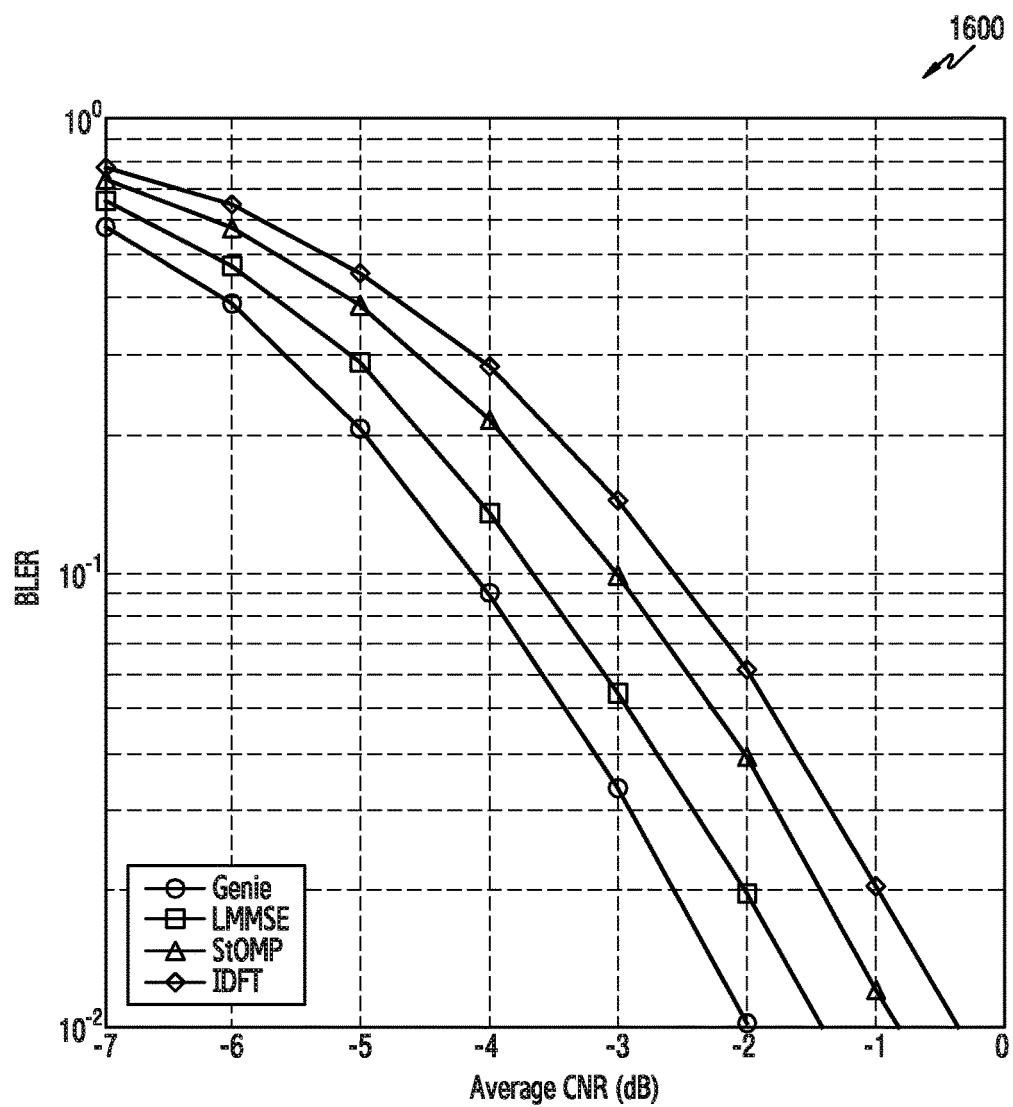
FIGS. 16A and 16B show graphs of the BLER performance according to an IDFT based channel estimation technique and a channel estimation technique using a StOMP algorithm.
Figure 16B:
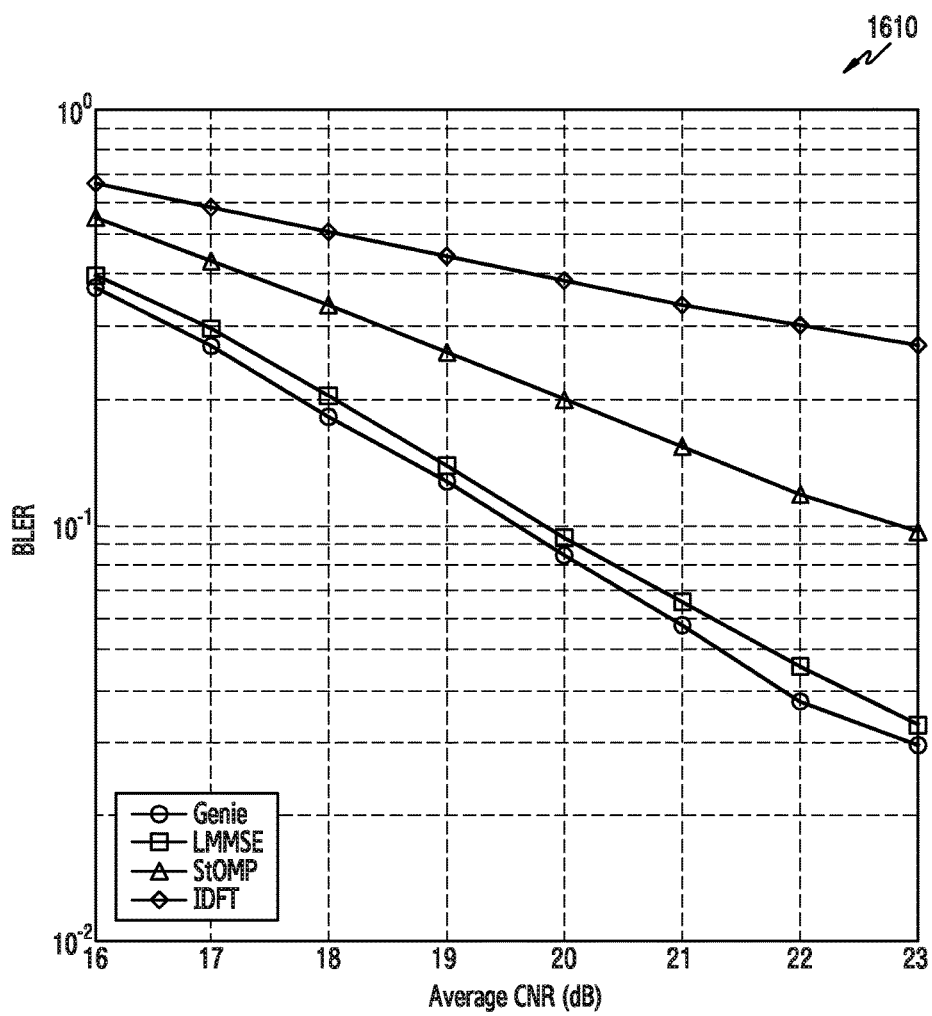

FIG. 16A and 16B is a graph 1600 illustrating the BLER performance based on an IDFT-based channel estimation scheme according to a modulation and coding scheme (MCS) and a channel estimation scheme using the StOMP algorithm.

FIG. 16A shows a Block Error Rate (BLER) performance simulation result 1600 when the MCS is zero. The horizontal axis indicates an average carrier-to-noise ratio (CNR) in a unit of decibels (dB), and the vertical axis indicates the BLER. Delay and power profiles of a channel to be simulated are [0 1 2 4 8 25 36 77]·$T_c$ and [0.1241 0.1241 0.1241 0.3125 0.1563 0.0783 0.0494 0.0312], respectively, multiple paths of channel are independent from each other and follow a zero-mean normal distribution, and the Doppler frequency is 300 Hz. The channel that is implemented to follow the above distribution is scaled so as to have total ensemble power of one. The system bandwidth is 10 MHz, the modulation scheme is Quadrature Phase Shift Keying (QPSK), 50 PRBs are scheduled to the reception end, and SISO can be applied thereto. Since the size of a transmission block is 1384 bits and 15000 bits can be included in the 50 PRBs, an effective channel code rate, that is 1384/15000, is 0.0923, and a channel decoder operates in a max log-map method. A turbo decoder repeats the operation eight times and the operation is tested with the channel for the 4000 sub-frame intervals. Looking at the BLER curve of FIG. 16A, it can be seen that the StOMP method has performance degradation of 0.65 dB compared to the LMMSE method by which the optimal channel estimator is achieved at BLER=0.1. Genie refers to the BLER curve when the channel is known. That is, for the MCS operating at a low carrier to noise ratio (CNR), near-optimal performance can be achieved even when the channel assumed to be static and the StOMP is used.

FIG. 16B shows a BLER performance simulation result 1610 when the MCS is 21. The horizontal axis indicates the average CNR in a unit of dBs, and the vertical axis indicates the BLER. An experimental environment is the same as that of FIG. 16A except for the MCS. Since the size of a transmission block is 21384 bits and 45000 bits can be included in the 50 PRBs, an effective channel code rate, that is 21384/45000, is 0.4752. Looking at the BLER curve of FIG. 16B, it can be seen that the LMMSE method and the Genie method operating in an optimum channel estimator are satisfied when the BLER<0.01. On the other hand, since the IDFT-based channel estimation and the channel estimation method using the StOMP algorithm show an error floor phenomenon in the high CNR region, it can be expected that there is no significant improvement in performance even though a retransmission by the transmitting end is made when the error occurs.

Figure 17A:
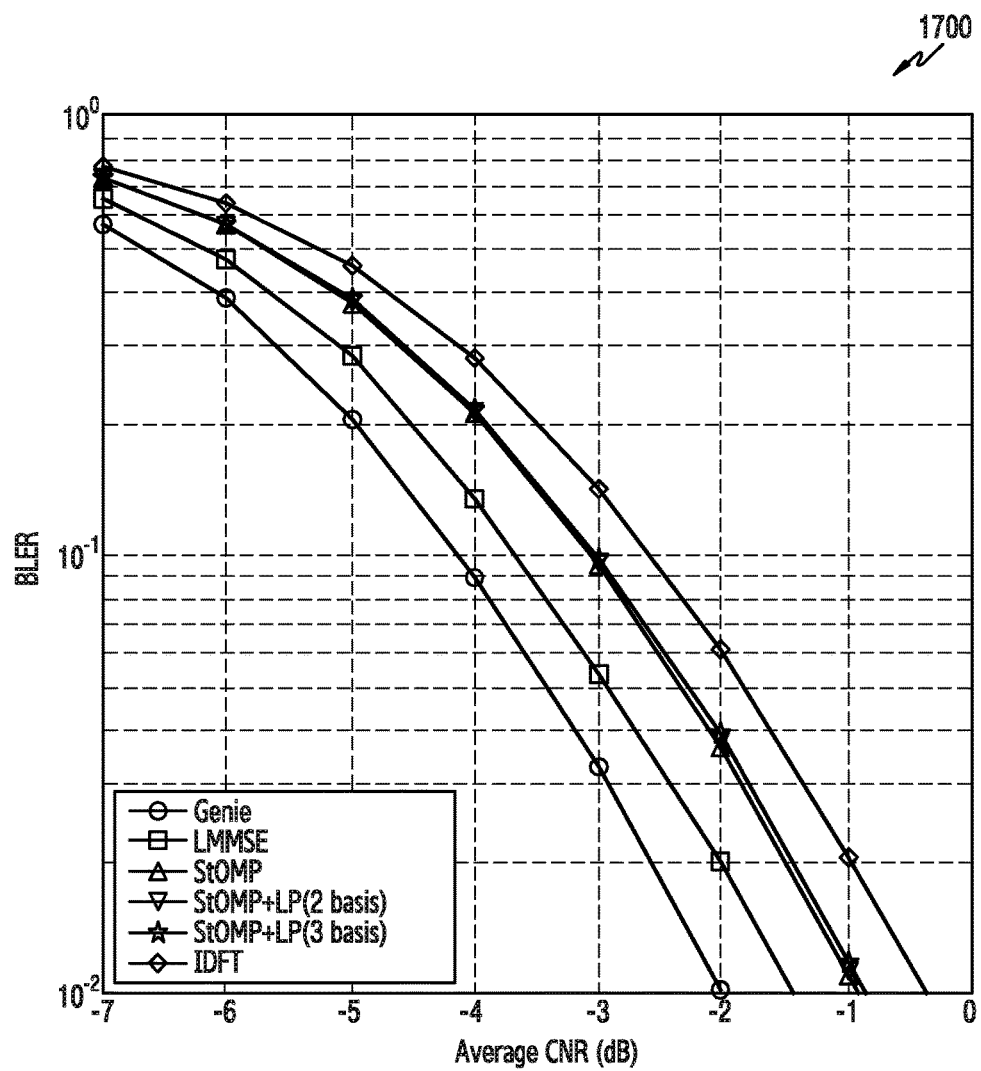
FIGS. 17A and 17B show graphs of the BLER performance according to a channel estimation technique using a StOMP having an IDFT, a StOMP algorithm, and LP BEM combined therein.
Figure 17B:
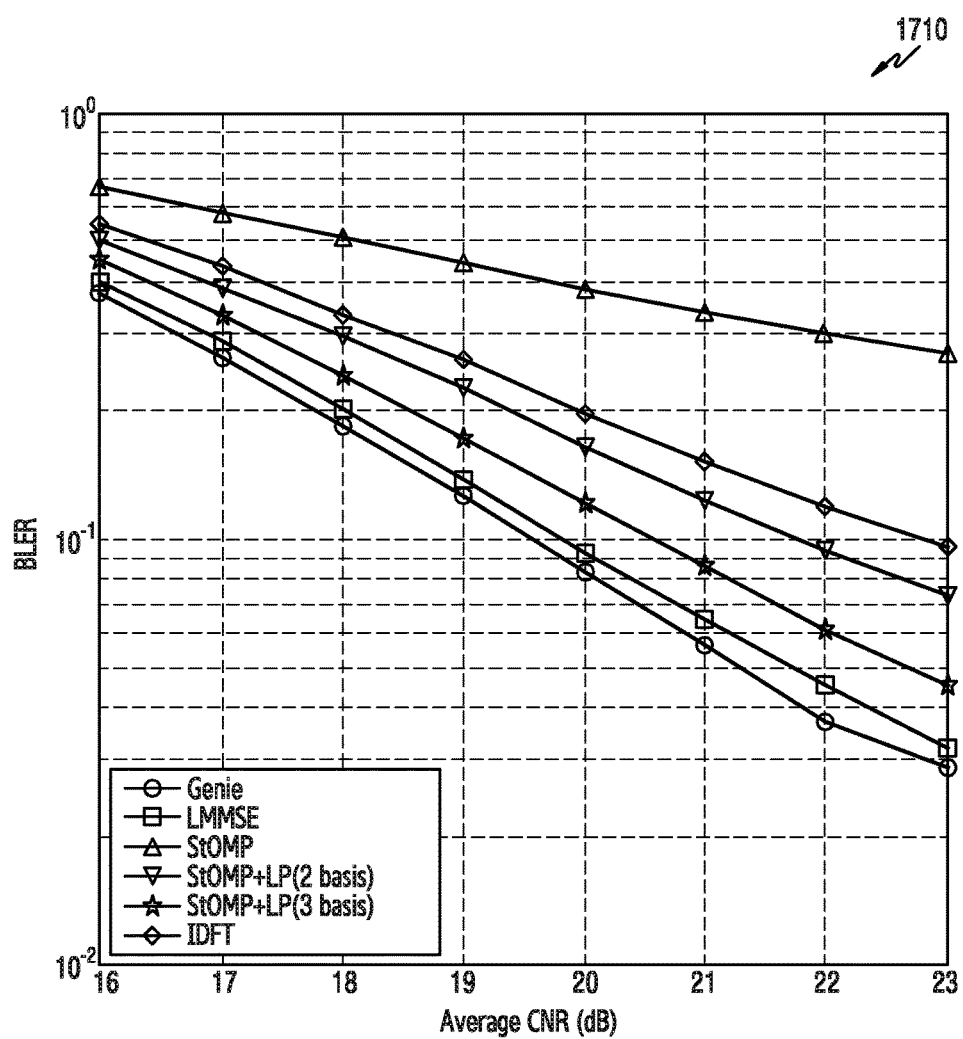

FIGS. 17A and 17B show graphs of the BLER performance based on a channel estimation scheme using the StOMP combining the IDFT, the StOMP algorithm, and LP BEM.

FIG. 17A illustrates a BLER evaluation simulation result 1700 of the channel estimation using the StOMP combining the IDFT, the StOMP algorithm, and the LP BEM when the MCS is 0. The horizontal axis indicates the average CNR in a unit of dBs and the vertical axis represents the BLER. An experimental environment is the same as that of FIG. 16A. It can be seen that all of the StOMP method, the StOMP using two LP basis, and the StOMP using three LP basis have performance degradation of 0.65 dB compared to the LMMSE method by which the optimal channel estimation is achieved at BLER=0.1. That is, in the case of MCS 0 operating at a low CNR, it can be seen that the StOMP combining the LP BEM has the same performance as the StOMP that has no combination thereof.

FIG. 17B shows the BLER performance simulation result 1710 using the StOMP combining the IDFT, the StOMP algorithm, and the LP BEM when the MCS is 21. The horizontal axis indicates the average CNR in a unit of dBs, and the vertical axis indicates the BLER. An experimental environment is the same as that of FIG. 16B. It can be seen that the channel estimation method using the StOMP shows an error floor phenomenon in a high CNR region, however the BLER performance according to the channel estimation method combining the LP basis and the StOMP is close to that of the optimal estimator by increasing the number of basis up to two or three. An adaptive BEM selection can be applied in order to select the number of optimal BEM basis according to the Doppler frequency and the instantaneous SNR.

Figure 18A:
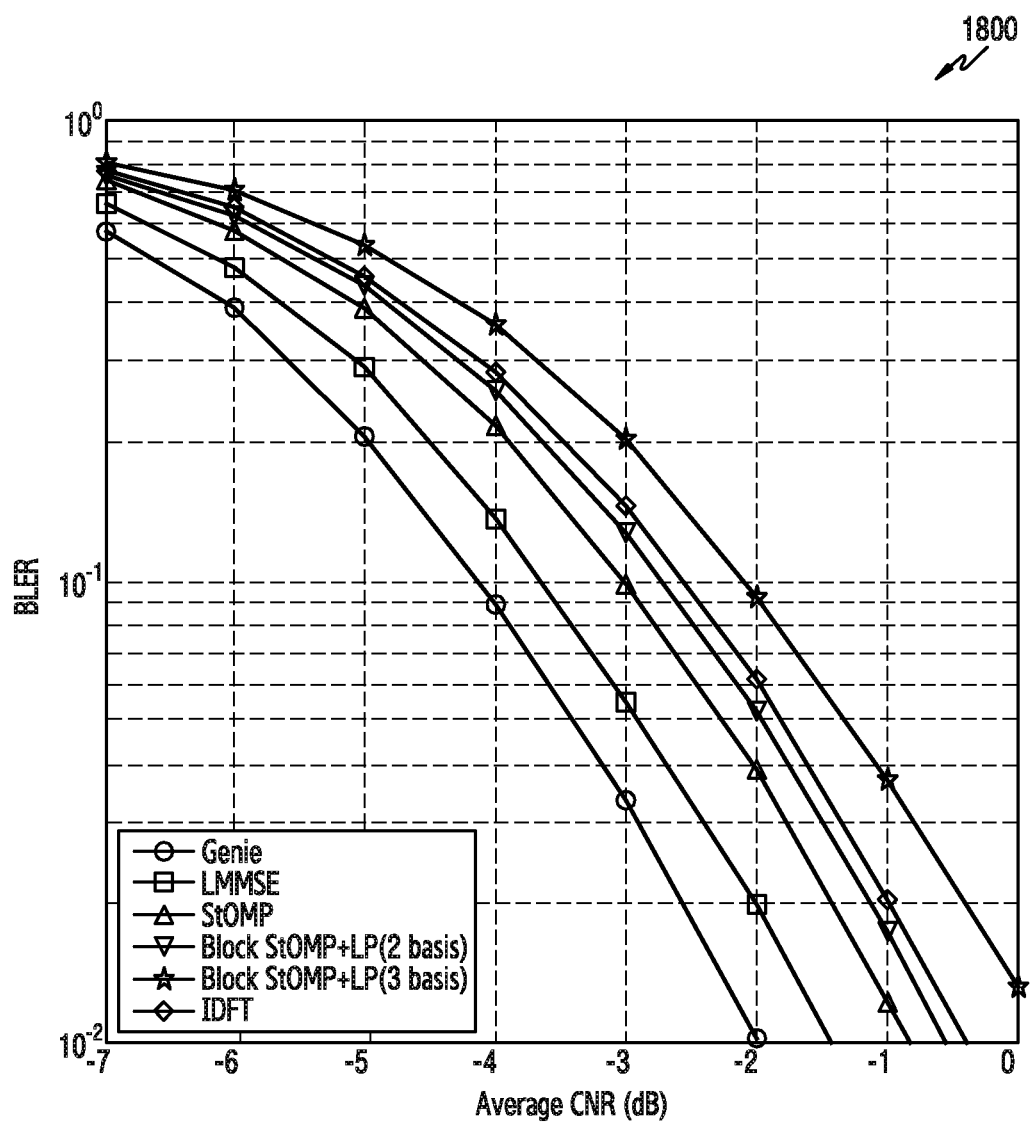
FIG. 18A and FIG. 18B shows graphs of the BLER performance according to a channel estimation technique using a block StOMP having an IDFT, a StOMP algorithm, and LP BEM combined therein.
Figure 18B:
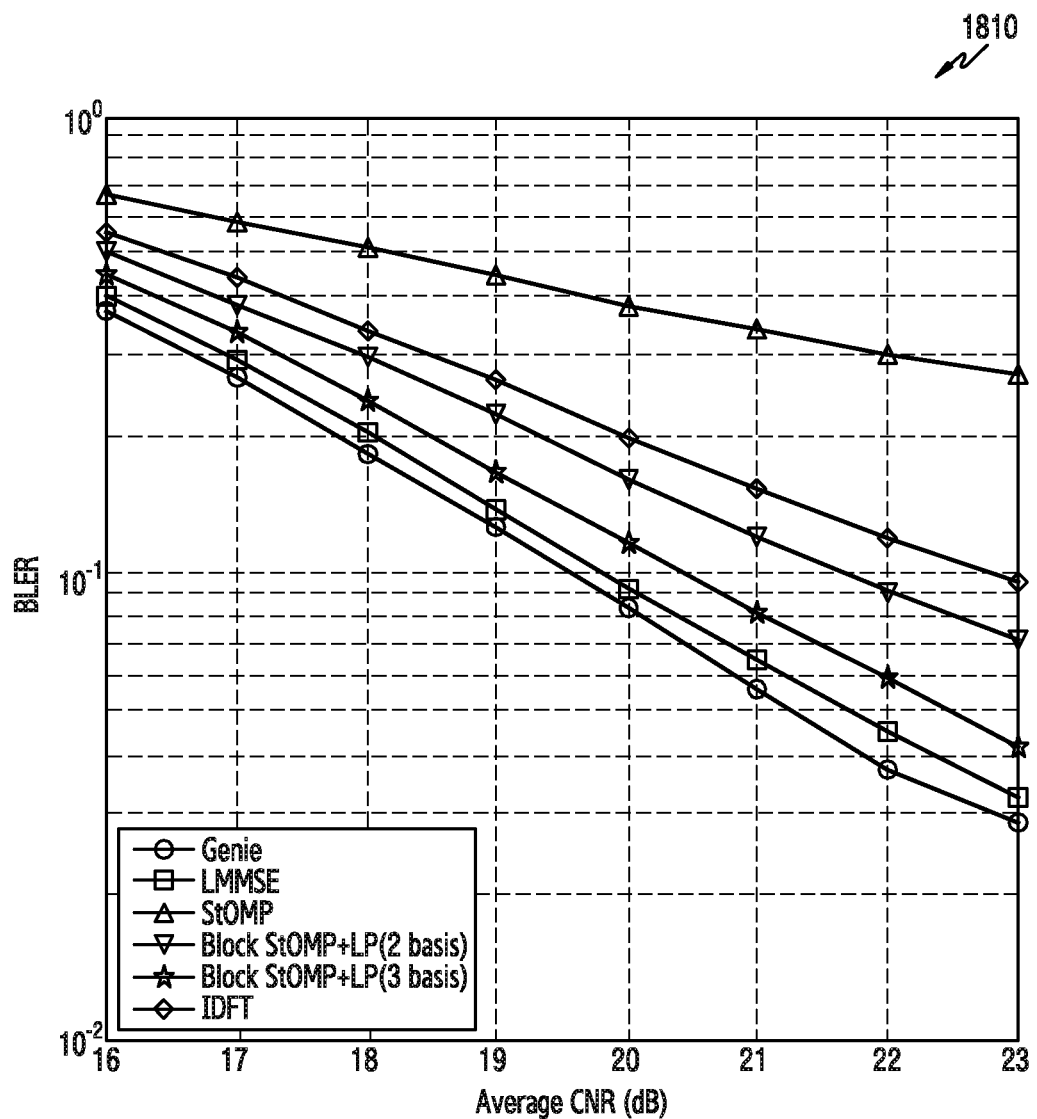

FIG. 18A and FIG. 18B illustrate graphs of the BLER performance based on the channel estimation method using the block StOMP combining the IDFT, the StOMP algorithm, and the LP BEM. FIG. 18A shows a BLER evaluation simulation result 1800 of the channel estimation using the block StOMP combining the IDFT, the StOMP algorithm, and the LP BEM when MCS is zero. The horizontal axis indicates the average CNR in a unit of dBs, and the vertical axis indicates the BLER. An experimental environment is the same as that of FIGS. 16A and 17A. As can be seen in the BLER curve, all StOMP methods have 0.65 dB performance degradation at BLER=0.1 compared to the optimal channel estimator, that is, an LLMSE method. On the other hand, an StOMP method using two LP basis and an StOMP method using three LP basis have more severe performance degradation. An adaptive BEM selection can be applied to select the number of optimal BEM basis according to the Doppler frequency and the instantaneous SNR.

FIG. 18B illustrates a BLER evaluation simulation result 1810 of the channel estimation using the block StOMP combining the IDFT, the StOMP algorithm, and the LP BEM when MCS is 21. The horizontal axis indicates the average CNR in a unit of dBs, and the vertical axis indicates the BLER. An experimental environment is the same as that of FIG. 16B and FIG. 17B. It can be seen that the channel estimation method using the StOMP shows an error floor phenomenon in a high CNR region, however the BLER performance according to the channel estimation method combining the LP basis and the block StOMP is close to that of the optimal channel estimator by increasing the number of basis up to two or three. An adaptive BEM selection can be applied in order to select the number of optimal BEM basis according to the Doppler frequency and the instantaneous SNR.

Hereinafter, a channel estimation technique in a MIMO system or a multi-antenna system will be described. The description below assumes a case where the transmission end has four antennas, but this is only assumed for the purpose of illustration. The present disclosure does not exclude other embodiments with respect to the number of antennas.

Figure 19A:
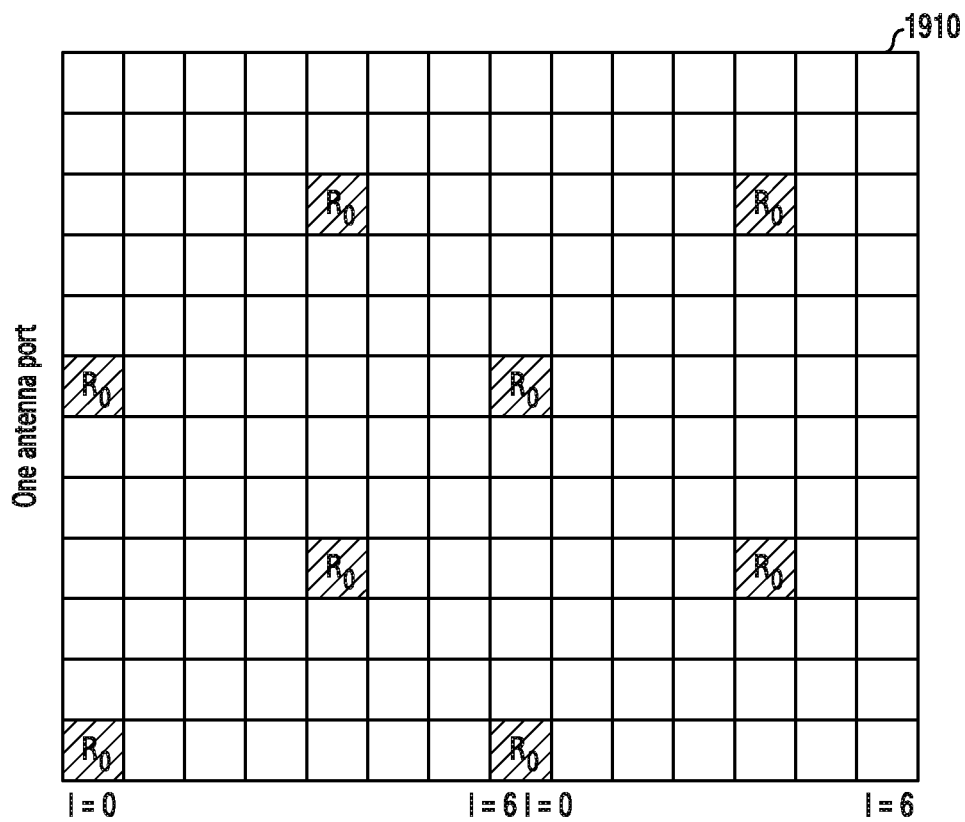
FIG. 19A to FIG. 19C show reference signal patterns according to the number of transmission antennas in a wireless communication system.
Figure 19B:
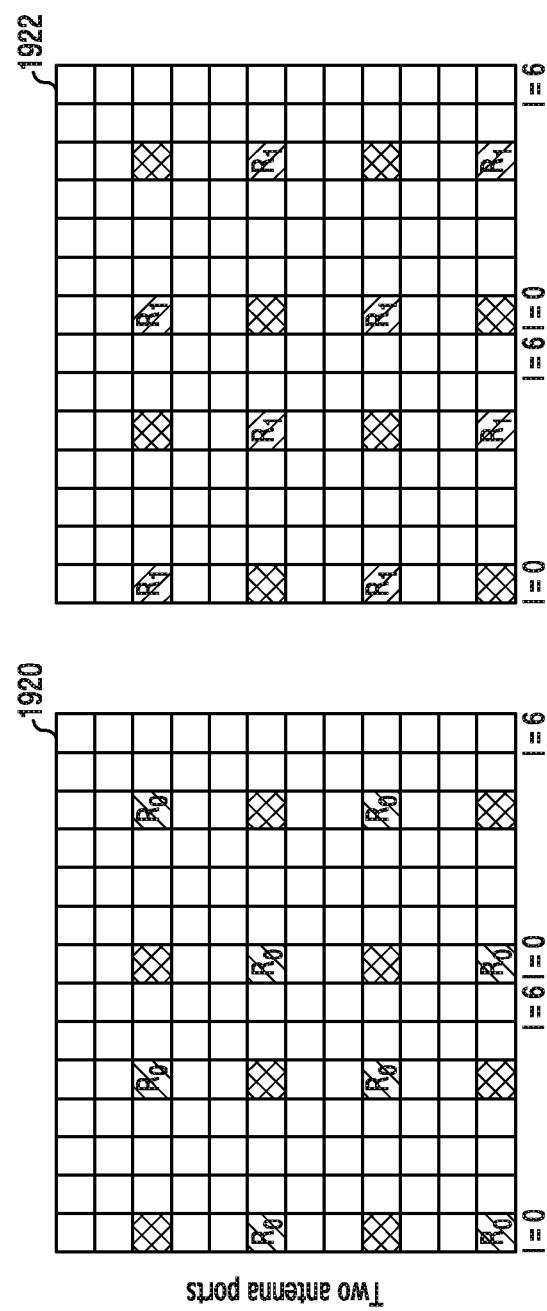
Figure 19C:
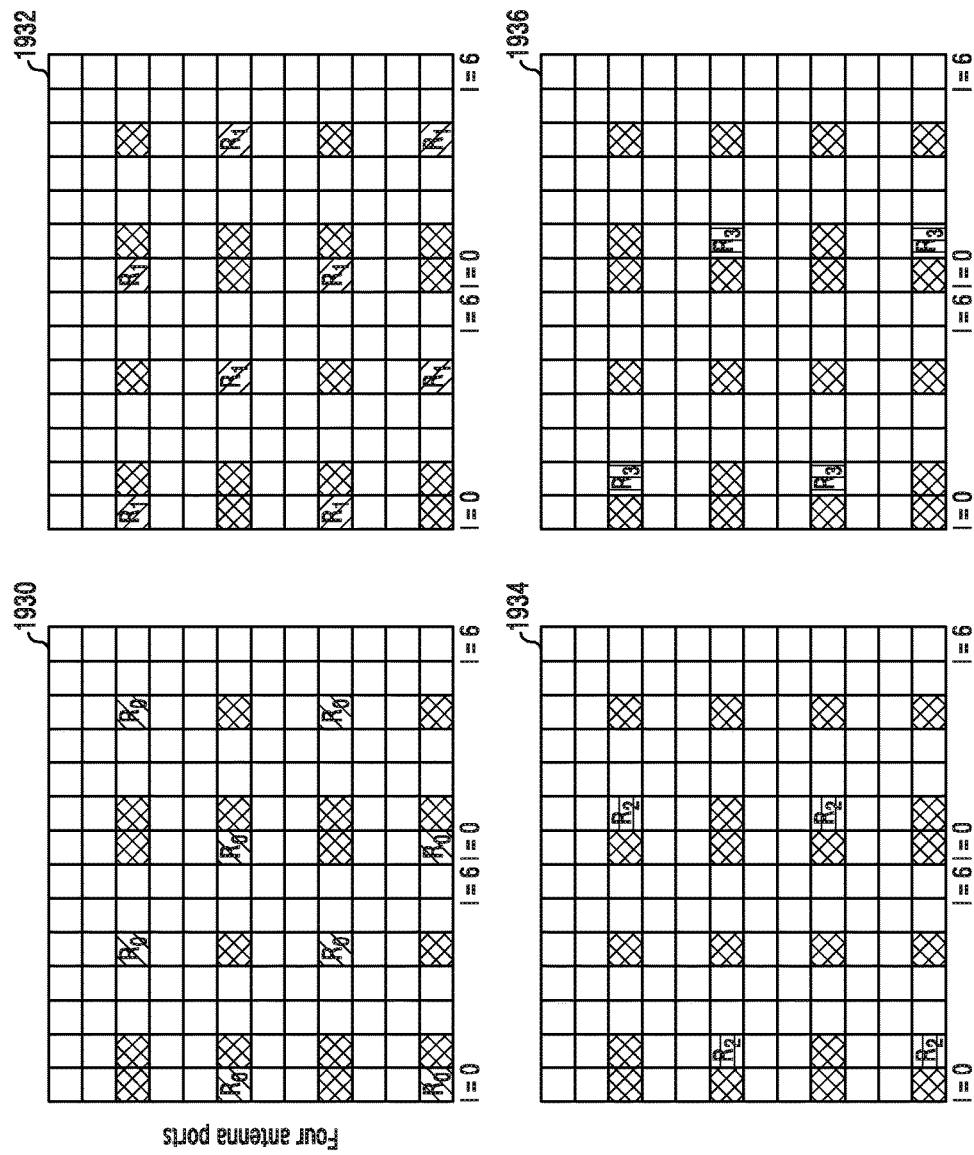

FIG. 19A to FIG. 19C illustrate reference signal patterns according to the number of transmission antennas in a wireless communication system. More specifically, FIG. 19A illustrates a CRS patterns when a single transmission antenna is used, FIG. 19B illustrates a CRS pattern when two transmission antennas are used, and FIG. 19C illustrates a CRS pattern when four transmission antennas are used.

The grid 1910 of FIG. 19A illustrates the CRS pattern when a single transmission antenna is used. In FIG. 19A, CRS $R_0$ located in a RE indicated by hatching is used for channel estimation.

FIG. 19B illustrates a CRS pattern when two transmission antennas are used. The grid 1920 of FIG. 19B illustrates the CRS pattern for antenna #0, and CRS R0 located in a RE indicated by hatching is used for channel estimation. Further, the grid 1922 of FIG. 19B illustrates the CRS pattern for the antenna #1, and CRS R1 located in a RE indicated by hatching is used for channel estimation.

FIG. 19C illustrates a CRS pattern when four transmission antennas are used. The grid 1930 of FIG. 19C illustrates the CRS pattern for the antenna #0, and CRS R0 located in a RE indicated by hatching is used for channel estimation.

Further, the grid 1932 of FIG. 19C illustrates the CRS pattern for the antenna #1, and CRS R1 located in a RE indicated by hatching is used for channel estimation. In addition, the grid 1934 of FIG. 19C illustrates the CRS pattern for the antenna #2, and CRS R2 located in a RE indicated by hatching in the grid 1934 is used for channel estimation. In addition, the grid 1936 of FIG. 19C illustrates the CRS pattern for the antenna #3, and CRS R3 located in a RE indicated by hatching is used for channel estimation.

At n time of the reception signal sampled by the ADC, the channel tap value $c_{n_t,n_r,n}(l)$ of an i-th channel between the $n_t$th transmission antenna ($n_t=0,1,\ldots,N_t-1$) and the $n_r$th reception antenna ($n_r=0,1,\ldots,N_r-1$) is defined by equation (64) as follows, $N_t$ denotes the total number of transmission antennas, and $N_r$ denotes the total number of reception antennas.

$$c_{n_t,n_r,n}(l) = \frac{1}{\sqrt{\kappa}} \sum_{i=0}^{L_0-1} \sum_{q=l_i}^{l_i+2n_0} a_{n_t,n_r,n}(i) g\left(q - n_0 - l_i - \frac{\varepsilon_i}{T_c}\right) \delta_{q-l}, \quad (64)$$

$$0 \le l \le L - 1$$

Here, $n_t$ is a transmission antenna number, $n_r$ is a reception antenna number, $L_0$ is the number of multi-paths of a sparse wireless channel, and $L_0$ denotes a chip duration. $a_{n_t,n_r,n}(i)$ denotes a coefficient of i-th path between the $n_t$th transmission antenna and the $n_r$th reception antenna at n time of the reception signal, $\tau_i$ denotes the delay of the i-th path, and in the case where $0 \le \tau_0 < \tau_1 < \ldots < \tau_{L_0-1}$, $l_i$ and $\varepsilon_i$ are defined as $l_i = \lfloor(\tau_i - \tau_0)/T_c\rfloor$ and $\varepsilon_i \triangleq (\tau_i - \tau_0) - l_i \cdot T_c$, respectively.

When a composite filter including a transmission filter and a reception filter is referred to as g(t), it is assumed that g(t) has the length of $(2n_0+1)T_c$. L is the delay spread value and represented by $L = \lfloor(\tau_{L_0-1} - \tau_0)/T_c\rfloor + 2n_0 + 1$. $\delta_q$ is Kronecker delta. When viewing an ADC sample space, at an n time, a component contributed by the i-th path to l-th channel tap $c_{n_t,n_r,n}(l)$ is $a_n(i) \cdot g(l - n_0 - l_i - \varepsilon_i/T_c)$ when q=l, from $q = l_i, \ldots, l_i + 2n_0$. When $$\sum_{i=0}^{L_0-1} \mathbb{E}[|a_{n_t,n_r,n}(i)|^2] = 1$$

is satisfied by equation (64), k is a constant satisfying equation (65) defined as follows:

$$\sum_{l=0}^{L-1} E[|c_{n_t,n_r,n}(l)|^2] = 1 \quad (65)$$

In equation (65), E is an expectation value, $c_{n_t,n_r,n}(l)$ denotes the l-th channel tap value between the $n_t$th transmission antenna and the $n_r$th reception antenna at the timing n when viewing the ADC sample space, and L is the delay spread value.

In equation (64), $c_{n_t,n_r,n}(l)$ is represented as a linear superposition of $a_{n_t,n_r,n}(i)$, so when vector $c_{n_t,n_r,n}$ and $a_{n_t,n_r,n}$ are defined as $c_{n_t,n_r,n} \triangleq [c_{n_t,n_r,n}(0) \ldots c_{n_t,n_r,n}(L-1)]^T \in \mathbb{C}^{L \times 1}$ and $a_{n_t,n_r,n} \triangleq [a_{n_t,n_r,n}(0) \ldots a_{n_t,n_r,n}(L_0-1)]^T \in \mathbb{C}^{L_0 \times 1}$, and the superscript denotes transpose, and the relationship between $c_{n_t,n_r,n}$ and $a_{n_t,n_r,n}$ can be defined by equation (66) as follows:

$$c_{n_t,n_r,n} = \Xi a_{n_t,n_r,n} \quad (66)$$

$c_{n_t,n_r,n}$ and $a_{n_t,n_r,n}$ are each defined by $c_{n_t,n_r,n} \triangleq [c_{n_t,n_r,n}(0) \ldots c_{n_t,n_r,n}(L-1)]^T \in \mathbb{C}^{L \times 1}$ and $a_{n_t,n_r,n} \triangleq [a_{n_t,n_r,n}(0) \ldots a_{n_t,n_r,n}(L_0-1)]^T \in \mathbb{C}^{L_0 \times 1}$, the superscript denotes transpose, $c_{n_t,n_r,n}(l)$ denotes the l-th channel tap value between the $n_t$th transmission antenna and the $n_r$th reception antenna at the timing n when viewing the ADC sample space, $a_{n_t,n_r,n}(i)$ denotes a coefficient of an i-th path between the $n_t$th transmission antenna and the $n_r$th reception antenna at the timing n of the reception signal, and $\Xi \in \mathbb{C}^{L \times L_0}$ denotes a leakage matrix and satisfies the equation (66).

It can be considered that a reception signal at the RE k of an OFDM symbol m (m=0, ..., 13) where the CRS of sub-frame s transmitted from the $n_t$th transmission antenna to the $n_r$ reception antenna is located. Since the base station and the UE can know the value and location of the CRS which is orthogonally arranged for each transmission antenna, a signal $y_{n_t,n_r,s,m}(k)$ obtained by dividing the reception signal of the $n_r$ reception antenna into the CRS value associated with the $n_t$th transmission antenna can be defined by equation (67) as follows:

$$y_{n_t,n_r,s,m}(k) = \sum_{l=0}^{L-1} h_{n_t,n_r,s,m}(l) e^{-j2\pi k l / N} + z_{n_r,s,m}(k). \quad (67)$$

Here, $y_{n_t,n_r,s,m}(k)$ is a signal obtained by dividing the reception signal of the $n_r$th reception antenna signal into the CRS value associated with the $n_t$ transmission antenna, and $z_{n_r,s,m}(k)$ is a noise signal in the RE k of the second OFDM symbol where the CRS signal is located from a signal of the $n_r$th reception antenna. The variance of the noise signal $z_{n_r,s,m}(k)$ is defined by $\sigma_z^2$. When it is assumed that the channel does not change for one OFDM symbol interval, $h_{n_t,n_r,s,m}(l)$ is a value for sampling $c_{n_t,n_r,n}(l)$ for every OFDM symbol m. In FIG. 19A to FIG. 19C, m=0, 4, 7, 11 is an OFDM symbol where the CRS for the transmission antenna #0 and transmission antenna #1 are located, and m=1,8 is the OFDM symbol where the CRS for the transmission antenna #2 and transmission antenna #3 are located. In the OFDM symbol m, the total number of REs occupied by the CRS is $N_{CRS}$, $z_{n_t,n_r,s,m} \in \mathbb{C}^{N_{CRS} \times 1}$ is referred to a vector which arranges noise for the frequency domain where the CRS associated with the $n_t$th transmission antenna is located in ascending order in the OFDM symbol m of the reception antenna, and $y_{n_t,n_r,s,m} \in \mathbb{C}^{N_{CRS} \times 1}$ is referred to a vector which arranges reception signals for the frequency domain where the CRS associated with the $n_t$th transmission antenna is located in ascending order in the OFDM symbol m of the reception antenna. Here, since the receiver can not know the exact delay spread value L, the channel delay spread is typically assumed to be a maximum CP length $N_{CP}$, and taking into account the additional delay spread value according to the transmission filter and the reception filter, the delay spread value L can be defined by equation (68) as follows:

$$L = N_{CP} + 2n_0 + 1 \quad (68)$$

Here, L is a delay spread value, $N_{CP}$ is a maximum CP length, and $2n_0+1$ is an additional delay spread value by the transmission and reception filters.

When the CIR vector is referred to as $h_{n_t,n_r,s,m} \triangleq [h_{n_t,n_r,s,m}(0) \ldots h_{n_t,n_r,s,m}(L-1)]^T \in \mathbb{C}^{L \times 1}$, the reception signal vector is defined as the equation (69) as follows:

$$y_{n_t,n_r,s,m} = F_{N_t}(m) h_{n_t,n_r,s,m} + z_{n_t,n_r,s,m} \quad (69)$$

Here, when F is assumed to be a matrix having an entry of u-th row and u'-th column (u, u'=0, ..., N-1) as $e^{-j2\pi u u'/N}$, $F_{n_t}(m)$ is to be referred to as a submatrix including row vectors and column vectors formed from column vector 0 to column vector L−1 of F corresponding to subcarrier index of the RE where the CRS associated with $n_t$ the transmission antenna is located in the OFDM symbol m, and the size of the $F_{n_t}(m)$ is $N_{CRS} \times L$.

According to FIG. 19A to FIG. 19C, it is considered that the CRS for the transmission antenna #0 and the transmission antenna #1 is located on the four OFDM symbols, and a subcarrier index of the REs is occupied by the CRS. In addition, when considering that the CRS for the transmission antenna #2 and the transmission antenna #3 is located on the two OFDM symbols, and an index of the REs is occupied by the CRS, submatrix $F_{n_t}(m)$ can be represented by equation (70) and equation (71) as follows:

$$F_0(0)=F_0(7)=F_1(4)=F_1(11)=F_2(1)=F_3(8) \triangleq F(0) \qquad (70)$$

Here, when F is assumed to be a matrix having an entry of u-th row and u'-th column (u, u'=0, ..., N−1) as $e^{-j2\pi uu'/N}$, $F_{n_t}(m)$ is to be referred to as a submatrix including row vectors and column vectors formed from column vector 0 to column vector L−1 of F corresponding to subcarrier index of the RE where the CRS associated with $n_t$ the transmission antenna is located in the OFDM symbol m.

$$F_0(4)=F_0(11)=F_1(0)=F_1(7)=F_2(8)=F_3(1) \triangleq F(4) \qquad (71)$$

Here, when F is assumed to be a matrix having an entry of u-th row and u'-th column (u, u'=0, ..., N−1) as $e^{-j2\pi uu'/N}$, $F_{n_t}(m)$ is to be referred to as a submatrix including row vectors and column vectors formed from column vector 0 to column vector L−1 of F corresponding to subcarrier index of the RE where the CRS associated with $n_t$ the transmission antenna is located in the OFDM symbol m.

FIG. 20A to FIG. 20D illustrate reference signal patterns to be used for each region of an OFDM symbol when four transmission antennas are used in a MIMO system. The line protruding from the top in FIG. 20A to FIG. 20D indicates a boundary of a sub-frame.

Figure 20A:
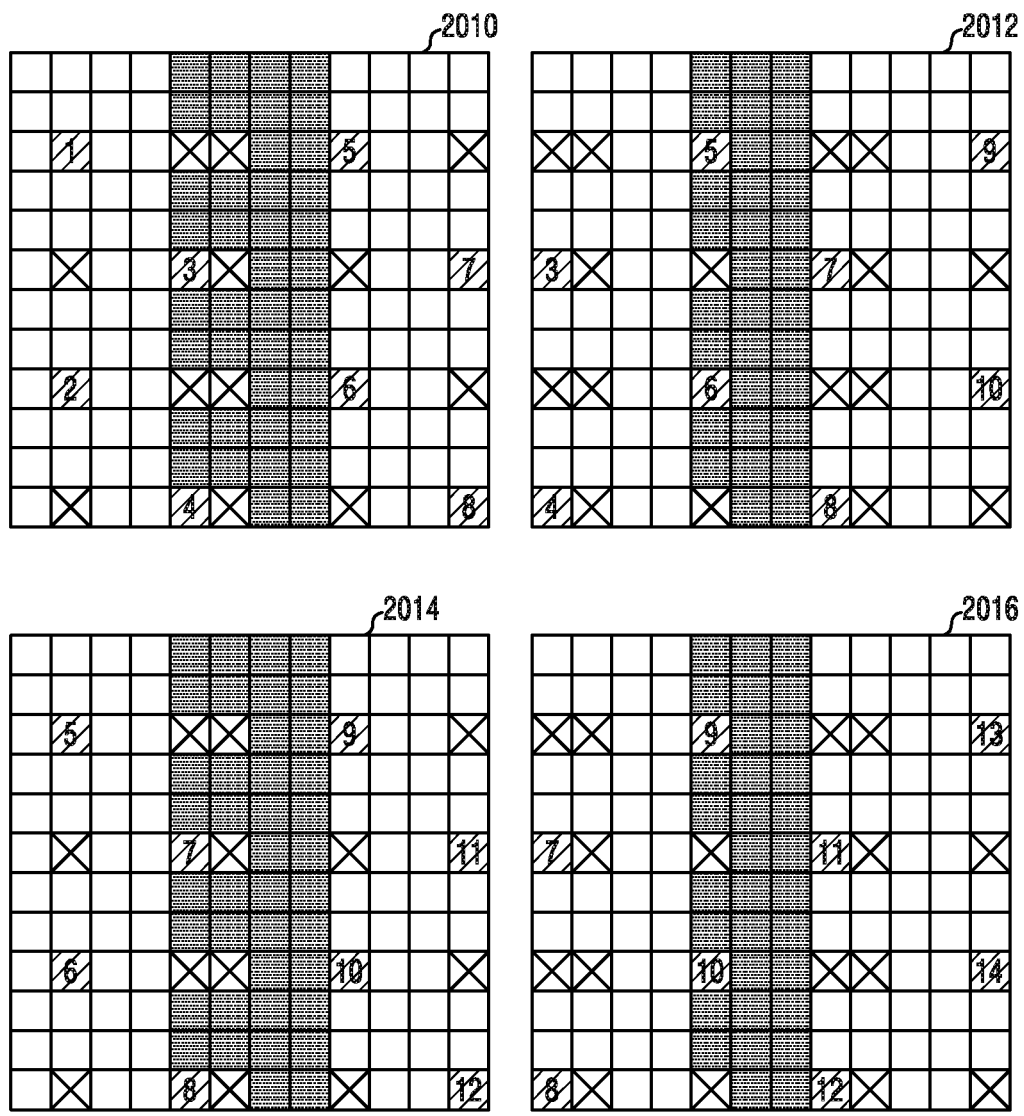
FIG. 20A to FIG. 20D illustrate reference signal patterns to be used for each region of an OFDM symbol when four transmission antennas are used in a MIMO system.

FIG. 20A shows a CRS pattern used for each region of the OFDM symbol for antenna #0. Referring to the CRS related to the transmission antenna #0 shown in FIG. 20A, when four OFDM symbols, indicated by a shaded region in a grid 2010 of FIG. 20A, are located in the sub-frame s, a reception RE where the CRS associated with the transmission antenna #0 is located is used for the channel estimation, and the sub-frame and the OFDM symbol index are (s−1,11), (s, 0), (s, 4), (s, 7). When three OFDM symbols, indicated by a shaded region in a grid 2012 of FIG. 20A, are located in the sub-frame s, a reception RE where the CRS associated with the transmission antenna #0 is located is used for the channel estimation, and the sub-frame and the OFDM symbol index are (s, 0), (s, 4), (s, 7), (s, 11). When four OFDM symbols, indicated by a shaded region in a grid 2014 of FIG. 20A, are located in the sub-frame s, a reception RE where the CRS associated with the transmission antenna #0 is located is used for the channel estimation, and the sub-frame and the OFDM symbol index are (s, 4), (s, 7), (s, 11), (s+1,0). When three OFDM symbols, indicated by a shaded region in a grid 2016 of FIG. 20A, are located in the sub-frame s, a reception RE where the CRS associated with the transmission antenna #0 is located is used for the channel estimation, and the sub-frame and the OFDM symbol index are (s, 7), (s, 11), (s+1,0), (s+1,4).

Figure 20B:
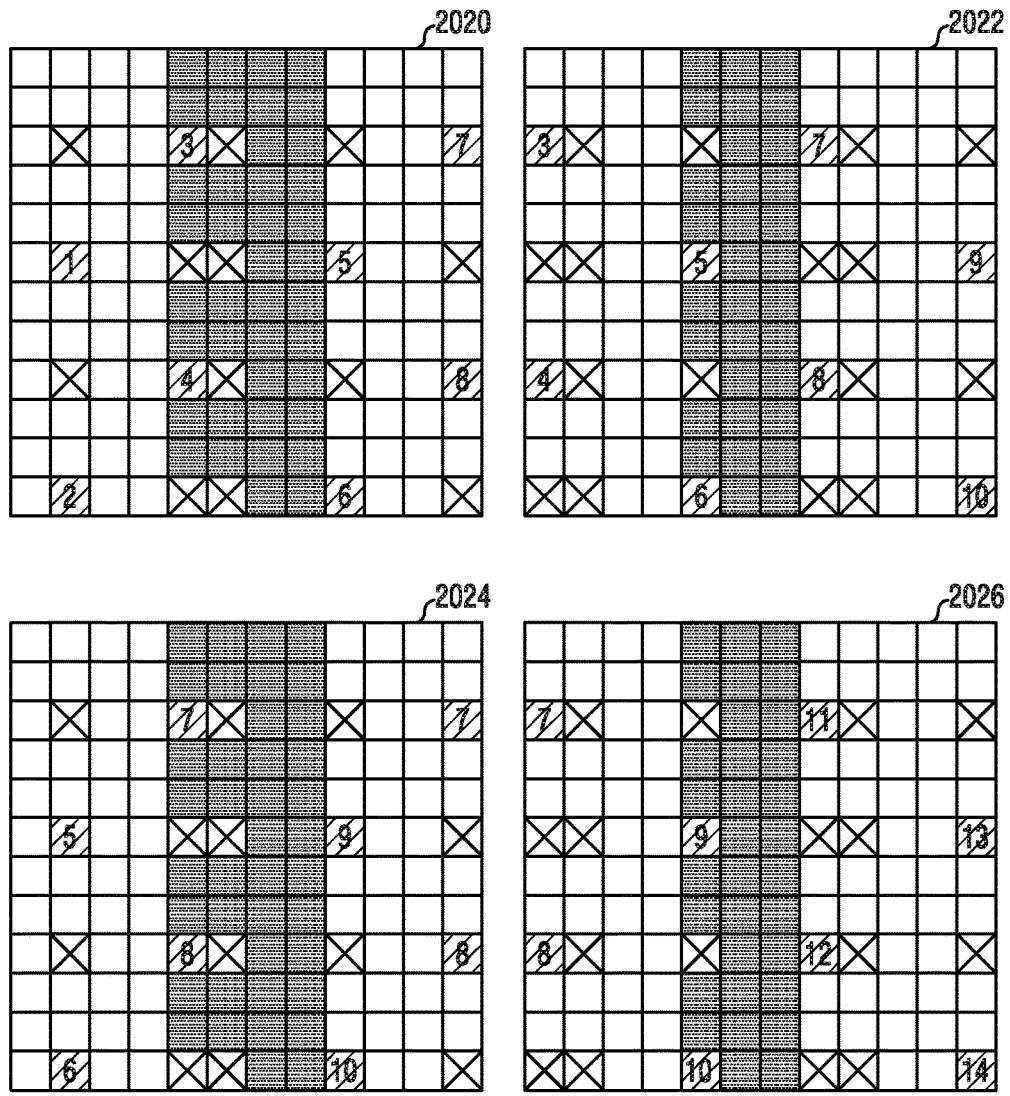

FIG. 20B shows a CRS pattern used for each region of the OFDM symbol for antenna #1. The channel estimation using the CRS associated with the transmission antenna #1 shown in FIG. 20B can be understood as being similar to that of FIG. 20A.

Figure 20C:
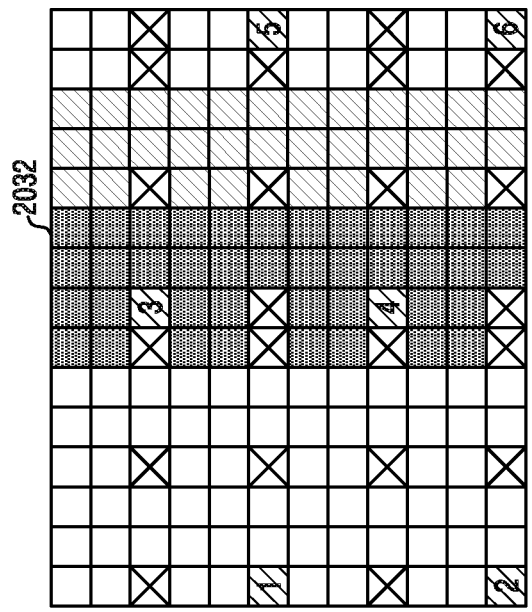
Figure 20C:
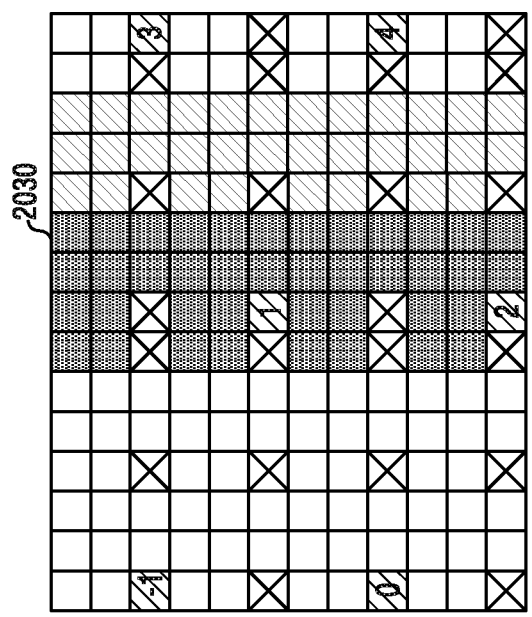

FIG. 20C shows a CRS pattern used for each region of the OFDM symbol for antenna #2. When seven OFDM symbols, indicated by shading and hatching in a grid 2030 of FIG. 20C, are located in the sub-frame s, a reception RE where the CRS associated with the transmission antenna #2 is located is used for the channel estimation, and the sub-frame and the OFDM symbol index are (s−1,8), (s, 1), (s, 8). When seven OFDM symbols, indicated by shading and hatching in a grid 2032 of FIG. 20C, are located in the sub-frame s, the reception RE where the CRS associated with the transmission antenna #2 is located is used for the channel estimation, and the sub-frame and the OFDM symbol index are (s, 1), (s, 8), (s+1,1).

Figure 20D:
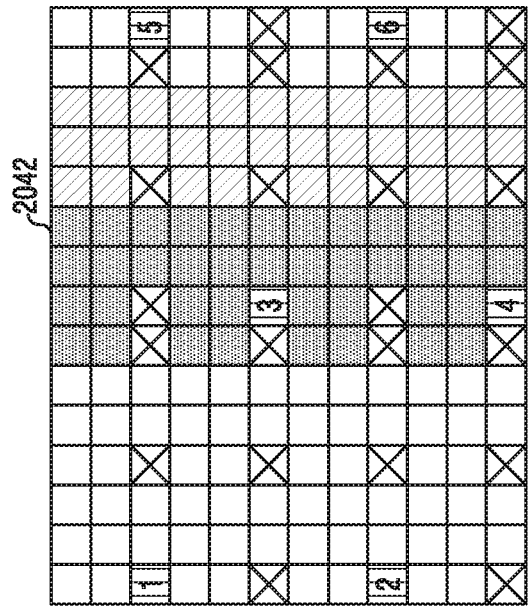
Figure 20D:
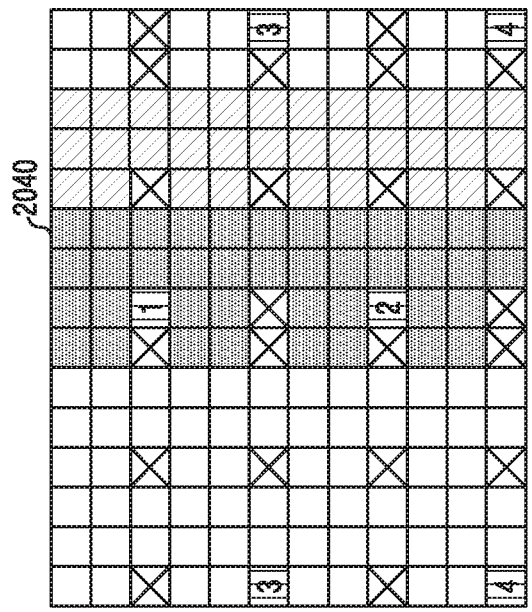

FIG. 20D shows a CRS pattern used for each region of the OFDM symbol for antenna #3. The channel estimation using the CRS associated with the transmission antennas #3 with respect to grids 2040 and 2042 of FIG. 20D can be understood as being similar to that of FIG. 20C.

In FIGS. 20A to 20D, a case is illustrated of observing an RE where the CRS is located for the channel estimation by allowing for the delay up to 8 OFDM symbols based on the first OFDM symbol in the area indicated by shading or hatching. However, the scope of the present disclosure allows a symbol delay larger than that shown in FIG. 20A to FIG. 20D or includes a case of increasing the number of the CRS received prior to the s-th sub-frame, and can be applied to an embodiment including the same.

For the channel estimation in regions indicated by shading or hatching in FIG. 20A to FIG. 20D, when a signal is obtained by dividing the reception signal of the $n_r$th reception antenna into the CRS value associated with the $n_t$ transmission antenna and the same is arranged in the order of the RE index, the arranged signal is referred to as vector $y_{n_t,n_r}$ and defined by equation (72) as follows:

$$y_{n_t,n_r}=\Phi h_{n_t,n_r}+z_{n_t,n_r} \qquad (72)$$

Here, $y_{n_t,n_r}$ is a signal vector which lists, in the order of RE index, signals obtained by dividing the reception signal of the $n_r$th reception antenna signal into the CRS value associated with the $n_t$ transmission antenna, $\Phi$ is the system matrix, $h_{n_t,n_r}$ is the channel vector which a signal from the $n_t$th transmission antenna experiences, which is received by the $n_r$ reception antenna, and $z_{n_t,n_r}$ is a noise signal vector from the $n_t$th transmission antenna, which is received by the $n_r$ reception antenna.

The system matrix $\Phi$ with respect to the shaded region in the grids 2010 and 2014 in FIG. 20A, which use the CRS associated with the transmission antenna #0 and the shaded region in the grids 2022 and 2026 in FIG. 20B, which use the CRS associated with the transmission antenna #1 is defined by equation (73) as follows:

$$\Phi \triangleq I_2 \otimes \begin{bmatrix} F(4) & \\ & F(0) \end{bmatrix} \in \mathbb{C}^{4N_{CRS} \times 4L} \qquad (73)$$

Here, $\Phi$ is a system matrix, $I_2$ is an Identity matrix, F is a matrix having an entry of u-th row and u'-th column (u, u'=0, ..., N−1) as $e^{-j2\pi uu'/N}$, $\otimes$ is a Kronecker product operator, $N_{CRS}$ is the total number of REs occupied by the CRS in the OFDM symbol m, and L is a delay spread value.

The system matrix $\Phi$ with respect to the shaded region in the grids 2012 and 2016 in FIG. 20A, which use the CRS associated with the transmission antenna #0 and the shaded region in the grids 2020 and 2024 in FIG. 20B, which use the CRS associated with the transmission antenna #1 is defined by equation (74) as follows:

$$\Phi \triangleq I_2 \otimes \begin{bmatrix} F(0) & \\ & F(4) \end{bmatrix} \in \mathbb{C}^{4N_{CRS} \times 4L} \quad (74)$$

Here, $\Phi$ is a system matrix, $I_2$ is an Identity matrix, F is a matrix having an entry of u-th row and u'-th column (u, u'32 0, . . . , N−1) as $e^{-j2\pi uu'/N}$, $\otimes$ is a Kronecker product operator, $N_{CRS}$ is the total number of REs occupied by the CRS in the OFDM symbol m, and L is a delay spread value.

The system matrix $\Phi$ with respect to the regions indicated by shading and hatching in the grid 2030 in FIG. 20C, which use the CRS associated with the transmission antenna #2 and the regions indicated by shading and hatching in the grid 2042 in FIG. 20D, which use the CRS associated with the transmission antenna #3 is defined by equation (75) as follows:

$$\Phi \triangleq \begin{bmatrix} F4 & & \\ & F0 & \\ & & F4 \end{bmatrix} \in \mathbb{C}^{3N_{CRS} \times 3L} \quad (75)$$

Here, $\Phi$ is a system matrix, $I_2$ is an Identity matrix, F is a matrix having an entry of u-th row and u'-th column (u, u'=0, . . . , N−1) as $e^{-j2\pi uu'/N}$, $\otimes$ is a Kronecker product operator, $N_{CRS}$ is the total number of RE occupied by the CRS in the OFDM symbol m, and L is a delay spread value.

The system matrix $\Phi$ with respect to the regions indicated by shading and hatching in the grid 2032 in FIG. 20C, which use the CRS associated with the transmission antenna #2 and the regions indicated by shading and hatching in the grid 2040 in FIG. 20D, which use the CRS associated with the transmission antenna #3 is defined by equation (76) as follows:

$$\Phi \triangleq \begin{bmatrix} F0 & & \\ & F4 & \\ & & F0 \end{bmatrix} \in \mathbb{C}^{3N_{CRS} \times 3L} \quad (76)$$

The shaded region in the grid 2010 in FIG. 20A, which uses the CRS associated with the transmission antenna #0 is defined by equation (77) to equation (79) as follows:

$$y_{n_t,n_r} \triangleq [y_{n_t,n_r,s-1,11}^T, y_{n_t,n_r,s,0}^T, y_{n_t,n_r,s,4}^T, y_{n_t,n_r,s,7}^T]^T \in \mathbb{C}^{4N_{CRS} \times 1} \quad (77)$$

$$h_{n_t,n_r} \triangleq [h_{n_t,n_r,s-1,11}^T, h_{n_t,n_r,s,0}^T, h_{n_t,n_r,s,4}^T, h_{n_t,n_r,s,7}^T]^T \in \mathbb{C}^{4L \times 1} \quad (78)$$

$$z_{n_t,n_r} \triangleq [z_{n_t,n_r,s-1,11}^T, z_{n_t,n_r,s,0}^T, z_{n_t,n_r,s,4}^T, z_{n_t,n_r,s,7}^T]^T \in \mathbb{C}^{4N_{CRS} \times 1} \quad (79)$$

The shaded region in the grid 2012 in FIG. 20A, which uses the CRS associated with the transmission antenna #0 is defined by equation (80) to equation (82) as follows:

$$y_{n_t,n_r} \triangleq [y_{n_t,n_r,s,0}^T, y_{n_t,n_r,s,4}^T, y_{n_t,n_r,s,7}^T, y_{n_t,n_r,s,11}^T]^T \in \mathbb{C}^{4N_{CRS} \times 1} \quad (80)$$

$$h_{n_t,n_r} \triangleq [h_{n_t,n_r,s,0}^T, y_{n_t,n_r,s,4}^T, y_{n_t,n_r,s,7}^T, y_{n_t,n_r,s,11}^T]^T \in \mathbb{C}^{4L \times 1} \quad (81)$$

$$z_{n_t,n_r} \triangleq [y_{n_t,n_r,s,0}^T, y_{n_t,n_r,s,4}^T, y_{n_t,n_r,s,7}^T, y_{n_t,n_r,s,11}^T]^T \in \mathbb{C}^{4N_{CRS} \times 1} \quad (82)$$

The shaded region in the grid 2014 in FIG. 20A, which use the CRS associated with the transmission antenna #0 is defined by equation (83) to equation (85) as follows:

$$y_{n_t,n_r} \triangleq [y_{n_t,n_r,s,4}^T, y_{n_t,n_r,s,7}^T, y_{n_t,n_r,s,11}^T, y_{n_t,n_r,s+1,0}^T]^T \in \mathbb{C}^{4N_{CRS} \times 1} \quad (83)$$

$$h_{n_t,n_r} \triangleq [h_{n_t,n_r,s,4}^T, h_{n_t,n_r,s,7}^T, h_{n_t,n_r,s,11}^T, h_{n_t,n_r,s+1,0}^T]^T \in \mathbb{C}^{4L \times 1} \quad (84)$$

$$z_{n_t,n_r} \triangleq [z_{n_t,n_r,s,4}^T, z_{n_t,n_r,s,7}^T, z_{n_t,n_r,s,11}^T, z_{n_t,n_r,s+1,0}^T]^T \in \mathbb{C}^{4N_{CRS} \times 1} \quad (85)$$

The shaded region in the grid 2016 in FIG. 20A, which uses the CRS associated with the transmission antenna #0 is defined by equation (86) to equation (88) as follows:

$$y_{n_t,n_r} \triangleq [y_{n_t,n_r,s,7}^T, y_{n_t,n_r,s,11}^T, y_{n_t,n_r,s+1,0}^T, y_{n_t,n_r,s+1,4}^T]^T \in \mathbb{C}^{4N_{CRS} \times 1} \quad (86)$$

$$h_{n_t,n_r} \triangleq [h_{n_t,n_r,s,7}^T, h_{n_t,n_r,s,11}^T, h_{n_t,n_r,s+1,0}^T, h_{n_t,n_r,s+1,4}^T]^T \in \mathbb{C}^{4L \times 1} \quad (87)$$

$$z_{n_t,n_r} \triangleq [z_{n_t,n_r,s,7}^T, z_{n_t,n_r,s,11}^T, z_{n_t,n_r,s+1,0}^T, z_{n_t,n_r,s+1,4}^T]^T \in \mathbb{C}^{4N_{CRS} \times 1} \quad (88)$$

In equation (77) to equation (88), $y_{n_t,n_r}$ is a signal vector obtained by dividing the reception signal of the $n_r$ th reception antenna into the CRS value associated with the $n_t$ transmission antenna and the same is arranged in the order of the RE index, $\Phi$ is the system matrix, $h_{n_t,n_r}$ is the channel vector experienced by a signal from the $n_t$th transmission antenna, which is received by the $n_r$ reception antenna, and $z_{n_t,n_r}$ is a noise signal vector from the $n_t$th transmission antenna, which is received by the $n_r$ reception antenna. $y_{n_t,n_r}$ is referred to as a vector which lists, in ascending order, signals of a frequency domain where the CRS associated with the $n_t$ transmission antenna is located in the OFDM symbol m of the $n_r$th reception antenna, $h_{n_t,n_r,s,m}$ is the CIR vector, and $z_{n_t,n_r,s,m}$ vector which lists, in ascending order, noise of a frequency domain where the CRS associated with the $n_t$ transmission antenna is located in the OFDM symbol m of the reception antenna.

For the CRS associated with the transmission antenna #1 shown in FIG. 20B, $y_{n_t,n_r}$, $h_{n_t,n_r}$, and $z_{n_t,n_r}$ can be defined to be similar to that of equation (77) to equation (88).

The region indicated by shading and hatching in the grid 2030 in FIG. 20C, which uses the CRS associated with the transmission antenna #2 is defined by equation (89) to equation (91) as follows:

$$y_{n_t,n_r} \triangleq [y_{n_t,n_r,s-1,8}^T, y_{n_t,n_r,s,1}^T, y_{n_t,n_r,s,8}^T]^T \in C^{3N_{CRS} \times 1} \quad (89)$$

$$h_{n_t,n_r} \triangleq [h_{n_t,n_r,s-1,8}^T, h_{n_t,n_r,s,1}^T, h_{n_t,n_r,s,8}^T]^T \in C^{3L \times 1} \quad (90)$$

$$z_{n_t,n_r} \triangleq [z_{n_t,n_r,s-1,8}^T, z_{n_t,n_r,s,1}^T, z_{n_t,n_r,s,8}^T]^T \in C^{3N_{CRS} \times 1} \quad (91)$$

The region indicated by shading and hatching in the grid 2032 in FIG. 20C, which uses the CRS associated with the transmission antenna #2 is defined by equation (92) to equation (94) as follows:

$$y_{n_t,n_r} \triangleq [y_{n_t,n_r,s,1}^T, y_{n_t,n_r,s,8}^T, y_{n_t,n_r,s+1,1}^T]^T \in C^{3N_{CRS} \times 1} \quad (92)$$

$$h_{n_t,n_r} \triangleq [h_{n_t,n_r,s,1}^T, h_{n_t,n_r,s,8}^T, h_{n_t,n_r,s+1,1}^T]^T \in C^{3L \times 1} \quad (93)$$

$$z_{n_t,n_r} \triangleq [z_{n_t,n_r,s,1}^T, z_{n_t,n_r,s,8}^T, z_{n_t,n_r,s+1,1}^T]^T \in C^{3N_{CRS} \times 1} \quad (94)$$

In equation (89) to equation (94), $y_{n_t,n_r}$ is a signal vector obtained by dividing the reception signal of the $n_r$ th reception antenna into the CRS value associated with the $n_t$ transmission antenna and the same is arranged in the order of RE index, $\Phi$ is the system matrix, $h_{n_t,n_r}$ is the channel vector experienced by a signal from the $n_t$th transmission antenna, which is received by the $n_r$ reception antenna, and $z_{n_t,n_r}$ is a noise signal vector from the $n_t$th transmission antenna, which is received by the $n_r$ reception antenna. $y_{n_t,n_r}$ is referred to as a vector which lists, in ascending order, signals of a frequency domain where the CRS associated with the $n_t$ transmission antenna is located in the OFDM symbol m of the $n_r$-th reception antenna, $h_{n_t,n_r,s,m}$ is the CIR vector, and $z_{n_t,n_r,s,m}$ vector which lists, in ascending order, noise of a frequency domain where the CRS associated with the $n_t$ transmission antenna is located in the OFDM symbol m of the reception antenna.

For the CRS associated with the transmission antenna #3, $y_{n_t,n_r}$, $h_{n_t,n_r}$, and $z_{n_t,n_r}$ can be defined to be similar to that of equation (89) to equation (94).

The channel frequency response (CFR) of the RE k of the OFDM symbol m in the area indicated by shading or hatching shown in FIG. 20A to FIG. 20D can be defined by equation (95) as follows:

$$\eta_{n_t,n_r,s,m}(k) = \sum_{l=0}^{L-1} h_{n_t,n_r,s,m}(l) e^{-j2\pi kl/N} \tag{95}$$

Here, $\eta_{n_t,n_r,s,m}(k)$ is a CFR at RE k of OFDM symbol m of $n_t$th transmission antenna to $n_r$th reception antenna, $h_{n_t,n_r,s,m}(l)$ is a channel value obtained by sampling $c_{n_t,n_r,n}(l)$ that is the l-th channel tap value between $n_t$th transmission antenna and $n_r$th reception antenna for each OFDM symbol m, and N is the size of the system matrix.

When the CRS associated with the transmission antennas # 0 and # 1 is used, the estimation value of $\eta_{n_t,n_r,s,m}(k)$ by using a LMMSE method is defined by equation (96) as follows:

$$\hat{\eta}_{n_t,n_r,s,m}(k) = E[\eta_{n_t,n_r,s,m}(k) y_{n_t,n_r}^H](E[y_{n_t,n_r} y_{n_t,n_r}^H])^{-1} y_{n_t,n_r}$$
$$= E[\eta_{n_t,n_r,s,m}(k) h_{n_t,n_r}^H]\Phi^H (\Phi E[h_{n_t,n_r} h_{n_t,n_r}^H]\Phi^H + \sigma_z^2 I_{4N_{CRS}})^{-1} y_{n_t,n_r} \tag{96}$$

Here, $\eta_{n_t,n_r,s,m}(k)$ is the estimation value of CFR $\eta_{n_t,n_r,s,m}(k)$ at RE k of OFDM symbol m of $n_t$th transmission antenna to $n_r$th reception antenna, E is the average value, $y_{n_t,n_r}$ is a signal vector obtained by dividing the reception signal of the $n_r$th reception antenna into the CRS value associated with the $n_t$ transmission antenna and the same is arranged in the order of RE index, $I_{4N_{CRS}}$ is an Identity matrix, $h_{n_t,n_r}$ is a channel vector experienced by a signal from the $n_t$th transmission antenna, which is received by the $n_r$ reception antenna, $\Phi$ is the system matrix, $\sigma_z^2$ is the variance of the noise signal $z_{n_r,s,m}(k)$, $[g]^H$ is a complex conjugate and transpose operator, and $[g]^{-1}$ is an inverse matrix or a pseudo inverse matrix operator.

The equation (95) and equation (96) imply that the receiver can know the position of the non-zero entry of $h_{n_t,n_r}$ (hereinafter, referred to be as the support of $h_{n_t,n_r}$). Actually, the receiver can not know how the transmission filter of the base station is configured, has difficulty in knowing the location of the support for the channel taps in a noisy environment, and should obtain a second moment value of channels such as $E[\eta_{s,m}(k) h_{n_t,n_r}^H]$ and $E[h_{n_t,n_r} h_{n_t,n_r}^H]$ from the above equation (95) and equation (96). Therefore, it can be seen that the LMMSE estimator is difficult to implement in a real receiver modem.

However, as described above, since $h_{n_t,n_r}$ is a sparse vector, when a support recovery is performed utilizing a compressed sensing (CS) technique, it is possible to obtain a performance close to the optimal estimator. Here, the number of supports of $h_{n_t,n_r}$ can be referred to as sparsity. An orthogonal Matching Pursuit (OMP) algorithm is well-known algorithm that is representative of a CS technique, and a stagewise OMP (StOMP) algorithm and a compressive sampling matching pursuit (CoSaMP) algorithm are based on improved OMP algorithm. Since the CoSaMP method can have disadvantage in scarcity, the present disclosure describes the StOMP algorithm that is operating relatively more robustly than the OMP algorithm.

The equation of the system when a static channel is assumed is defined by equation (97) as follows:

$$y_{n_t,n_r} = \Phi h_{n_t,n_r} + z_{n_t,n_r} \tag{97}$$

Here, $y_{n_t,n_r}$ is a signal vector obtained by dividing the reception signal of the $n_r$th reception antenna into the CRS value associated with the $n_t$ transmission antenna and the same is arranged in the order of RE index, $\Phi$ is the system matrix, $h_{n_t,n_r}$ is the channel vector experienced by a signal from the $n_t$th transmission antenna, which is received by the $n_r$ reception antenna, and $z_{n_t,n_r}$ is a noise signal vector from the $n_t$th transmission antenna, which is received by the $n_r$ reception antenna.

The shaded region in the grids 2010 and 2014 in FIG. 20A, which uses the CRS associated with the transmission antenna #0, and the shaded region in the grids 2022 and 2026 in FIG. 20B, which uses the CRS associated with the transmission antenna #1, are defined by equation (98) as follows:

$$\Phi \triangleq \begin{bmatrix} F_4 \\ F_0 \\ F_4 \\ F_0 \end{bmatrix} \in \mathbb{C}^{4N_{CRS} \times L} \tag{98}$$

The shaded region in the grids 2012 and 2016 in FIG. 20A, which uses the CRS associated with the transmission antenna #0, and the shaded region in the grids 2020 and 2024 in FIG. 20B, which uses the CRS associated with the transmission antenna #1, are defined by equation (99) as follows:

$$\Phi \triangleq \begin{bmatrix} F_0 \\ F_4 \\ F_0 \\ F_4 \end{bmatrix} \in \mathbb{C}^{4N_{CRS} \times L} \tag{99}$$

The region indicated by shading and hatching in the grid 2030 in FIG. 20C, which uses the CRS associated with the transmission antenna #2, and the shaded region in the grid 2042 in FIG. 20D, which uses the CRS associated with the transmission antenna #3, are defined by equation (100) as follows:

$$\Phi \triangleq \begin{bmatrix} F_4 \\ F_0 \\ F_4 \end{bmatrix} \in \mathbb{C}^{3N_{CRS} \times L} \quad (100)$$

The region indicated by shading and hatching in the grid 2032 in FIG. 20C, which uses the CRS associated with the transmission antenna #2, and the shaded region in the grid 2040 in FIG. 20D, which use the CRS associated with the transmission antenna #3, are defined by equation (101) as follows:

$$\Phi \triangleq \begin{bmatrix} F_4 \\ F_0 \\ F_4 \end{bmatrix} \in \mathbb{C}^{3N_{CRS} \times L} \quad (101)$$

In equation (98) to equation (101), $\Phi$ is the system matrix, F is a matrix having entries of u-th row and u'-th column (u, u'=0, . . . , N−1) as $e^{-j2\pi u u'/N}$, $N_{CRS}$ is the total number of REs occupied by the CRS in the OFDM symbol m, and L is a delay spread value.

At this time, the vector $h_{n_t,n_r}$ is defined by equation (102) as follows:

$$h_{n_t,n_r} \triangleq [h_{n_t,n_r}(0) \ldots h_{n_t,n_r}(L-1)]^T \in \mathbb{C}^{L \times 1} \quad (102)$$

Here, $h_{n_t,n_r}$ is a channel vector experienced by a signal from the $n_t$th transmission antenna, which is received by the $n_r$ th reception antenna, $h_{n_t,n_r}$ is a channel value, and L is a delay spread value.

Figure 21A:
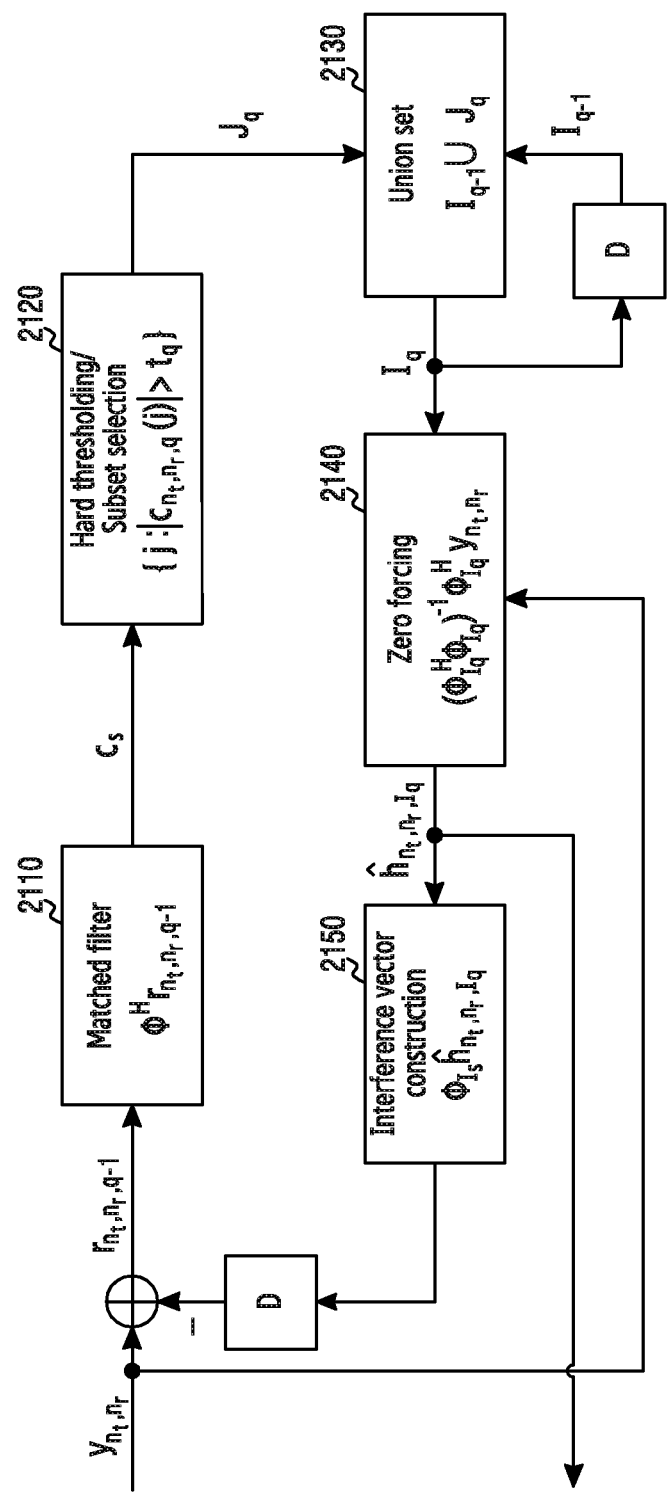
FIG. 21A illustrates an operation of an StOMP algorithm for channel estimation in a MIMO system.

FIG. 21A illustrates an operation of a StOMP algorithm for channel estimation in a MIMO system.

In FIG. 21A, $r_{n_t,n_r,q-1}$ is the residual vector in the q-th repetition stage, and when q=1, $r_{n_t,n_r,0}=y_{n_t,n_r}$, and set $I_0=\varnothing$. Hereinafter, an operation of the q(≥1)th repetition stage will be described.

In step 2110, the reception end 120 applies a matched filter to the residual vector $r_{n_t,n_r,q-1}$ at the q(≥1)-th repetition stage and then outputs the output vector $c_{n_t,n_r,q}$. The j-th entry of the matched filter output $c_{n_t,n_r,q}$ of the $r_{n_t,n_r,q-1}$ is a vector indicating the degree of matching between $r_{n_t,n_r,q-1}$ and the j-th column vector of $\Phi$.

In step 2120, the reception end 120 outputs a set $J_q$ of entries, among entries of $c_{n_t,n_r,q-1}$, where the energy value or the absolute value is greater than the reference value $t_q$.

In step 2130, the reception end 120 obtains the union of $I_{q-1}$ that has been stored in the previous repetition stage and $J_q$, defines the result as $I_q$ and outputs the same. It is assumed that $I_q$ is always listed in ascending order. In the q+1-th repetition stage, $I_q$ obtained in the previous repetition stage can be determined as an input of the union set, and in this process, the delay units is allowed.

In step 2140, the reception end 120 uses, as inputs, the system matrix $\Phi_{I_q}$ of the q-th stage and a reception signal vector $y_{n_t,n_r}$ and outputs, as an output vector, the CIR vector $\hat{h}_{n_t,n_r,I_q}$ estimated through a zero-forcing receiver.

In step 2150, the reception end 120 constructs an interference vector by defining $\Phi_{I_q}\hat{h}_{n_t,n_r,I_q}$ as an interference vector in order to subtract a value contributed by the CIR vector $\hat{h}_{n_t,n_r,I_q}$ estimated from the reception signal $y_{n_t,n_r}$. The value obtained by subtracting $\Phi_{I_q}\hat{h}_{n_t,n_r,I_q}$ from the reception signal $y_{n_t,n_r}$ is defined as the residual vector $r_{n_t,n_r,q}$ at the q+1th repetition stage, and the delay unit can be used for this process.

Repeated operations illustrated in FIG. 21A can be stopped when the prescribed maximum number of repetitions has been reached or when $\|r_{n_t,n_r,q}\|^2$ is smaller than the reference value, or an entry having the largest absolute value of the entry of $c_{n_t,n_r,q}$ is less than the reference value. The CIR vector $\hat{h}_{n_t,n_r} \triangleq [\hat{h}_{n_t,n_r}(0) \ldots \hat{h}_{n_t,n_r}(L-1)]^T$ estimated using the StOMP algorithm has a non-zero value for the index of the $I_q$ set, and has a zero value for the index of the complement of the $I_q$ set. The CFR can be estimated from the estimated $\hat{h}_{n_t,n_r}$ and be defined by equation (103) as follows:

$$\hat{\eta}_{n_t,n_r}(k) = \sum_{l=0}^{L-1} \hat{h}_{n_t,n_r}(l)e^{-j2\pi kl/N} \quad (103)$$

Figure 21B:
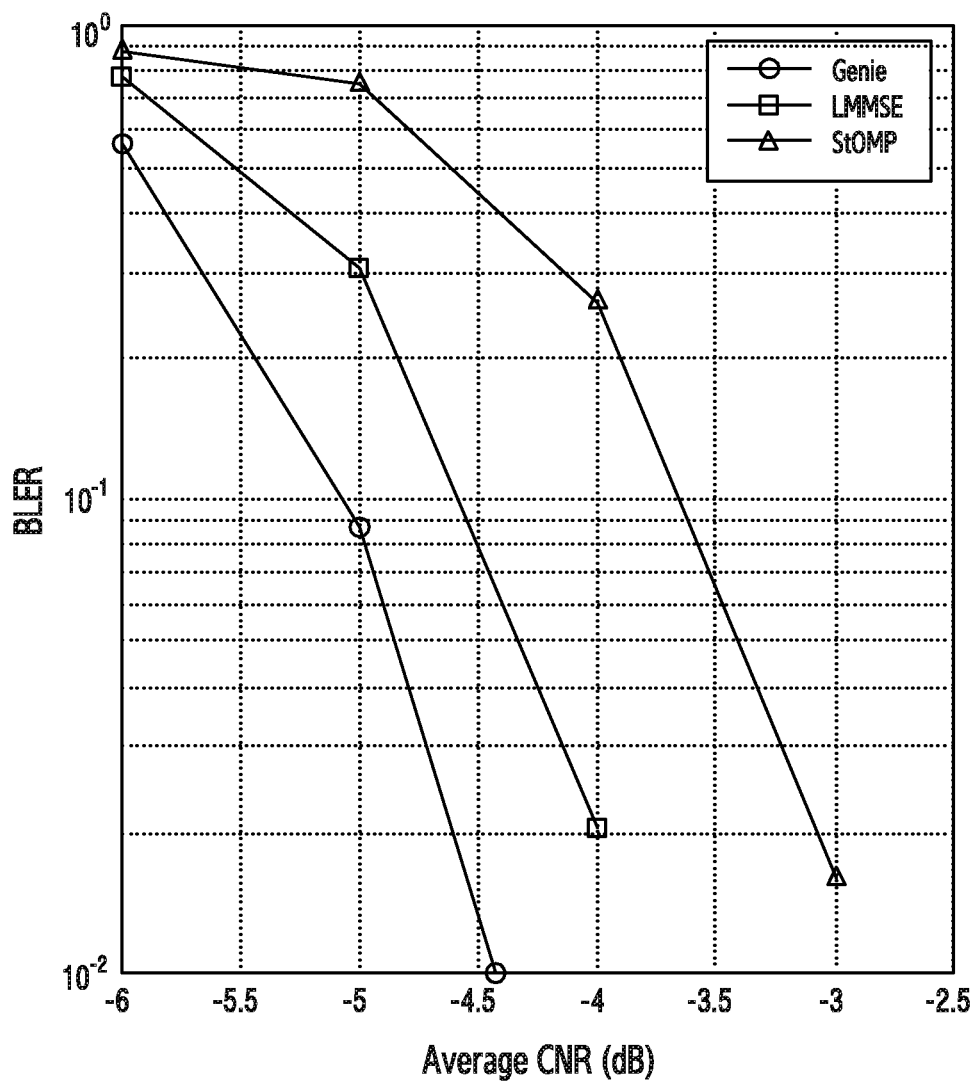
FIG. 21B and FIG. 21C show graphs of the BLER performance according to a multiple channel estimation technique in a MIMO system.
Figure 21C:
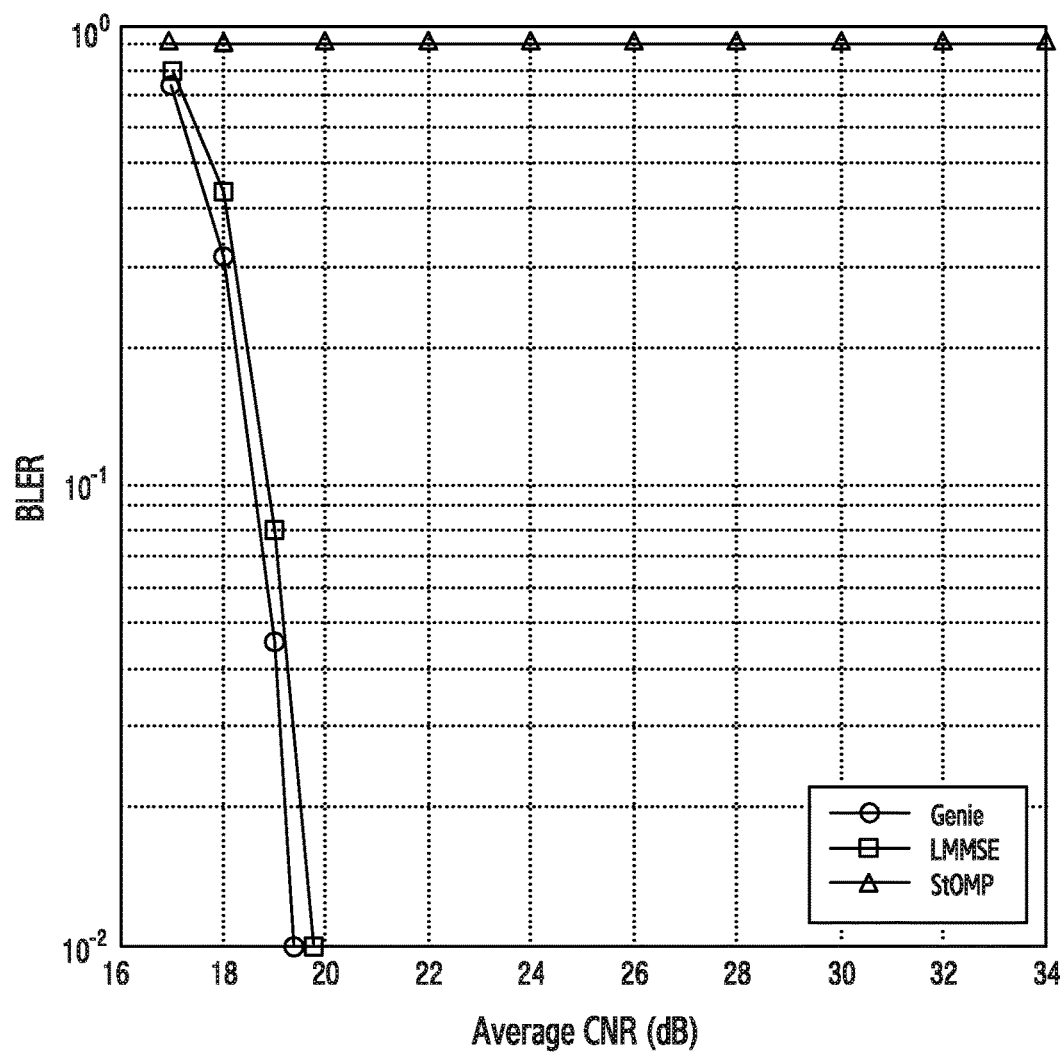

FIG. 21B to FIG. 21C illustrate the BLER performance of the various channel estimation techniques in the MIMO system.

FIG. 21B is a graph illustrating the BLER performance when MCS is zero in various channel estimation techniques. The horizontal axis of FIG. 21B indicates an average CNR in a unit of dBs, and the vertical axis indicates the BLER.

The channel is an ETU channel, delay and power profiles are [0 50 120 200 230 500 1600 2300 5000]·ns and [0.1241 0.1241 0.1241 0.1563 0.1563 0.1563 0.0783 0.0494 0.0312] respectively, multi-paths of channels are independent from each other and follow zero mean normal distribution, and the Doppler frequency is 300 Hz. The channel implemented to follow the distribution is scaled so that the total power is one. It is assumed that the MIMO channel has no correlation between antennas. Since the system bandwidth is 10 Mhz, the modulation scheme is Quadrature Phase Shift Keying (QPSK), the number of PRBs scheduled to the terminal is 50, the number of transmission layers are two, the number of transmission antennas is four, the number of reception antenna is two, open-loop MIMO has no rank adaptation, the transport block size is 2792 bits, 27200 bits can be included in 50 PRBs, an effective channel code rate is 2792/27 200=0.1026, and the channel decoder operates in a max log-map scheme. It is assumed that an effective pulse shaping filter for transmission and reception has sync function which has nine taps. A turbo decoder has eight repetition operations, and targets a channel during 2000 sub-frame intervals. Looking at the BLER curves illustrated in FIG. 21B, it can be seen that the StOMP method shows 0.93 dB performance degradation compared to the optimal channel estimation (LMMSE method) at BLER=0.1. Genie denotes a BLER curve when the channel is known.

FIG. 21C shows a graph indicating the BLER performance when the MCS is 22, among various channel estimation techniques. The horizontal axis of FIG. 21C indicates an average CNR in a unit of dBs, and the vertical axis indicates the BLER. A channel environment is the same as that of FIG. 21B except for the MCS. The size of a transport block is 46888 bits, and 81600-bits can be included in 50 PRB, so that the effective channel code rate is 46888/81600=0.5746. Looking at the BLER curve, it can be seen that BLER<0.01 is achieved according to the optimum channel estimator (LMMSE way) and Genie method. On the other hand, since the channel estimation method using the StOMP algorithm has an error floor phenomenon in a high CNR (carrier to noise ratio) region, it is expected that there is no significant performance improvement even when the retransmission is performed by the base station. Thus, it is required to improve the BLER performance to that of the optimal channel estimator by using a further improved channel estimation method.

According to an embodiment of the present disclosure, Reference Time Signal Interpolation (RSTI) can be used in order to describe the channel that changes over time. In the equation system defined according to the embodiment of the present disclosure, the CFR is estimated by using a one dimensional StOMP or a one-dimensional block StOMP method. The CFR estimation value of the OFDM symbol without CRS can be estimated from the estimated CFR.

FIG. 22A to FIG. 22D illustrate a reference signal pattern to be used for each region of the OFDM symbol when four transmission antennas are used in a MIMO system. The line protruding from the top of FIG. 22A to FIG. 22D indicates a boundary of sub-frame.

Figure 22A:
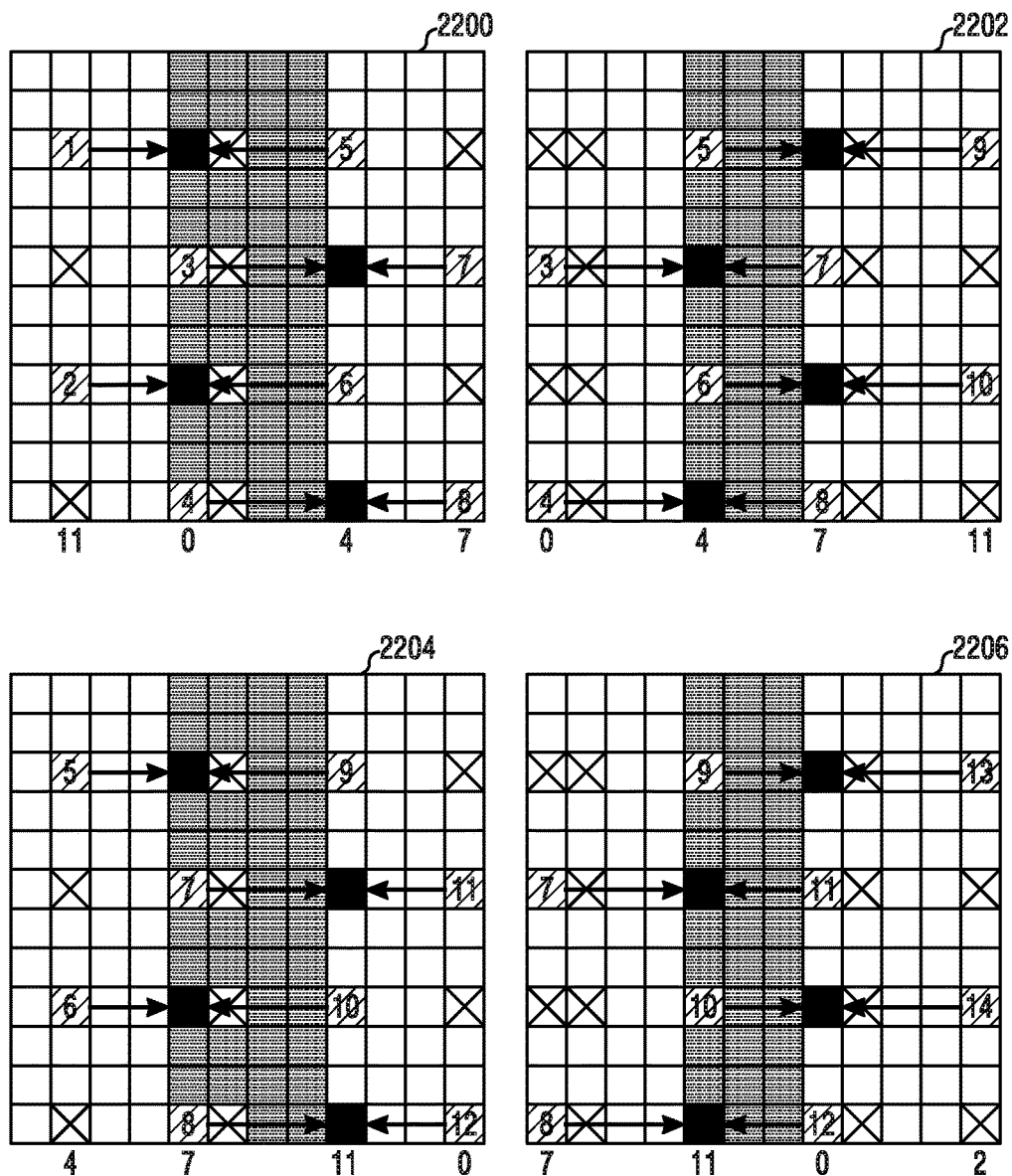
FIG. 22A to FIG. 22D illustrate reference signal patterns to be used for each region of an OFDM symbol when four transmission antennas are used in a MIMO system.

FIG. 22A illustrates a CRS pattern associated with the transmission antenna #0. When four OFDM symbols indicated by the shaded area shown in the grid 2200 of FIG. 22A is located in the sub-frame s, a reception signal on the RE of the black color between RE #3 and RE #4 of the OFDM symbol 0 can be obtained by linear interpolating a signal obtained by dividing a reception signal on the RE #2 located on the OFDM symbol 11 of sub-frame s−1 into the CRS value of the location thereof and a signal obtained by dividing a reception signal on the RE #6 located on the OFDM symbol 4 of sub-frame s into the CRS value of the location thereof. In addition, a reception signal on the RE of the black color above the RE #3 of the OFDM symbol 0 can be obtained by linear interpolating a signal obtained by dividing a reception signal on the RE #1 located on the OFDM symbol 11 of sub-frame s−1 into the CRS value of the location thereof and a signal obtained by dividing a reception signal on the RE #5 located on the OFDM symbol 4 of sub-frame s into the CRS value of the location thereof. In addition, a reception signal on the RE of black color under the RE #6 of the OFDM symbol 4 can be obtained by linear interpolating a signal obtained by dividing a reception signal on the RE #4 located on the OFDM symbol 0 of sub-frame s into the CRS value of the location thereof and a signal obtained by dividing a reception signal on the RE #8 located on the OFDM symbol 7 of sub-frame s into the CRS value of the location thereof. In addition, a reception signal on the RE of the black color between the RE #5 and the RE #6 of the OFDM symbol 4 can be obtained by linear interpolating a signal obtained by dividing a reception signal on the RE #3 located on the OFDM symbol 0 of sub-frame s into the CRS value of the location thereof and a signal obtained by dividing a reception signal on the RE #7 located on the OFDM symbol 7 of sub-frame s into the CRS value of the location thereof. That is, the reception signal on the one RE of the black color can be obtained by linear interpolating signals on two REs connected by arrows.

Figure 22B:
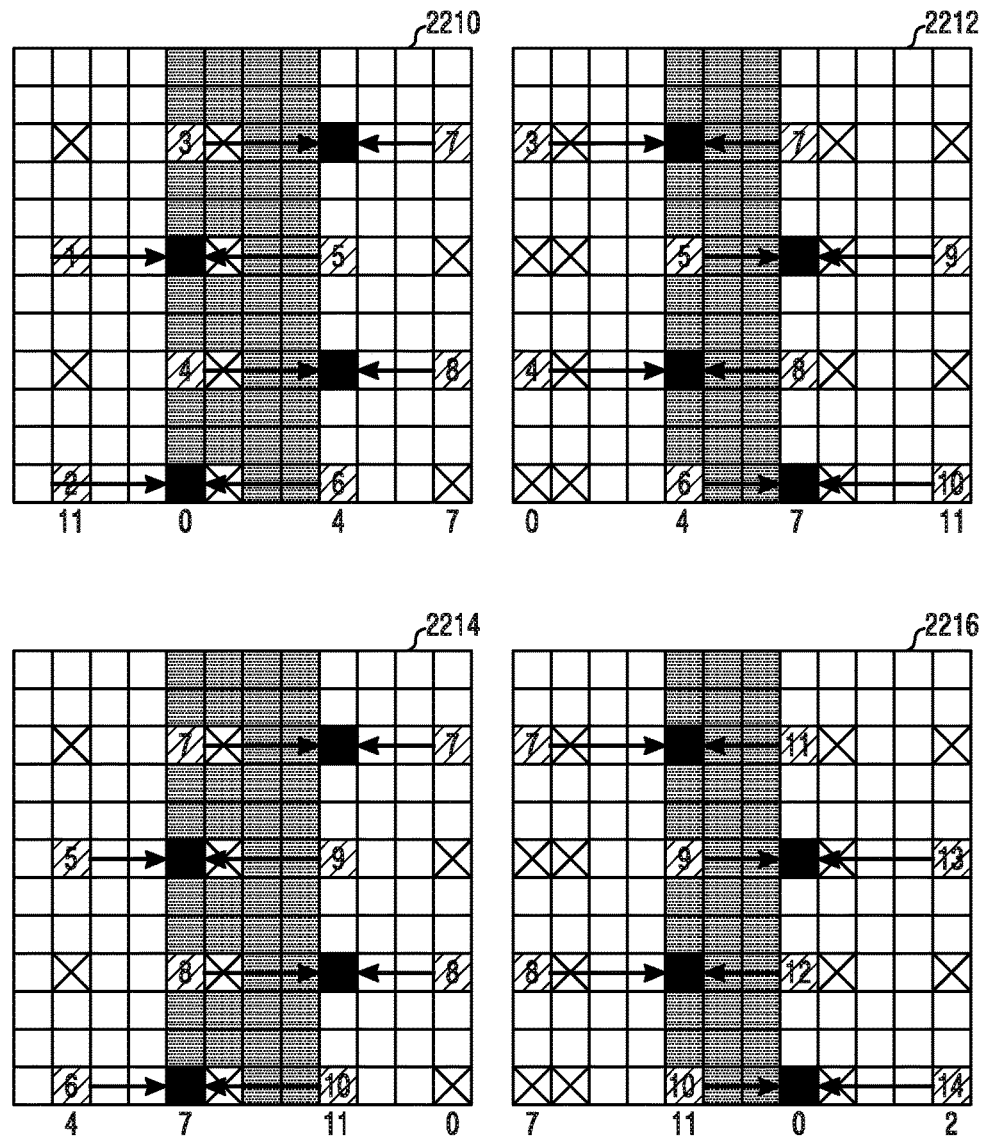
Figure 22C:
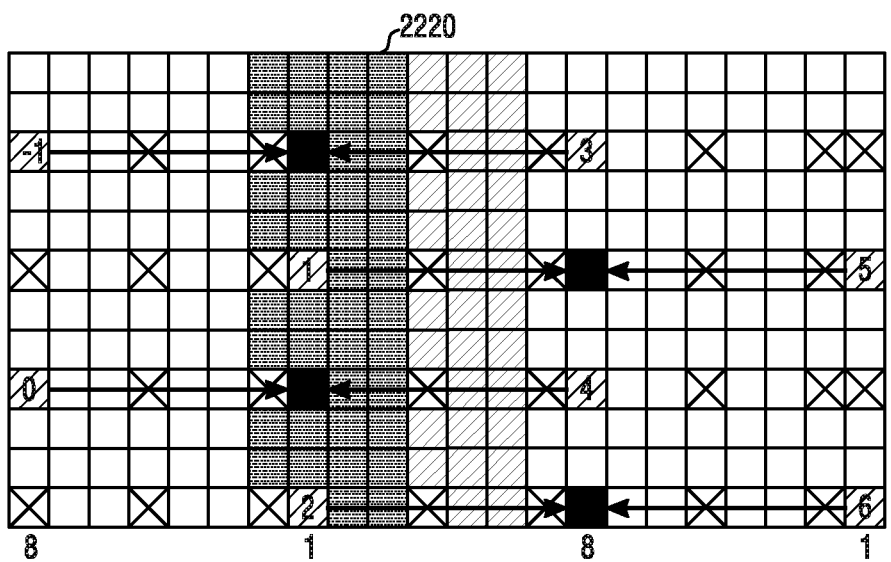
Figure 22C:
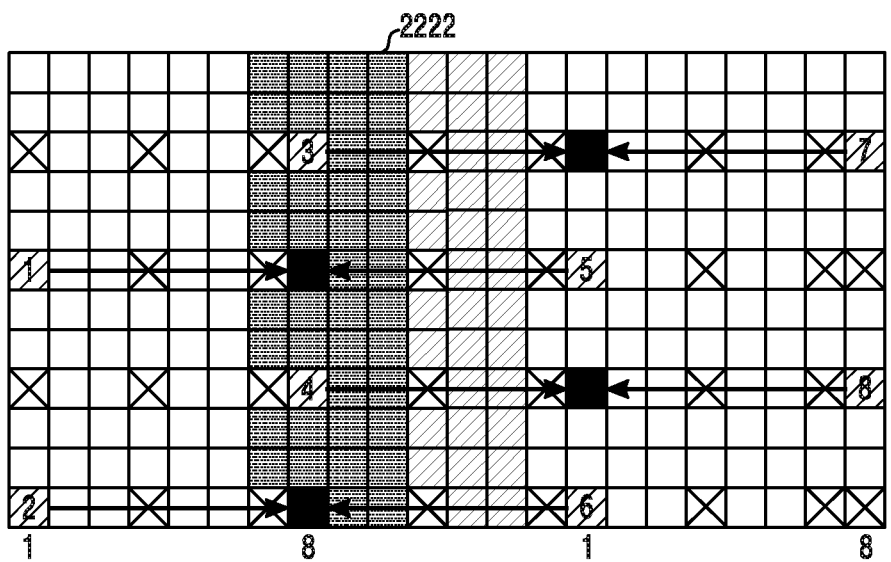
Figure 22D:
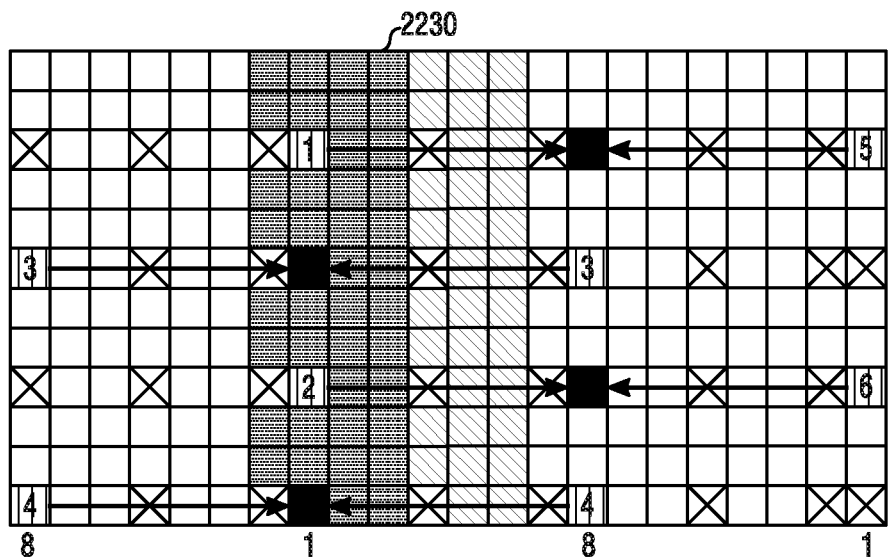
Figure 22D:
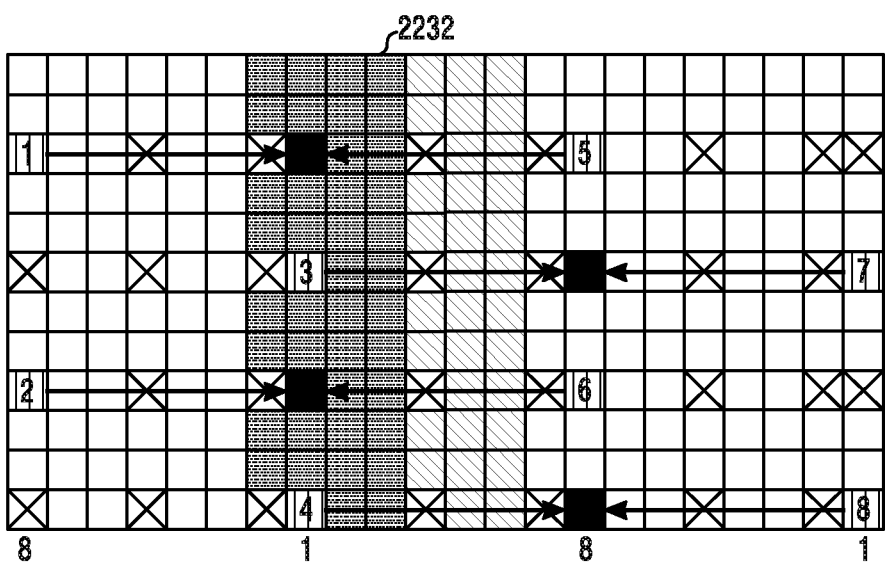

The reception signal of the black color on the RE on the grids 2202, 2204, and 2206 of FIG. 22A and on the area indicated by shading or hatching shown in FIG. 22B to 22D can be obtained in the same manner as the description above. Then, when the signal obtained by dividing the reception signal on the RE where CRS is located in OFDM symbol m of the sub-frame s into the CRS value and the signal obtained by linear interpolation are arranged in the order of RE index and defined as vector $x_{n_t,n_r,s,m} \hat{I} \pounds^{2N_{CRS'}1}$, and the vector $x_{n_t,n_r,s,m} \hat{I} \pounds^{2N_{CRS'}1}$ can be defined by equation (104) as follows:

$$x_{n_t,n_r,s,m} = \Omega h_{n_t,n_r,s,m} + w_{n_t,n_r,s,m} \quad (104)$$

Here, in a transmission antenna $n_t$, a reception antenna $n_r$, sub-frame s, and OFDM symbol m, the entry of vector $x_{n_t,n_r,s,m} \hat{I} \pounds^{2N_{CRS'}1}$ is a noise signal on the RE with respect to a reception signal that is not linearly interpolated, and is a sum of noise obtained by linear interpolating the noise on the two REs to be interpolated and the interference that can occur when the channel does not linearly change, with respect to a reception signal obtained by performing linear interpolation. $\Omega$ is a sub-matrix made up of row vectors and column vectors from column vector 0 to L−1 column vector of F corresponding to the index of REs where CRS associated with the $n_t$-th transmission antennas in the OFDM symbol m and CRS generated by the interpolation are located. Therefore, the size of $\Omega$ is $2N_{CRS} \times L$ and has the same index of RE, regardless of the transmission antennas and the OFDM symbol index by interpolation, as shown in FIG. 22A to FIG. 22D.

Figure 23:
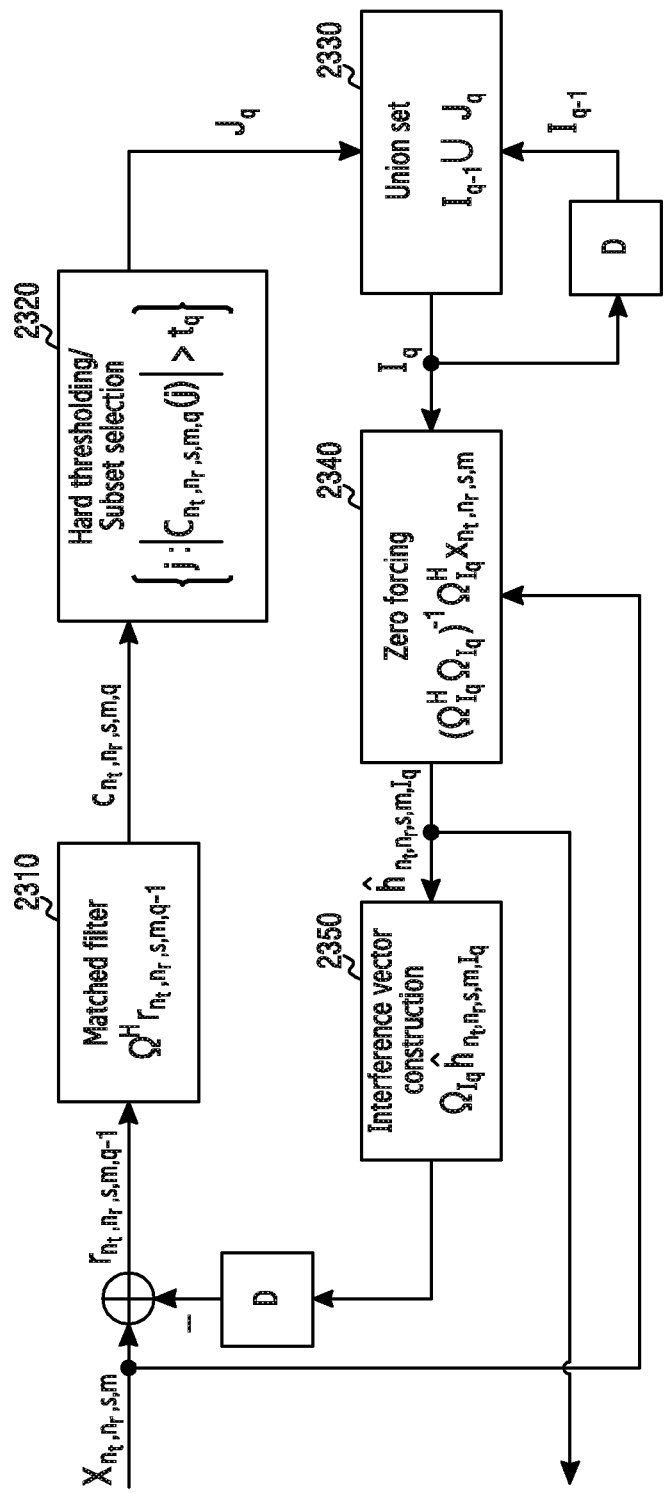
FIG. 23 illustrates an operation of a StOMP algorithm in a MIMO system according to an embodiment of the present disclosure.

FIG. 23 shows an operation of the StOMP algorithm according to an embodiment of the present disclosure in a MIMO system.

In step 2310, the reception end 120 applies a matched filter to a residual vector $r_{n_t,n_r,s,m,q-1}$ in the q(≥1)th repetition stage and then outputs a vector $c_{n_t,n_r,s,m,q}$. The j-th entry in the matched filter output $c_{n_t,n_r,s,m,q}$ of $r_{n_t,n_r,s,m,q-1}$ is a vector indicating the matching degree between $r_{n_t,n_r,s,m,q-1}$ and the j-th column vector of the system matrix $\Omega$.

In step 2320, the reception end 120 outputs a set of entries $J_q$, among entries of in which the energy value or the absolute value thereof is larger than the reference value.

In step 2330, the reception end 120 obtains the union with $I_{q-1}$ stored in the previous repetition stage, outputs the result, and defines the same as $I_q$. It is assumed that $I_q$ is listed in ascending order. In the q+1 repetition stage, $I_q$ obtained from the previous repetition step is used as an input of the union set and a delay unit is used in the process.

In step 2340, the reception end 120 uses, as inputs, the system matrix $\Omega_{I_q}$ in the q-th stage and the reception signal vector $x_{n_t,n_r,s,m}$ and an CIR vector $\hat{h}_{n_t,n_r,s,m,I_q}$ estimated through a zero-forcing receiver is output as the output vector.

In step 2350, the reception end 120 constructs an interference vector by defining $\Omega_{I_q} \hat{h}_{n_t,n_r,s,m,I_q}$ as the interference vector in order to subtract a value contributed by the CIR vector $\hat{h}_{n_t,n_r,s,m,I_q}$ estimated from the reception signal $x_{n_t,n_r,s,m}$. A value obtained by subtracting $\Omega_{I_q} \hat{h}_{n_t,n_r,s,m,I_q}$ from the reception signal $x_{n_t,n_r,s,m}$ is defined as the residual vector $r_{n_t,n_r,s,m,q}$ in the q+1-th repetition stage and the delay unit can be used for this process.

The $t_q$ of the StOMP algorithm shown in FIG. 23 is calculated by equation (105) defined as follows:

$$t_q = a_2 \|r_{n_t,n_r,s,m,q-1}\|_2 / \sqrt{2N_{CRS}} \quad (105)$$

Here, $a_2$ is a predefined coefficient, $r_{n_t,n_r,s,m,q-1}$ is a residual vector in the q-th repetition stage, $\|r_{n_t,n_r,s,m,q-1}\|_2$ is 2-norm of $r_{n_t,n_r,s,m,q-1}$, and $N_{CRS}$ is the total number of REs occupied by the CRS in the OFDM symbol m.

The CIR vector $\hat{h}_{n_t,n_r,s,m,I_q}$ estimated using the StOMP algorithm has a non-zero value for the index of the set of $I_q$, and the CIR vector $\hat{h}_{n_t,n_r,s,m,I_q}$ has a zero value for the index of the complement of the set of $I_q$. The CFR can be estimated from the estimated $\hat{h}_{n_t,n_r,s,m}$ and this is defined by equation (106) as follows:

$$\hat{\eta}_{n_t,n_r,s,m}(k) = \sum_{l=0}^{L-1} \hat{h}_{n_t,n_r,s,m}(l) e^{-j2\pi kl/N} \quad (106)$$

Here, $\hat{\eta}x_{n_t,n_r,s,m}(k)$ is the estimated CFR, $\hat{h}_{n_t,n_r,s,m}(l)$ is the estimated channel value, and L is the delay spread value.

When RSTI is not applied, the system matrix can use F(0) or F(4) according to the CRS pattern instead of $\Omega$, and F is a matrix having entries of the u-th row and u'-th column (u, u'=0, . . . , N−1) as $e^{-j2\pi uu'/N}$.

When four transmission antennas are used and the RSTI technique is not applied to the CRS associated with a predetermined transmission antenna, the RSTI is defined as RSTI=[0 0 0 0]. When the RSTI technique is applied to the CRS associated with the transmission antenna #0 and transmission antenna #1, and the RSTI technique is not applied to the CRS associated with the transmission antenna #0 and transmission antenna #1, it is defined as RSTI=[1 1 0 0]. When the RSTI technique is applied to all CRS associated with transmission antennas, it is defined as RSTI=[1 1 1 1].

In FIG. 22A to FIG. 22D, for shaded regions in the grid 2200 which use CRS associated with the transmission antenna #0, the CFR of the OFDM symbol where the CRS does not exist is estimated by linear interpolating $\hat{\eta}_{0,n_r,s,0}(k)$ and $\hat{\eta}_{0,n_r,s,4}(k)$. In FIG. 22A to FIG. 22D, for shaded regions in the grid 2202 which use CRS associated with the transmission antenna #0, the CFR of the OFDM symbol where the CRS does not exist is estimated by linear interpolating $\hat{\eta}_{0,n_r,s,4}(k)$ and $\hat{\eta}_{0,n_r,s,7}(k)$. For shaded regions in the grid 2204 which use CRS associated with the transmission antenna #0, the CFR of the OFDM symbol where the CRS does not exist is estimated by linear interpolating $\hat{\eta}_{0,n_r,s,7}(k)$ and $\hat{\eta}_{0,n_r,s,11}(k)$. For shaded regions in the grid 2206 which use CRS associated with the transmission antenna # 0, the CFR of the OFDM symbol where the CRS does not exist is estimated by linear interpolating $\hat{\eta}_{0,n_r,s,11}(k)$ and $\hat{\eta}_{0,n_r,s+1,0}(k)$. For the CRS shown in the grids 2210, 2212, 2214, and 2216 of FIG. 22B, which is associated with the transmission antenna #1, the CFR of the OFDM symbol where the CRS does not exist can be estimated by a method similar to the case of transmission antenna #0 of FIG. 22A.

For the regions indicated by shading and hatching in the grid 2220 which use CRS associated with the transmission antenna #2, the CFR of the OFDM symbol where the CRS does not exist is estimated by linear interpolating $\hat{\eta}_{2,n_r,s,1}(k)$ and $\hat{\eta}_{2,n_r,s,8}(k)$. For the regions indicated by shading and hatching in the grid 2222 which use CRS associated with the transmission antenna #2, the CFR of the OFDM symbol where the CRS does not exist is estimated by linear interpolating $\hat{\eta}_{2,n_r,s,8}(k)$ and $\hat{\eta}_{2,n_r,s+1,1}(k)$. For CRS shown in the grids 2230 and 2232 of FIG. 22D associated with the transmission antenna #3, the CFR of the OFDM symbol where the CRS does not exist can be estimated by a method similar to the case of transmission antenna #2 of FIG. 22C.

Figure 24:
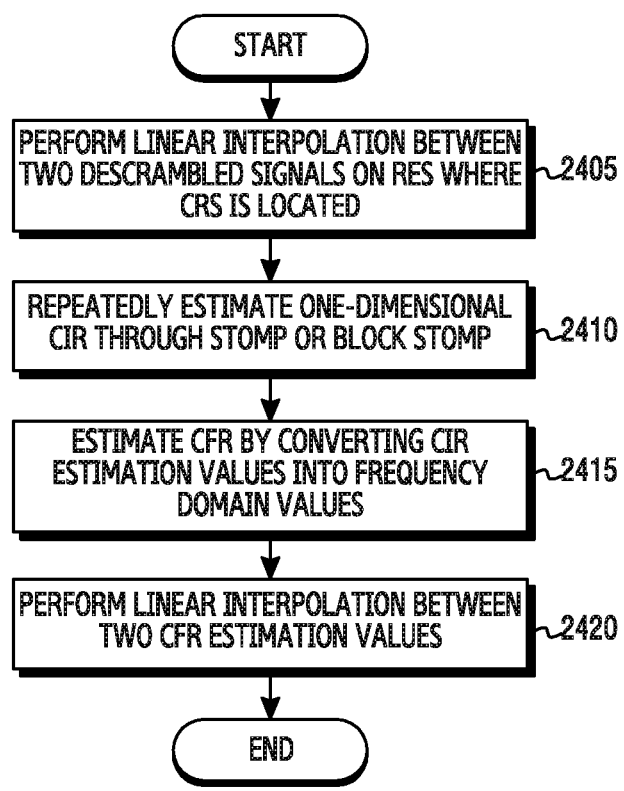
FIG. 24 is a flow chart illustrating channel estimation according to an embodiment of the present disclosure in a MIMO system.

FIG. 24 shows a flow chart for channel estimation using RSTI technique according to an embodiment of the present disclosure in a MIMO system.

In step 2405, the reception end 120 performs linear interpolation between two descrambled signals on the reference signal or REs where CRS is located. The reception end 120 can perform FFT with respect to the reception signal and then convert the reception signal into a frequency domain signal, and can identify an RE where the CRS is located. Thus, the reception end 120 can descramble signals on the REs where the CRS is located and perform linear interpolation between the descrambled signals so as to obtain signals on the RE between REs where CRS is located.

In step 2410, the reception end 120 repeatedly estimates one-dimensional CIR in a time domain through the StOMP or block StOMP. In step 2405, the reception end 120 can perform channel estimation in the time domain by using the signal where the CRS is located and the signal obtained through the linear interpolation. Specifically, the reception end 120 can estimate the CIR value by using the StOMP or block StOMP algorithms.

In step 2415, the reception end 120 estimates the CFR by converting the CIR estimation values into frequency domain values. The reception end 120 can obtain CFR that is the channel estimation value in the frequency domain by performing FFT with respect to the estimated CIR values in step 2410.

In step 2420, the reception end 120 performs linear interpolation between the CFR estimation values. That is, the reception end 120 can obtain channel values for the residual REs by performing linear interpolation, on the frequency domain, with respect to the REs located between the obtained CFRs in step 2415.

In yet another example embodiment of the present disclosure, the block StOMP algorithm can be used. The block StOMP algorithm is an algorithm that uses characteristics that all the entries of the $N_rN_t$ number of ($n_t=0, \ldots, N_t-1$, $n_r=0, \ldots, N_r-1$) of $h_{n_t,n_r}(l)$ are non-zero or zero at the given lag l. The system equation can be defined by equation (107) as follows:

$$x = \Psi h + w \quad (107)$$

x is a reception signal, $\Psi$ is a system matrix, h is a channel vector, and w is a noise vector.

In the case of RSTI=[0 0 0 0], that is the RSTI technique is not applied to any antenna, with respect to the OFDM symbol #0 of antenna #0 and antenna #1, and the OFDM symbol #1 of antenna #2 and antenna #3, the system matrix can be defined by equation (108) to equation (111) as follows:

$$\Psi \triangleq I_2 \otimes \begin{bmatrix} I_{n_r} \otimes F(0) & \\ & I_{n_r} \otimes F(4) \end{bmatrix} \in \mathbb{C}^{4n_r N_{CRS} \times 4n_r L} \quad (108)$$

$$x \triangleq [x_{0,n_r,s,0}^T, x_{1,n_r,s,0}^T, x_{2,n_r,s,1}^T, x_{3,n_r,s,1}^T]^T \in \mathbb{C}^{4n_r N_{CRS} \times 1} \quad (109)$$

$$h \triangleq [h_{0,n_r,s,0}^T, h_{1,n_r,s,0}^T, h_{2,n_r,s,1}^T, h_{3,n_r,s,1}^T]^T \in \mathbb{C}^{4n_r L \times 1} \quad (110)$$

$$w \triangleq [w_{0,n_r,s,0}^T, w_{1,n_r,s,0}^T, w_{2,n_r,s,1}^T, w_{3,n_r,s,1}^T]^T \in \mathbb{C}^{4n_r N_{CRS} \times 1} \quad (111)$$

With respect to the OFDM symbol #4 of antenna #0 and antenna #1, and the OFDM symbol #11 of antenna #0 and antenna #1, the system matrix can be defined by equation (112) to equation (115) as follows:

$$\Psi \triangleq \begin{bmatrix} I_{n_r} \otimes F(4) & \\ & I_{n_r} \otimes F(0) \end{bmatrix} \in \mathbb{C}^{2n_r N_{CRS} \times 2n_r L} \quad (112)$$

$$x \triangleq [x_{0,n_r,s,m}^T, x_{1,n_r,s,m}^T]^T \in \mathbb{C}^{2n_r N_{CRS} \times 1} \quad (113)$$

$$h \triangleq [h_{0,n_r,s,m}^T, h_{1,n_r,s,m}^T]^T \in \mathbb{C}^{2n_r L \times 1} \quad (114)$$

$$w \triangleq [w_{0,n_r,s,m}^T, w_{1,n_r,s,m}^T]^T \in \mathbb{C}^{2n_r N_{CRS} \times 1} \quad (115)$$

With respect to the OFDM symbol #7 of antenna #0 and antenna #1, and the OFDM symbol #8 of antenna #2 and antenna #3, the system matrix can be defined by equation (116) to equation (119) as follows:

$$\Psi \triangleq \begin{bmatrix} I_{n_r} \otimes F(0) & & & \\ & I_{n_r} \otimes F(4) & & \\ & & I_{n_r} \otimes F(4) & \\ & & & I_{n_r} \otimes F(0) \end{bmatrix} \in \mathbb{C}^{4n_r N_{CRS} \times 4n_r L} \quad (116)$$

$$x \triangleq [x_{0,n_r,s,7}^T, x_{1,n_r,s,7}^T, x_{2,n_r,s,8}^T, x_{3,n_r,s,8}^T]^T \in C^{4n_r N_{CRS} \times 1} \quad (117)$$

$$h \triangleq [h_{0,n_r,s,7}^T, h_{1,n_r,s,7}^T, h_{2,n_r,s,8}^T, h_{3,n_r,s,8}^T]^T \in C^{4n_r L \times 1} \quad (118)$$

$$w \triangleq [w_{0,n_r,s,7}^T, w_{1,n_r,s,7}^T, w_{2,n_r,s,8}^T, w_{3,n_r,s,8}^T]^T \in C^{4n_r N_{CRS} \times 1} \quad (119)$$

In equation (108) to equation (119), x is a reception signal, $\Psi$ is a system matrix, h is a channel vector, w is a noise vector, and F is a matrix having entries of u-th row and u'-th column (u, u'=0, . . . , N−1) a $e^{-j2\pi uu'/N}$s.

Figure 25:
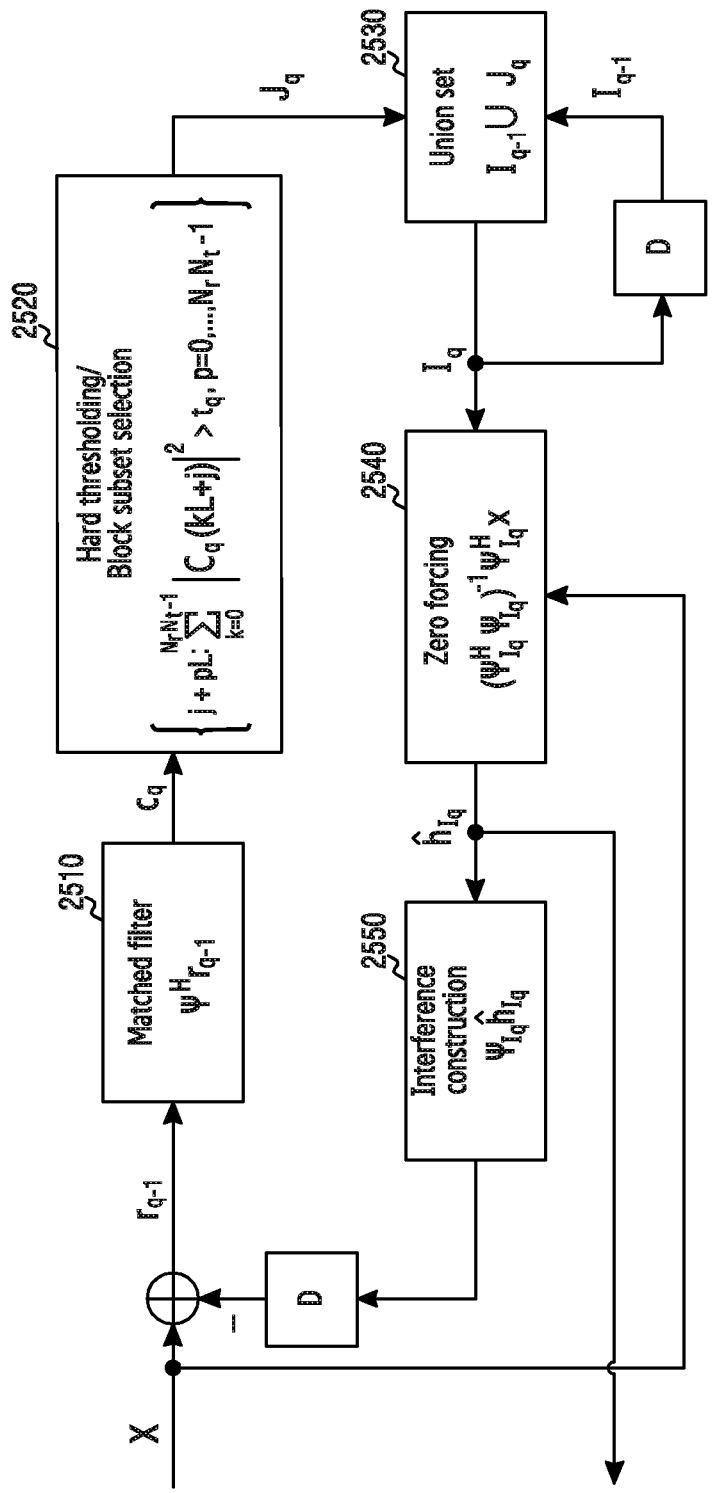
FIG. 25 shows an operation of a block StOMP algorithm according to an embodiment of the present disclosure in a MIMO system.

FIG. 25 shows an operation of the block StOMP algorithm according to an embodiment of the present disclosure. Referring to FIG. 25, $r_{q-1}$ is a residual vector of the q-th repetition stage, and in the first repetition stage (s=1), $r_0$=x and $I_0$=⊗.

In step 2510, the reception end 120 applies a matched filter to a residual vector $r_{q-1}$ in the q(≥1)-th repetition stage and then outputs a vector $c_q$. The i-th entry in the matched filter output $c_q$ of $r_{q-1}$ is a vector indicating the matching degree between $r_{q-1}$ and the i-th column vector of the system matrix $\Psi$. The number of entries of $c_q$ is $N_tN_rL$, and the $N_tN_rL$ entries can be defined by one block.

In step 2520, a set where the sum of the power of entries in the kL+j (j=0, . . . , L−1) block of $c_q$ is larger than the reference value $t_q$ can be called $J_q$. That is, the reception end 120 outputs a set of entries $J_q$, among entries of $c_q$, in which the energy value or the absolute value thereof is larger than the reference value $t_q$. According to an embodiment, the block-specific power value to be compared with the reference value can be a value such as 1-norm, 2-norm, and 3-norm of entries in the block. In another embodiment, the reference value $t_q$ can be changed according to a predetermined period or a predetermined standard at every repetition. In an embodiment, the reference value $t_q$ of the block StOMP algorithm can be calculated by equation (120) defined as follows:

$$t_q = a_3 \|r_{q-1}\|_2 / \sqrt{K} \quad (120)$$

Here, $t_q$ is the reference value of the block StOMP algorithm, $a_3$ is a predefined coefficient, $r_{q-1}$ is the residual vector at the q-th repetition stage, and K is the number of CRSs that are used.

In step 2530, the reception end 120 obtains the union with $I_{q-1}$ stored in the previous repetition stage, outputs the result, and defines the same as $I_q$. It is assumed that $I_q$ is listed in ascending order. In the q+1 repetition stage, $I_q$ obtained from the previous repetition step is used as an input of the union set and a delay unit is used in the process. For example, when $N_t$=4, $N_r$=2, and linear interpolation is performed by RSTI, $K=N_tN_r\cdot 2N_{CRS}=16N_{CRS}$, and when the linear interpolation is not performed, $K=N_tN_rN_{CRS}=8N_{CRS}$.

In step 2540, the reception end 120 uses, as inputs, the system matrix $\Psi_{I_q}$ in the q-th stage and the reception signal vector x, and an CIR vector $\hat{h}_{I_q}$ estimated through a zero-forcing receiver is output as the output vector.

In step 2550, the reception end 120 constructs an interference vector by defining $\Psi_{I_q}\hat{h}_{I_q}$ as the interference vector in order to subtract a value contributed by the CIR vector $\hat{h}_{I_q}$ estimated from the reception signal x. A value obtained by subtracting $\Psi_{I_q}\hat{h}_{I_q}$ from the reception signal x is defined as the residual vector $r_q$ in the q+1-th repetition stage and the delay unit can be used for this process.

Operations described above can be repeated for a predetermined number of times, and the operations can be stopped when the prescribed maximum number of repetitions has been reached or when $\|r_q\|^2$ is smaller than the reference value, or an entry having the largest absolute value of the entry of $c_q$ is less than the reference value. The CIR vector $\hat{h}$ estimated using the block StOMP algorithm has a non-zero value for the index of set $I_q$, and has a zero value for the index of the complement of the set $I_q$. Thereafter, the CFR can be estimated by using equation (103), and the CFR of the OFDM symbol where CRS does not exist can be estimated by performing linear interpolation similar to the StOMP method to which the RSTI is applied.

Figure 26A:
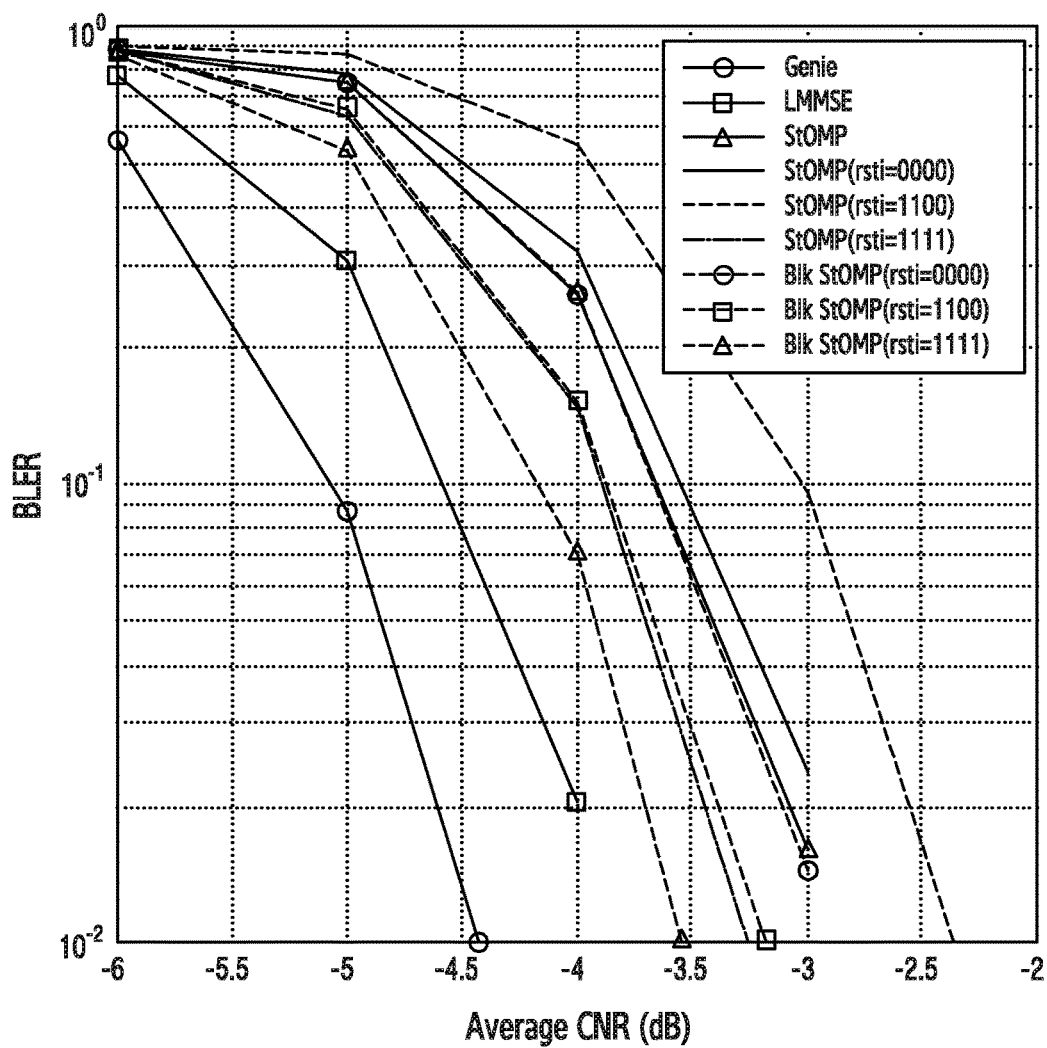
FIG. 26A and FIG. 26B illustrate graphs of the BLER performance of the multiple channel estimation technique in the MIMO system.
Figure 26B:
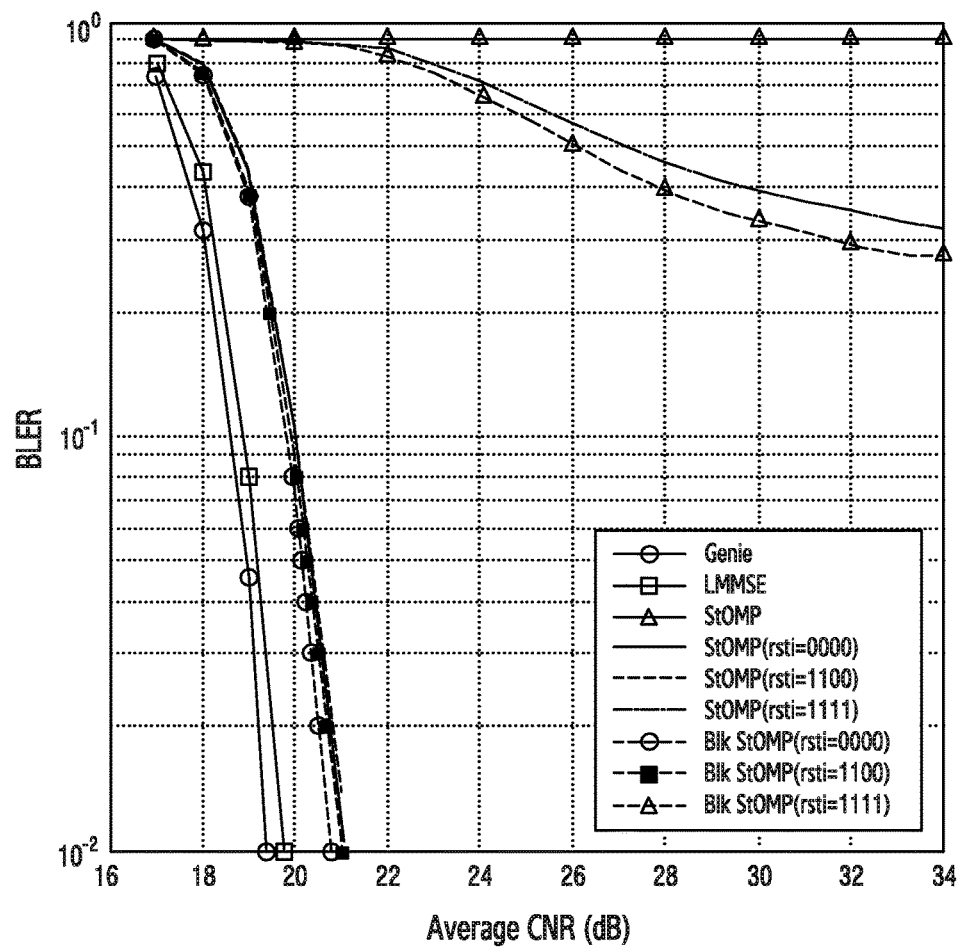

FIG. 26A to FIG. 26B show a graph of the BLER performance according to various channel estimation techniques in the MIMO system.

FIG. 26A illustrates the BLER performance when MCS is zero in various channel estimation techniques. In FIG. 26A, the horizontal axis indicates the average CNR in a unit of dBs, and the vertical axis indicates the BLER. An experimental environment is the same as that of FIG. 21B. Looking at the BLER curve, it can be seen that the block StOMP method to which RSTI=[1 1 1 1] is applied has the performance deterioration of about 0.4 dB compared to the LMMSE that is close to the optimal channel estimator at BLER=0.1. From these results, it is seen that the block StoMP method has a gain of 0.5 dB compared to StOMP method that assumes a static channel. In addition, it can be seen that the StOMP method to which RSTI=[1 1 1 1] is applied has performance degradation of about 0.7 dB compared to the optimal channel estimator at BLER=0.1. Among RSTI=[0 0 0 0], RSTI=[1 1 0 0], and RSTI=[1 1 1 1], both the StOMP and block StOMP methods have the most excellent performance in case of RSTI=[1 1 1 1].

FIG. 26B illustrates the BLER performance when the MCS is 22 in various channel estimation techniques. In FIG. 26B, the horizontal axis indicates the average CNR in a unit of dBs, and the vertical axis indicates the BLER. An experimental environment is the same as that of FIG. 21C. The channel estimation method using a StOMP that assumes a static channel indicates the error flow phenomenon, but the StOMP and block StOMP methods to which RSTI=[0 0 0 0] and RSTI=used the [1 1 0 0] are applied satisfy a condition of BLER<0.01 in a high CNR region. That is, in the high Doppler frequency domain and high CNR region, the linear interpolation for the reception signal on the RE where CRS does not exist can not be appropriate.

Figure 27:
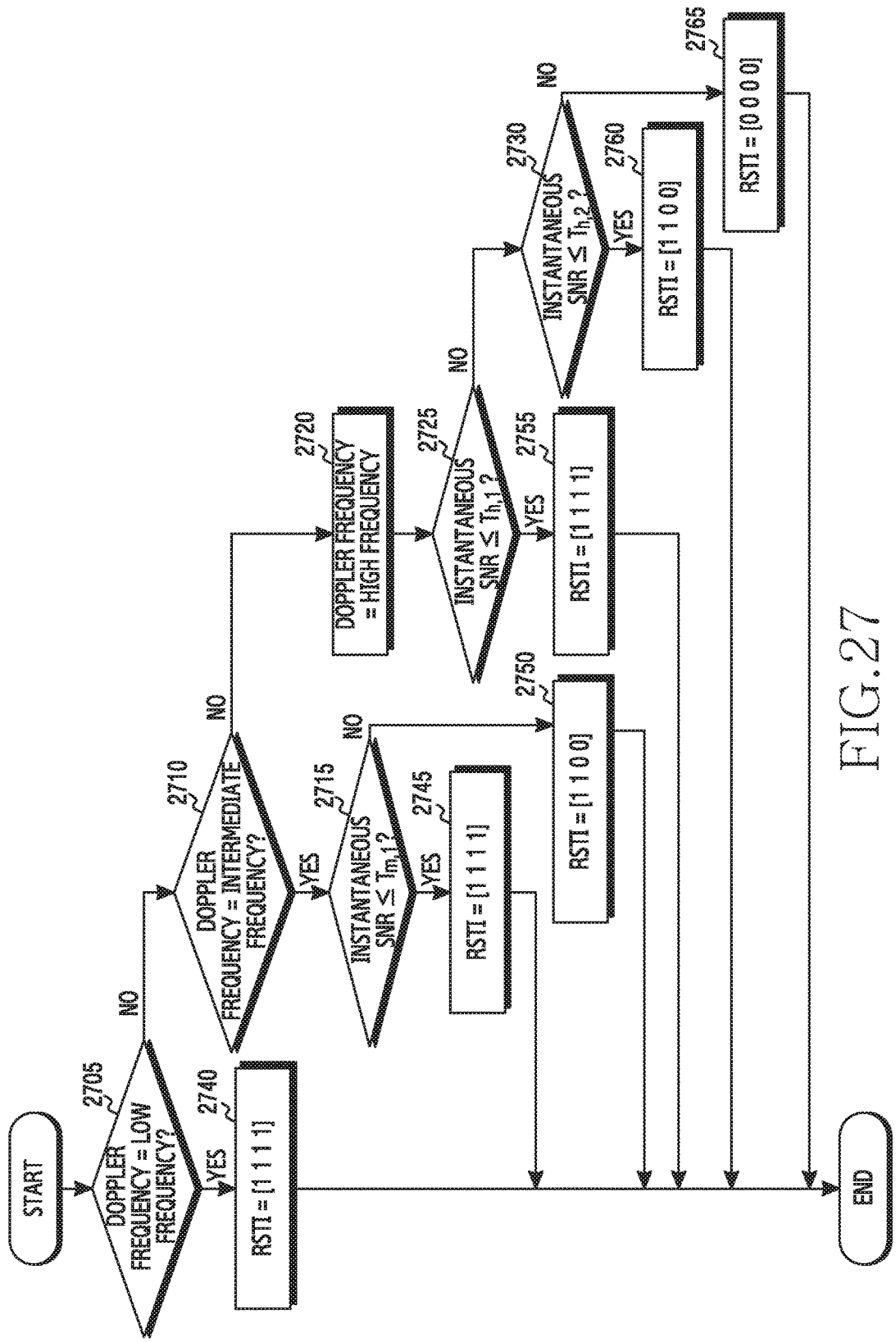
FIG. 27 is a flow chart illustrating that Reference Signal Time Domain Interpolation (RSTI) is adaptively selected by a channel estimation method using the StOMP and block StOMP using the linear interpolation of CFR according to an embodiment of the present disclosure.

FIG. 27 is a flow chart illustrating that rsti is adaptively selected by a channel estimation method using the StOMP and block StOMP using the linear interpolation of CFR according to an embodiment of the present disclosure. The flow chart shown in FIG. 27 can be typically performed using a Doppler detector and an SNR measurement device, which are known to those skilled in the art, and the Doppler detector and SNR measurement device can be included in the reception end. The rsti indicates whether the RSTI technique is applied to each transmission antenna, for example, RSTI=[0 0 0 0] indicates that the RSTI technique is not applied to any antenna, RSTI=[1 1 0 0] indicates that the RSTI technique is applied to CRS associated with only the transmission antenna #0 and transmission antenna #1, and RSTI=[1 1 1 1] indicates that the RSTI technique is applied to all CRS associated with the transmission antennas.

In step 2705, the reception end 120 determines whether the Doppler frequency is a low frequency or the reception end 120 moves at a low-speed. When it is determined that the reception end 120 moves at a low-speed, the process proceeds to step 2740 and the reception end 120 applies the RSTI=[1 1 1 1] thereto.

When it is determined that the terminal does not move at a low-speed, the process proceeds to step 2710 and the reception end 120 determines whether the Doppler frequency is an intermediate frequency, that is, the reception end 120 is moving at an intermediate speed. When it is determined that the reception end 120 moves at an intermediate speed, the reception end 120 proceeds to step 2715 and determines whether the instantaneous SNR measured at a slot or sub-frame rate is greater than a specific reference value $T_{m,1}$. When the instantaneous SNR is equal to or smaller than $T_{m,1}$, the process proceeds to step 2745 and applies RSTI=[1 1 1 1] thereto, and the instantaneous SNR is greater than $T_{m,1}$, the process proceeds to step 2750 and applies RSTI=[1 1 0 0] thereto.

In step 2720, when the reception end 120 determines that the Doppler frequency is a higher frequency, that is, when it is determined that the reception end 120 is moving at a higher speed, the reception end 120 proceeds to step 2725 and determines whether the instantaneous SNR measured at a slot or sub-frame rate is greater than a specific reference value $T_{h,1}$. When the instantaneous SNR is equal to or smaller than $T_{h,1}$, the process proceeds to step 2755 and applies RSTI=[1 1 1 1] thereto. When the instantaneous SNR is greater than a specific reference value $T_{h,1}$, the reception end 120 proceeds to step 2730 and determines whether the instantaneous SNR is greater than a specific reference value $T_{h,2}$. When the instantaneous SNR is equal to or smaller than $T_{h,2}$, the process proceeds to step 2760 and applies RSTI=[1 1 0 0] thereto, and the instantaneous SNR is greater than $T_{h,2}$, the process proceeds to step 2765 and applies RSTI=[0 0 0 0] thereto. According to an embodiment, the instantaneous SNR can be defined as an average value of the SNR of OFDM symbols occupied by CRS that is used for channel estimation in one sub-frame, and defined by using the output of a finite impulse response (FIR) filter or an infinite impulse response (IIR) filter of SNRs of OFDM symbols which are received through multiple sub-frames and have CRS therein.

The method according to the embodiments described in the claims or the specification of the present disclosure can be implemented in the form of hardware, software or a combination of hardware and software.

The software can be stored in a computer readable storage medium. The computer readable storage medium stores at least one program (software module) including instructions that, when executed by at least one processor in an electronic device, causes the processor to execute method of the present disclosure.

The software can be stored in an optical or magnetically readable medium such as a Compact Disc ROM (CD-ROM), Digital Versatile Discs (DVDs), a magnetic disk or a magnetic tape, or the like, in a form of volatile or a non-volatile storage device such as a Read Only Memory (ROM), or in a form of a memory such as a Random Access Memory (RAM), memory chips, device or integrated circuits.

Storage devices and storage media are embodiments of a computer readable storage medium which is capable of storing a program or programs including instructions that implement the embodiments when executed. Embodiments provide a program including a code for implementing a device or a method as claimed in any one of the claims of this specification, and a computer readable medium for storing the program. Further, such programs may be electronically transmitted through any medium, such as a communication signal transferred through a wired or wireless connection and embodiments suitably include the equivalents thereof.

In the above-described detailed embodiments of the present disclosure, a component included in the present disclosure may be expressed in the singular or the plural form according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured as a single element or a single element in the description may be configured as multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a reception device, the method comprising:
    obtaining a basis expansion model (BEM) basis vector based on reference signals received from a transmission device;
    obtaining at least one BEM coefficient corresponding to at least one non-zero entry of a channel impulse response (CIR) based on the BEM basis vector;
    obtaining the CIR based on the at least one BEM coefficient and the BEM basis vector;
    obtaining a channel frequency response (CFR) from the CIR; and
    processing received signals using the CFR.

2. The method of claim 1, further comprising:
    obtaining a second set of channel values of the CIR by performing an interpolation on a first set of channel values of the CIR based on the at least one BEM coefficient and the BEM basis vector.

3. The method of claim 2, further comprising:
    determining the at least one non-zero entry of the CIR; and
    estimating the at least one BEM coefficient corresponding to the at least one non-zero entry,
    wherein the CIR comprises the first set of channel values and the second set of channel values.

4. The method of claim 3, wherein the determining of the at least one non-zero entry comprises:
    generating a correlation vector by applying a matched filter to a residual signal; and
    determining at least one entry of the correlation vector in which an energy value of the at least one entry of the correlation vector is greater than a reference value,
    wherein the residual signal comprises at least part of the reference signals.

5. The method of claim 3, wherein the determining of the at least one non-zero entry comprises:
    determining at least one block among blocks in which values of all entries are non-zero in the CIR,
    wherein the estimating of the at least one BEM coefficient comprises: estimating the at least one BEM coefficient corresponding to entries included in the at least one block, and
    wherein each of the blocks comprises one or more entries all values of which are zero or non-zero.

6. The method of claim 5, wherein the determining of the at least one block comprises:
generating a correlation vector by applying a matched filter to a residual signal; and
determining at least one block of the correlation vector in which an energy value of the at least one block of the correlation vector is greater than a reference value,
wherein the residual signal comprises at least part of the reference signals.

7. The method of claim 1, wherein the BEM basis vector comprises a Legendre polynomial basis.

8. The method of claim 2, further comprising determining a number of basis for the BEM basis vector based on at least one of a Doppler frequency of a channel associated with the CIR and a channel quality for the channel.

9. The method of claim 1, wherein the reference signals are transmitted through a plurality of antennas of the transmission device, further comprising:
determining an antenna set for performing linear interpolation among the plurality of antennas based on at least one of a Doppler frequency of a channel associated with the CIR and a channel quality for the channel; and
determining a second set of channel values of the CIR, using the reference signals, for each of the plurality of antennas including antennas included in the antenna set,
wherein the second set of channel values for the antennas included in the antenna set are determined from the reference signals and an interpolation signal obtained by performing linear interpolation between the reference signals.

10. The method of claim 9, further comprising:
determining the at least one non-zero entry of the CIR including a first set of channel values; and
determining at least one value corresponding to the at least one non-zero entry,
wherein the CIR comprises the first set of channel values and the second set of channel values.

11. An apparatus of a reception device comprising:
a transceiver configured to receive reference signals from a transmission device;
at least one processor configured to:
obtain a basis expansion model (BEM) basis vector based on the reference signals, obtain at least one BEM coefficient corresponding to at least one non-zero entry of a channel impulse response (CIR) based on the BEM basis vector,
obtain the CIR based on the at least one BEM coefficient and the BEM basis vector,
obtain a channel frequency response (CFR) from the CIR, and
process received signals using the CFR.

12. The apparatus of claim 11, wherein the at least one processor is further configured to:
obtain a second set of channel values of the CIR by performing an interpolation on a first set of channel values of the CIR based on the at least one BEM coefficient and the BEM basis vector.

13. The apparatus of claim 12, wherein the at least one processor is further configured to:
determine the at least one non-zero entry of the CIR, and
estimate the at least one BEM coefficient corresponding to the at least one non-zero entry, wherein the CIR comprises the first set of channel values and the second set of channel values.

14. The apparatus of claim 13, wherein the at least one processor is further configured to:
generate a correlation vector by applying a matched filter to a residual signal, and
determine at least one entry of the correlation vector in which an energy value of the at least one entry of the correlation vector is greater than a reference value,
wherein the residual signal comprises at least part of the reference signals.

15. The apparatus of claim 13, wherein the at least one processor is further configured to:
determine at least one block among blocks in which values of all entries are non-zero in the CIR, and
estimate the at least one BEM coefficient corresponding to entries included in the at least one block,
wherein each of the blocks comprises one or more entries all values of which are zero or non-zero.

16. The apparatus of claim 15, wherein the at least one processor is further configured to:
generate a correlation vector by applying a matched filter to a residual signal; and
determine at least one block of the correlation vector in which an energy value of the at least one bloc of the correlation vector is greater than a reference value,
wherein the residual signal comprises at least part of the reference signals.

17. The apparatus of claim 11, wherein the BEM basis vector comprises a Legendre polynomial basis.

18. The apparatus of claim 12, wherein the at least one processor is further configured to determine a number of basis for the BEM basis vector based on at least one of a Doppler frequency of a channel associated with the CIR and a channel quality for the channel.

19. The apparatus of claim 11, wherein the reference signals are transmitted through a plurality of antennas of the transmission device,
wherein the at least one processor is further configured to:
determine an antenna set for performing linear interpolation among the plurality of antennas based on at least one of a Doppler frequency of a channel associated with the CIR and a channel quality for the channel, and
determine a second set of channel values of the CIR, using the reference signals, for each of the plurality of antennas including antennas included in the antenna set, and
wherein the second set of channel values for the antennas included in the antenna set are determined from the reference signals and an interpolation signal obtained by performing linear interpolation between the reference signals.

20. The apparatus of claim 19, wherein the at least one processor is further configured to:
determine the at least one non-zero entry of the CIR including a first set of channel values, and
determine at least one value corresponding to the at least one non-zero entry, and wherein the CIR comprises the first set of channel values and the second set of channel values.

* * * * *